US010616718B2

(12) United States Patent
Kim

(10) Patent No.: US 10,616,718 B2
(45) Date of Patent: Apr. 7, 2020

(54) METHOD AND SYSTEM FOR PROVIDING INFORMATION ABOUT TIME ZONE OF A WIRELESS COMMUNICATION DEVICE

(71) Applicant: SAMSUNG ELECTRONICS CO., LTD., Suwon-si (KR)

(72) Inventor: Yun-jung Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/404,211

(22) Filed: May 6, 2019

(65) Prior Publication Data

US 2019/0261134 A1    Aug. 22, 2019

Related U.S. Application Data

(63) Continuation of application No. 15/940,512, filed on Mar. 29, 2018, now Pat. No. 10,306,414, which is a continuation of application No. 14/592,400, filed on Jan. 8, 2015, now Pat. No. 9,949,087.

(30) Foreign Application Priority Data

Mar. 12, 2014  (KR) ................ 10-2014-0029259
May 23, 2014  (KR) ................ 10-2014-0062624

(51) Int. Cl.
*H04W 4/02*    (2018.01)
*H04W 4/12*    (2009.01)

(52) U.S. Cl.
CPC .............. *H04W 4/025* (2013.01); *H04W 4/12* (2013.01)

(58) Field of Classification Search
CPC ......... H04W 4/02; H04W 4/025; H04W 4/04; H04W 4/12; H04W 28/0226; H04W 48/04
USPC ... 455/456.1, 456.2, 456.3, 456.6, 466, 415; 379/142.1, 142.11, 157
See application file for complete search history.

(56) References Cited

U.S. PATENT DOCUMENTS

| 5,818,920 | A |   | 10/1998 | Rignell et al. |
| 5,852,630 | A | * | 12/1998 | Langberg ............ H04L 27/2647 375/219 |
| 6,600,817 | B1 |  | 7/2003 | Shafer et al. |
| 6,934,543 | B2 |  | 8/2005 | Wang et al. |
| 7,010,360 | B2 |  | 3/2006 | Atkin et al. |
| 7,970,384 | B1 |  | 6/2011 | Lambert et al. |
| 8,396,460 | B2 |  | 3/2013 | Couse |
| 9,532,177 | B2 |  | 12/2016 | Kim |
| 2002/0061747 | A1 |  | 5/2002 | Laakkonen |

(Continued)

FOREIGN PATENT DOCUMENTS

| CN | 101202983 A | 6/2008 |
| EP | 2536079 A2 | 12/2012 |

(Continued)

OTHER PUBLICATIONS

International Search Report for PCT/KR2015/001648 dated Apr. 30, 2015 [PCT/ISA/210].

(Continued)

*Primary Examiner* — Siu M Lee
(74) *Attorney, Agent, or Firm* — Sughrue Mion, PLLC

(57) ABSTRACT

A method and mobile device configured to display time zone information of a destination mobile device to which the mobile device connects based on time zone information of the mobile device and the destination mobile device.

20 Claims, 47 Drawing Sheets

(56) References Cited

U.S. PATENT DOCUMENTS

| | | | |
|---|---|---|---|
| 2002/0177442 A1* | 11/2002 | Nagashima | H04M 1/72566 455/435.1 |
| 2006/0104428 A1 | 5/2006 | Jin | |
| 2006/0129626 A1* | 6/2006 | Fitzpatrick | G06Q 10/109 709/200 |
| 2008/0148154 A1 | 6/2008 | Burrell et al. | |
| 2009/0016509 A1 | 1/2009 | Shah | |
| 2009/0089390 A1* | 4/2009 | Fein | G06F 15/16 709/207 |
| 2010/0184419 A1* | 7/2010 | Othmer | G06Q 10/10 455/418 |
| 2010/0255824 A1* | 10/2010 | Shih | H04W 36/385 455/414.1 |
| 2010/0273447 A1* | 10/2010 | Mann | H04M 1/72519 455/405 |
| 2010/0285780 A1 | 11/2010 | Collins | |
| 2011/0076992 A1 | 3/2011 | Chou et al. | |
| 2011/0081920 A1 | 4/2011 | Hung et al. | |
| 2011/0099270 A1* | 4/2011 | Hartman | H04M 1/2745 709/224 |
| 2013/0034221 A1 | 2/2013 | Aaron et al. | |
| 2013/0036184 A1 | 2/2013 | Hung et al. | |
| 2013/0109361 A1 | 5/2013 | Felt | |
| 2014/0153047 A1* | 6/2014 | Tsushima | G06Q 10/06 358/1.15 |
| 2014/0302892 A1 | 10/2014 | Fujimoto et al. | |

FOREIGN PATENT DOCUMENTS

| | | |
|---|---|---|
| EP | 2597605 A1 | 5/2013 |
| KR | 10-2005-0074158 A | 7/2005 |
| KR | 10-2011-0037059 A | 4/2011 |
| WO | 02/23935 A2 | 3/2002 |
| WO | 2010/066472 A1 | 6/2010 |

OTHER PUBLICATIONS

Written Opinion for PCT/KR2015/001648 dated Apr. 30, 2015 [PCT/ISA/237].

Communication dated Apr. 19, 2017, from the State Intellectual Property Office of People's Republic of China in counterpart Application No. 201580000630.1.

Communication dated Sep. 4, 2017, issued by the European Patent Office in counterpart European Application No. 15733601.7.

Communication dated Mar. 20, 2018, issued by the European Patent Office in counterpart European application No. 15 733 601.7.

* cited by examiner

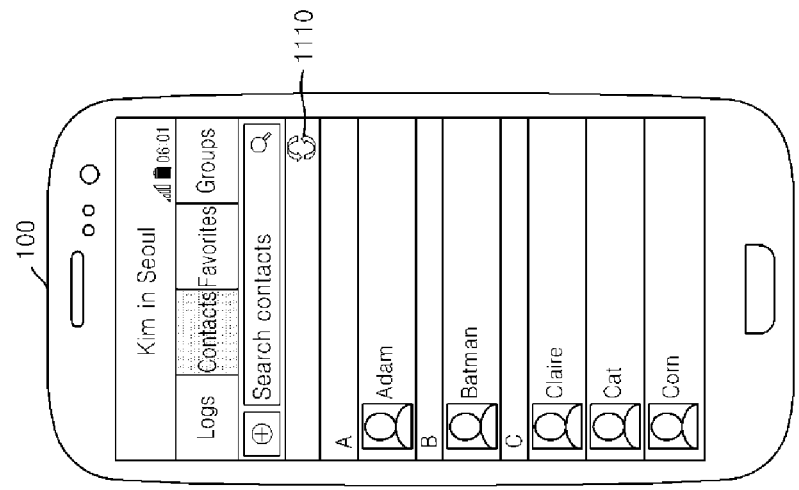

METHOD AND SYSTEM FOR PROVIDING INFORMATION ABOUT TIME ZONE OF A WIRELESS COMMUNICATION DEVICE

CROSS-REFERENCE TO RELATED APPLICATIONS

This application is a continuation of U.S. application Ser. No. 15/940,512 filed Mar. 29, 2018, which is a continuation of U.S. application Ser. No. 14/592,400 filed Jan. 8, 2015, now U.S. Pat. No. 9,949,087 issued on Apr. 17, 2018, which claims priority from Korean Patent Application No. 10-2014-0029259, filed on Mar. 12, 2014, and Korean Patent Application No. 10-2014-0062624, filed on May 23, 2014, in the Korean Intellectual Property Office, the disclosures of which are incorporated herein by reference in their entireties.

BACKGROUND

1. Field

Aspects of exemplary embodiments relate to a method and system for providing time zone information of a second wireless communication device that is located at a different time zone from a time zone at which a first wireless communication device is located.

2. Description of the Related Art

Mobile terminals and wireless communication devices are portable apparatuses that perform various functions, including making voice and video calls while moving, for example. Such mobile terminals may also perform more complex functions, such as photography or video, playback of music files or video files, gaming, reception of broadcasts, and accessing the Internet.

SUMMARY

Aspects of exemplary embodiments include a method and system for providing the time zone information of an external wireless communication device, in which a first wireless communication device provides the time zone information of a second wireless communication device located in a different time zone from that of the first wireless communication device so that a user of the first wireless communication device may determine whether a user of the second wireless communication device is available for communication.

Additional aspects will be set forth in part in the description which follows and, in part, will be apparent from the description, or may be learned by practice of the presented embodiments.

According to an aspect of an exemplary embodiment, there is provided a first wireless communication device including a storage unit configured to store identification information of a second mobile device, a communication unit configured to receive time zone information of the mobile device, a processor configured to compare time zone information of the wireless communication device with the time zone information of the mobile device, and a display unit configured to display the time zone information of the mobile device in correspondence to the identification information of the mobile device when the time zone information of the wireless communication device is different from the time zone information of the mobile device.

According to an aspect of an exemplary embodiment, there is provided a mobile device including a display, a memory configured to store time zone information of a destination mobile device, and a processor configured to determine whether the destination mobile device is available for communication with the mobile device based on time zone information of the mobile device and time zone information of the destination mobile device.

BRIEF DESCRIPTION OF THE DRAWINGS

The above and other aspects will become apparent and more readily appreciated from the following description of the exemplary embodiments, taken in conjunction with the accompanying drawings in which:

FIGS. 11A and 11B illustrate a contact information screen that is displayed according to whether the time zone information of the second wireless communication device is equal to or different from the time zone information of the first wireless communication device, according to an exemplary embodiment;

DETAILED DESCRIPTION OF EXEMPLARY EMBODIMENTS

Figure 1:
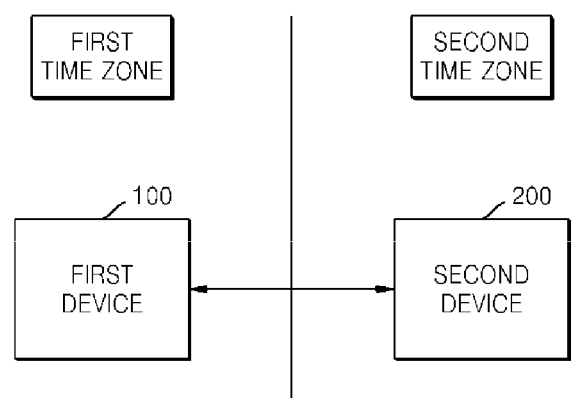
FIG. 1 is a block diagram for illustrating communication between wireless communication devices located at different time zones.

Reference will now be made in detail to exemplary embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items.

The terminology used herein will now be briefly described as the present invention will be described in detail based on this terminology.

Although general terms widely used at present were selected for describing the exemplary embodiments in consideration of the functions thereof, these general terms may vary according to intentions of one of ordinary skill in the art, case precedents, the advent of new technologies, and the like. Terms arbitrarily selected may also be used in a specific case. In this case, their meanings need to be given in the detailed description. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms " . . . unit" and " . . . module" when used in this specification refers to a unit in which at least one function or operation is performed, and may be implemented as hardware, software, or a combination of hardware and software.

Exemplary embodiments are described in detail herein with reference to the accompanying drawings so that this disclosure may be easily performed by one of ordinary skill in the art to which the present invention pertain. The exemplary embodiments may, however, be embodied in many different forms and should not be construed as being limited to the embodiments set forth herein. In the drawings, parts irrelevant to the description are omitted for simplicity of explanation, and like numbers refer to like elements throughout.

FIG. 1 is a block diagram for illustrating communication between wireless communication devices located at different time zones.

Referring to FIG. 1, a first wireless communication device 100 and a second wireless communication device 200 according to an exemplary embodiment may be the wireless communication devices located at different time zones. Here, a time zone is a time division line devised to artificially adjust a time difference between regions based on the Royal Observatory in Greenwich, London (i.e., at longitude 0°), namely, a day/night difference between regions caused by the rotation of the earth.

For example, the first wireless communication device 100 may be in Seoul, and the second wireless communication device 200 may be in San Francisco. In other words, the first wireless communication device 100 may be located at a first time zone (i.e., the time zone of Seoul), and the second wireless communication device 200 may be located at a second time zone (i.e., the time zone of San Francisco) that is different from the first time zone. Because the first time zone (i.e., the time zone of Seoul) is 9 hours later than Greenwich, the first time zone may be "Greenwich Mean Time (GMT)+9".

Because the second time zone (i.e., the time zone of San Francisco) is 8 hours faster than Greenwich, the second time zone may be "GMT-8". In this case, a user of the first wireless communication device 100 (hereinafter, referred to as a first user) and a user of the second wireless communication device 200 (hereinafter, referred to as a second user) are at different times. For example, when the first user is at daytime, the second user may be at nighttime. In this case, the first user may make a call or send a message to the second wireless communication device 200 while the second user is sleeping.

Accordingly, a system for providing time zone information of an external wireless communication device according to an exemplary embodiment may provide the first wireless communication device 100 with time zone information of the second wireless communication device 200 and the second wireless communication device 200 with time zone information of the first wireless communication device 100 so that the first user may contact the second user in consideration of the time of the second user and the second user may contact the first user in consideration of the time of the first user.

If the first user talks with the second user based on their time zones, for example, if the first user sends a message "I will call you again at 10 am tomorrow", wherein "10 am tomorrow" is based on the first time zone, to the second wireless communication device 200, the second user in the second time zone may recognize "10 am tomorrow" based on the first time zone, as "10 am tomorrow" based on the second time zone. In this case, smooth communication between the first user and the second user may not be performed.

Accordingly, the system for providing time zone information of an external wireless communication device according to an exemplary embodiment may provide the second wireless communication device 200 with the time zone information of the first wireless communication device 100 so that the second wireless communication device 200 displays time information based on the second time zone instead of "10 am tomorrow" based on the first time zone. Consequently, the second user may recognize the accurate month, date, and time of "10 am tomorrow".

The system for providing time zone information of an external wireless communication device according to an exemplary embodiment will now be described in greater detail with reference to FIG. 2.

Figure 2:
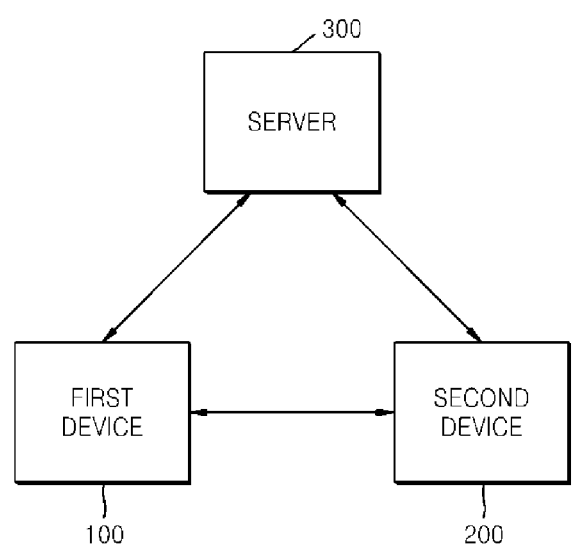
FIG. 2 is a block diagram of a system for providing time zone information of wireless communication device, according to an exemplary embodiment.

FIG. 2 is a block diagram of a system for providing time zone information of an external wireless communication device, according to an exemplary embodiment.

Referring to FIG. 2, the system may include a first wireless communication device 100, a second wireless communication device 200, and a server 300.

The first wireless communication device 100 and the second wireless communication device 200 according to an exemplary embodiment may each include a communication module for performing communication with an external wireless communication device or the server 300. For example, the first wireless communication device 100 may communicate with the server 300 or the second wireless communication device 200 via its own communication module, and the second wireless communication device 200 may communicate with the server 300 or the first wireless communication device 100 via its own communication module.

Accordingly, the first wireless communication device 100 may transmit time zone information of the first wireless communication device 100 to the server 300, and the second wireless communication device 200 may transmit time zone information of the second wireless communication device 200 to the server 300.

When the time zone information of the first wireless communication device 100 or the second wireless communication device 200 changes, when the first wireless communication device 100 or the second wireless communication device 200 is turned on, when the first wireless communication device 100 or the second wireless communication device 200 connects to a new base station, and when the first wireless communication device 100 connects to a new Internet Protocol (IP), the first wireless communication device 100 or the second wireless communication device 200 may transmit the time zone information of the first wireless communication device 100 or the second wireless communication device 200 to the server 300.

The first wireless communication device 100 may receive the time zone information of the second wireless communication device 200 from the server 300, and the second wireless communication device 200 may receive the time zone information of the first wireless communication device 100 from the server 300.

The first wireless communication device 100 and the second wireless communication device 200 according to an exemplary embodiment may be implemented as various types. For example, the first wireless communication device 100 and the second wireless communication device 200 may be mobile phones, smartphones, laptop computers, tablet PCs, e-book terminals, digital broadcasting terminals, personal digital assistants (PDAs), portable multimedia players (PMPs), navigations, MP3 players, digital cameras, Internet Protocol televisions (IPTVs), digital televisions (DTVs), consumer electronics (CE) apparatuses (e.g., a refrigerator and an air-conditioner each including a display apparatus), or the like, but they are not limited thereto. The terms wireless communication device and mobile device should be understood to be used interchangeably.

The first wireless communication device 100 or the second wireless communication device 200 may be a wearable wireless communication device that is wearable by users. For example, the first wireless communication device 100 and the second wireless communication device 200 may be watches, glasses, rings, bracelets, necklaces, hair bands, or the like.

The server 300 according to an exemplary embodiment may communicate with the first wireless communication device 100 or the second wireless communication device 200. For example, the server 300 may receive user authentication information or wireless communication device identification information from the first wireless communication device 100 or the second wireless communication device 200. Accordingly, the server 300 may recognize the first or second user based on the user authentication information, and may identify the first wireless communication device 100 or the second wireless communication device 200 on the wireless communication device identification information. The user authentication information may include a user identifier, a user password, a user account, and the like, and the server 300 may identify the first or second user based on the user authentication information.

The server 300 may also receive time zone information from the first wireless communication device 100 or the second wireless communication device 200. In this case, the server 300 may receive time zone information from the first wireless communication device 100 or the second wireless communication device 200 at regular intervals. Alternatively, when the time zone information of the first wireless communication device 100 or the second wireless communication device 200 changes (e.g., when the first wireless communication device 100 or the second wireless communication device 200 is moved to another country), when the first wireless communication device 100 or the second wireless communication device 200 is turned on, when the first wireless communication device 100 or the second wireless communication device 200 connects to a new base station, when the first wireless communication device 100 or the second wireless communication device 200 connects to a new IP, and when the first user transmits the time zone information of the first wireless communication device 100 or the second user transmits the time zone information of the second wireless communication device 200, the server 300 may receive time zone information from the first wireless communication device 100 or the second wireless communication device 200.

The server 300 may also receive standard time zone information, current time information, and location information of the first wireless communication device 100 or the second wireless communication device 200 or receive global positioning system (GPS) information, WiFi information, IP information, Bluetooth connection information, and the like of the first wireless communication device 100 or the second wireless communication device 200. Based on the received information, the server may receive the time zone information of the first wireless communication device 100 or the second wireless communication device 200.

The server 300 may also receive information of another device to which the wireless communication device connects. For example, the server 300 may receive information of a base station or wireless access point to which the wireless communication device connects, and determine a time zone of the wireless communication device from the information, such as time zone information of the base station or wireless access point, of the device to which the wireless communication device connects. The time zone information of the device to which the wireless communication device connects may be used as the time zone information of the wireless communication device.

In addition, the server 300 may store and manage the received time zone information of the first wireless communication device 100 or the second wireless communication device 200. When the first wireless communication device 100 requests the time zone information of the second wireless communication device 200, the server 300 may transmit the time zone information of the second wireless communication device 200 to the first wireless communication device 100. On the other hand, when the second wireless communication device 200 requests the time zone information of the first wireless communication device 100, the server 300 may transmit the time zone information of the first wireless communication device 100 to the second wireless communication device 200.

The server 300 according to an exemplary embodiment may be realized as various types. For example, the server 300 may be a mobile communication network server that provides a mobile communication service or may be a social networking service (SNS) server that provides an SNS. The function of the server 300 may be performed by the first wireless communication device 100 or the second wireless communication device 200. However, exemplary embodiments are not limited thereto. Although the system for providing time zone information of an external wireless communication device includes the first wireless communication device 100, the second wireless communication device 200, and the server 300 in FIG. 2, exemplary embodiments are not limited thereto. The system may include more components than those illustrated in FIG. 2 or fewer components than those illustrated in FIG. 2.

For example, the system for providing time zone information of an external wireless communication device may include only the first wireless communication device 100 and the second wireless communication device 200 without the server 300. When the system includes only the first wireless communication device 100 and the second wireless communication device 200, the first wireless communication device 100 may transmit the time zone information of the first wireless communication device 100 to the second wireless communication device 200, and the second wireless communication device 200 may transmit the time zone information of the second wireless communication device 200 to the first wireless communication device 100.

Alternatively, the first wireless communication device 100 may poll the second wireless communication device 200 for time zone information thereof, either at a predetermined period or upon activation of the wireless communication device 100, and vice versa.

Hereinafter, for convenience of explanation, the second wireless communication device 200 is defined as an opposite wireless communication device, and the first wireless communication device 100 is defined as a user wireless communication device to or on which time zone information of the opposite wireless communication device is provided or displayed.

A method in which the first wireless communication device 100 provides time zone information of the second wireless communication device 200 which is located at a different time zone from that of the first wireless communication device 100 will now be described in detail with reference to FIG. 3.

Figure 3:
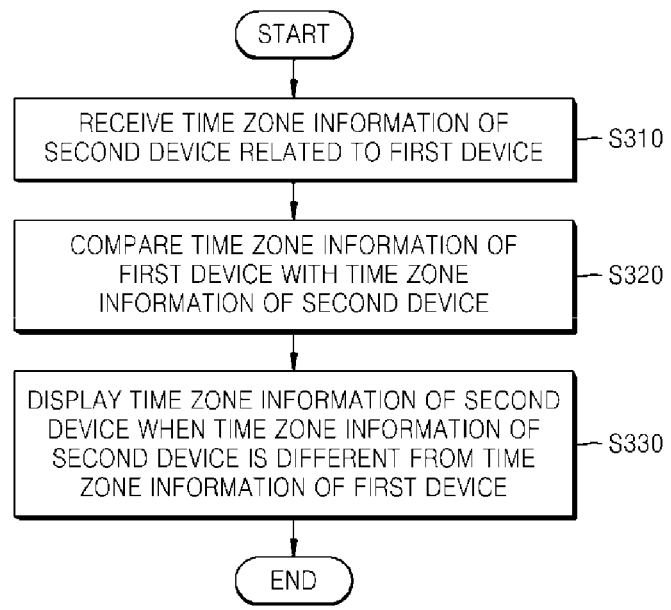
FIG. 3 is a flowchart of a method of providing time zone information of a wireless communication device, according to an exemplary embodiment.

FIG. 3 is a flowchart of a method of providing time zone information of the opposite wireless communication device (i.e., the second wireless communication device 200), according to an exemplary embodiment.

Referring to FIG. 3, the first wireless communication device 100 may receive the time zone information of the second wireless communication device 200 related to the first wireless communication device 100, in operation S310. The first wireless communication device 100 and the second wireless communication device 200 being related to each other may mean that identification information of the second wireless communication device 200 is stored in the first wireless communication device 100.

For example, when a telephone number of the second wireless communication device 200 is stored in contact information in the first wireless communication device 100, it may mean that the first wireless communication device 100 and the second wireless communication device 200 are related to each other. If the telephone number of a wireless communication device is stored in contact information, the wireless communication devices may be related if the telephone number is in a subset of contacts, such as a group (i.e., family, friends, etc.) In addition, when the telephone number of the second wireless communication device 200 is stored in a call record of the first wireless communication device 100, it may mean that the first wireless communication device 100 and the second wireless communication device 200 are related to each other. Alternatively, the wireless communication devices may be associated through an application installed on one or more of the wireless communication devices, such as a text-messaging application, photo sharing application, etc., as per below. The application also may refer to an external service, and access contacts or groups of the external service, to relate the wireless communication devices together.

The first wireless communication device 100 and the second wireless communication device 200 being related to each other may also mean that the first user and the second user belong to the same social group via the SNSs provided by the first wireless communication device 100 and the second wireless communication device 200. For example, when the first user and the second user are registered as social friends via SNSs provided by the first wireless communication device 100 and the second wireless communication device 200, it may mean that the first wireless communication device 100 and the second wireless communication device 200 are related to each other.

The first wireless communication device 100 may receive the time zone information of the second wireless communication device 200 related with the first wireless communication device 100 from the server 300 or receive the same directly from the second wireless communication device 200.

According to an exemplary embodiment, the time zone information of the second wireless communication device 200 may include at least one selected from standard time zone information (for example, GMT+9 or GMT−2) of the second wireless communication device 200, current time information (for example, 9:00 pm or 10:00 am) of the second wireless communication device 200, and location information (for example, Seoul, New Zealand, Tokyo, New York, or San Francisco) of the second wireless communication device 200.

The time zone information of the second wireless communication device 200 may also include mobile communication network connection information, GPS information, WiFi information, IP information, Bluetooth connection information, and the like of the second wireless communication device 200. However, exemplary embodiments are not limited thereto.

For example, the first wireless communication device 100 may receive, from the server 300, the standard time zone information of the second wireless communication device 200 or current time information of a region where the second wireless communication device 200 is located. Alternatively, the first wireless communication device 100 may receive the location information of the second wireless communication device 200 from the server 300 to search for a standard time zone corresponding to the received location information or current time information corresponding to the received location information.

According to an exemplary embodiment, the first wireless communication device 100 may receive by push (or request by poll) the time zone information of the second wireless communication device 200 from the server 300 at regular intervals, or may receive the time zone information of the second wireless communication device 200 when the first wireless communication device 100 requests the time zone information of the second wireless communication device 200.

For example, when the first wireless communication device 100 requests the server 300 to update display of time zone information with contact information in the first wireless communication device 100 including the identification information of the second wireless communication device 200, the server 300 may transmit the time zone information of the second wireless communication device 200 to the first wireless communication device 100.

Alternatively, when the time zone information of the second wireless communication device 200 changes or when the server 300 receives the time zone information of the second wireless communication device 200 from the second wireless communication device 200, the server 300 may transmit the time zone information of the second wireless communication device 200 to the first wireless communication device 100.

In addition, the server 300 may receive the time zone information of the second wireless communication device 200 at regular intervals, or receive the time zone information of the second wireless communication device 200 when the time zone information of the second wireless communication device 200 has changed or when the first wireless communication device 100 requests the time zone information of the second wireless communication device 200.

In operation S320, the first wireless communication device 100 may compare the time zone information of the first wireless communication device 100 with the time zone information of the second wireless communication device 200.

For example, when the first wireless communication device 100 has received information about the standard time zone of the second wireless communication device 200, the first wireless communication device 100 may compare a standard time zone of the first wireless communication device 100 with the standard time zone of the second wireless communication device 200 to determine whether the standard time zones of the first and second wireless communication devices 100 and 200 are equal to each other. When the standard time zone of the first wireless communication device 100 is GMT+9 and the standard time zone of the second wireless communication device 200 is GMT+9, the first wireless communication device 100 may determine that the time zone information of the first wireless communication device 100 is identical with the time zone information of the second wireless communication device 200.

In addition, when the first wireless communication device 100 has received the current time information of the second wireless communication device 200, the first wireless communication device 100 may compare the current time information of the first wireless communication device 100 with the current time information of the second wireless communication device 200 to determine whether they are the same as each other. When the current time information of the first wireless communication device 100 is 9:00 am and the current time information of the second wireless communication device 200 is 9:00 am, the first wireless communication device 100 may determine that the time zone information of the first wireless communication device 100 is identical with the time zone information of the second wireless communication device 200.

When the first wireless communication device 100 has received the location information of the second wireless communication device 200, the first wireless communication device 100 may compare the location information of the first wireless communication device 100 with the location information of the second wireless communication device 200 to determine whether they are the same as each other. At this time, the first wireless communication device 100 may determine whether the locations of the first wireless communication device 100 and the second wireless communication device 200 belong to the same standard time zone.

For example, when the first wireless communication device 100 is located in Korea and the second wireless communication device 200 is located in Japan, because Korea and Japan belong to the same standard time zone, the time zone information of the first wireless communication device 100 and the time zone information of the second wireless communication device 200 may be determined identical although the first wireless communication device 100 and the second wireless communication device 200 are located in different geographic regions.

In operation S330, when the time zone information of the second wireless communication device 200 is different from the time zone information of the first wireless communication device 100, the first wireless communication device 100 may display the time zone information of the second wireless communication device 200.

In this case, the displayed time zone information of the second wireless communication device 200 may include at least one selected from the standard time zone information of the second wireless communication device 200, the current time information of the second wireless communication device 200, and the location information of the second wireless communication device 200. Alternatively, a difference or offset between the time zone information of the wireless communication device 100 or 200 may be displayed. The first wireless communication device 100 may display the time zone information of the second wireless communication device in correspondence to the identification information of the second wireless communication device 200. For example, the first wireless communication device 100 may display the time zone information of the second wireless communication device 200 on a contact information screen, a message window, a call screen, an SNS application execution screen, and the like. However, exemplary embodiments are not limited thereto.

When the time zone information of the first wireless communication device 100 is different from the time zone information of the second wireless communication device 200, the first wireless communication device 100 according to an exemplary embodiment may display the time zone information of the second wireless communication device 200 in an area on the contact information screen that corresponds to the second wireless communication device 200 while a contact information application is being executed. For example, the contact information screen may include the name, nick name, photograph, telephone number, and the like of a user who uses an external wireless communication device. In this case, the first wireless communication device 100 may display the time zone information of the second wireless communication device 200 within or around an area on the contact information screen on which the name, nick name, photograph, telephone number, or the like of the user of the second wireless communication device 200 is displayed. The operation of the first wireless communication device 100 displaying the time zone information of the second wireless communication device 200 on the contact information screen will be described in detail later with reference to FIGS. 8-14D.

When the time zone information of the first wireless communication device 100 is different from the time zone information of the second wireless communication device 200, the first wireless communication device 100 according to an exemplary embodiment may display the time zone information of the second wireless communication device 200 in a message window while a message application is being executed. The message window may be a text message window, an instant message window, an e-mail window, a chatting window, or the like, but exemplary embodiments are not limited thereto.

For example, the first wireless communication device 100 may display the time zone information of the second wireless communication device 200 on at least one selected from a message input region and a message display region included in the message window. The message input region may be a region via which a message desired to be sent is input, and the message display region may be a region on which a sent or received message is displayed. The operation of the first wireless communication device 100 displaying the time zone information of the second wireless communication device 200 in the message window will be described in detail later with reference to FIGS. 16-21.

When the time zone information of the first wireless communication device 100 is different from the time zone information of the second wireless communication device 200, the first wireless communication device 100 according to an exemplary embodiment may display the time zone information of the second wireless communication device 200 on an SNS application execution screen while an SNS application is being executed. For example, the SNS application execution screen may include the name, nick name, photograph, message, telephone number, and the like of a user who is connected to the same social group together with the user of the first wireless communication device 100. In this case, the first wireless communication device 100 may display the time zone information of the second wireless communication device 200 within or around a region on the SNS application execution screen on which the name, nick name, photograph, message, telephone number, or the like of the user of the second wireless communication device 200 is displayed.

For example, when the server 300 of FIG. 2 is an SNS server, the SNS server may receive the time zone information of the second wireless communication device 200 from the second wireless communication device 200 and may transmit the received time zone information of the second wireless communication device 200 to the first wireless communication device 100. Accordingly, the first wireless communication device 100 may compare the time zone information of the second wireless communication device 200 received from the SNS server with the time zone information of the first wireless communication device 100. When the time zone information of the second wireless communication device 200 is different from the time zone information of the first wireless communication device 100, the first wireless communication device 100 may display the time zone information of the second wireless communication device 200 on the SNS application execution screen. The operation of the first wireless communication device 100 displaying the time zone information of the second wireless communication device 200 on the SNS application execution screen will be described in detail later with reference to FIG. 35.

While a call application is being executed, when the time zone information of the first wireless communication device 100 is different from the time zone information of the second wireless communication device 200, the first wireless communication device 100 according to an exemplary embodiment may display the time zone information of the second wireless communication device 200 on a call screen. For example, when the first wireless communication device 100 inputs the identification information of the second wireless communication device 200 (for example, the name, nick-name, telephone number, e-mail address, photograph, short-cut number, or the like of the second user) on a screen before a call is connected, the first wireless communication device 100 may display the time zone information of the second wireless communication device 200 on the screen before a call is connected.

When the first wireless communication device 100 requests a call connection to the second wireless communication device 200, the first wireless communication device 100 may display the time zone information of the second wireless communication device 200 on a call connection request screen. When the first wireless communication device 100 receives a call connection request from the second wireless communication device 200, the first wireless communication device 100 may display the time zone information of the second wireless communication device 200 on a call-receiving screen. The operation of the first wireless communication device 100 displaying the time zone information of the second wireless communication device 200 on the call screen will be described in detail later with reference to FIGS. 26-30B.

Figure 4:
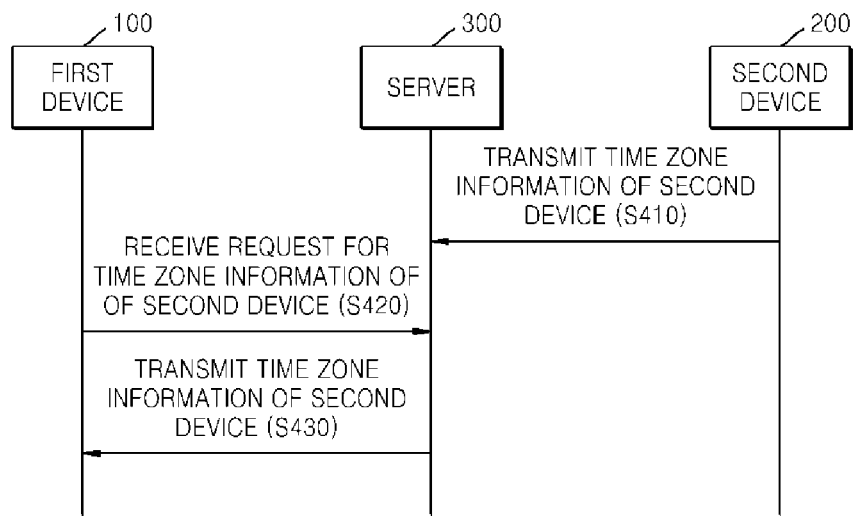
FIG. 4 is a flowchart of a method in which a first wireless communication device receives time zone information of the second wireless communication device, according to an exemplary embodiment.

FIG. 4 is a flowchart of a method in which the first wireless communication device 100 receives the time zone information of the second wireless communication device 200, according to an exemplary embodiment.

Referring to FIG. 4, the second wireless communication device 200 may transmit the time zone information of the second wireless communication device 200 to the server 300, in operation S410. In this case, the second wireless communication device 200 may transmit the time zone information of the second wireless communication device 200 to the server 300 at regular intervals. Alternatively, when the time zone information of the second wireless communication device 200 changes, the second wireless communication device 200 may transmit the time zone information of the second wireless communication device 200 to the server 300.

For example, when the second wireless communication device 200 has been moved a predetermined distance or more, the second wireless communication device 200 may sense that the time zone of the second wireless communication device 200 has changed. The second wireless communication device 200 may sense the location of the second wireless communication device 200 by using a position sensor (for example, a GPS module). When the location of the second wireless communication device 200 has changed the predetermined distance or more, the second wireless communication device 200 may sense that the time zone thereof has changed. The second wireless communication device 200 may sense that the time zone thereof has changed, by comparing the standard time zone corresponding to the previous location of the second wireless communication device 200 with the standard time zone corresponding to the current location thereof.

In addition, when the second wireless communication device 200 is turned on, when the second wireless communication device 200 connects to a new base station, and when the second wireless communication device 200 connects to a new IP, the second wireless communication device 200 may transmit the time zone information of the second wireless communication device 200 to the server 300.

The second wireless communication device 200 may transmit the standard time zone information, the current time information, the location information, and the like of the second wireless communication device 200 to the server 300. When the time zone of the second wireless communication device 200 has changed, the second wireless communication device 200 may transmit changed standard time zone information, changed current time information, changed location information, and the like thereof to the server 300.

The server 300 may store the received time zone information of the second wireless communication device 200 and compare pre-stored time zone information of the second wireless communication device 200 with the received time zone information of the second wireless communication device 200. When it is determined as a result of the comparison that the time zone information of the second wireless communication device 200 has changed, the server 300 may update and store the time zone information of the second wireless communication device 200.

In operation S420, the server 300 receives a request for the time zone information of the second wireless communication device 200 from the first wireless communication device 100. In this case, the server 300 may transmit the time zone information of the second wireless communication device 200 to the first wireless communication device 100, in operation S430.

For example, when the first wireless communication device 100 executes a contact information application, when the first wireless communication device 100 requests the server 300 to update time zone information of the second wireless communication device 200 displayed with contact information in the first wireless communication device 100, when the first wireless communication device 100 inputs the identification information of the second wireless communication device 200 (for example, the name, nick name, telephone number, e-mail address, photograph, or shortcut number of the second user) in order to call the second wireless communication device 200 or send a message to the second wireless communication device 200, or when the first wireless communication device 100 requests a call connection to the second wireless communication device 200, the first wireless communication device 100 may request the server 300 for the time zone information of the second wireless communication device 200. However, exemplary embodiments are not limited thereto.

Accordingly, the server 300 may transmit the standard time zone information, the current time information, the location information, and the like of the second wireless communication device 200 to the first wireless communication device 100.

Figure 5:
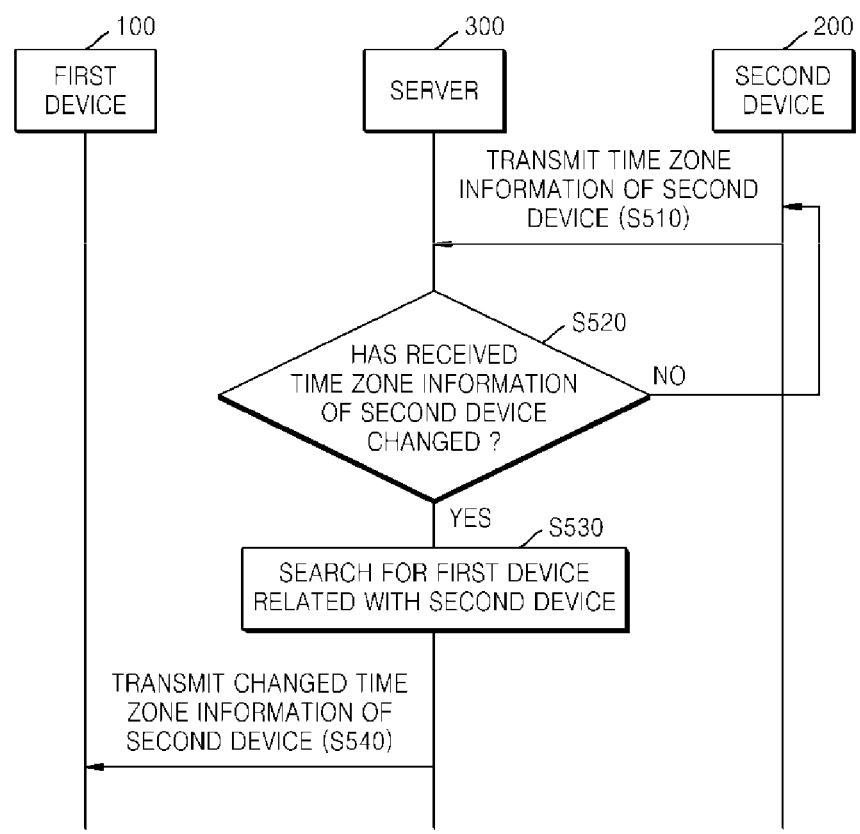
FIG. 5 is a flowchart of a method in which the first wireless communication device receives the time zone information of the second wireless communication device, according to an exemplary embodiment.

FIG. 5 is a flowchart of a method in which the first wireless communication device 100 receives the time zone information of the second wireless communication device 200, according to an exemplary embodiment.

Referring to FIG. 5, the second wireless communication device 200 may transmit the time zone information of the second wireless communication device 200 to the server 300, in operation S510. Because operation S510 of FIG. 5 corresponds to operation S410 of FIG. 4, a repeated description thereof will be omitted.

In operation S520, the server 300 may determine whether the received time zone information of the second wireless communication device 200 has changed.

The server 300 may store the received time zone information of the second wireless communication device 200 and compare pre-stored time zone information of the second wireless communication device 200 with the received time zone information of the second wireless communication device 200 to determine whether the time zone information of the second wireless communication device 200 has changed.

If it is determined that the time zone information of the second wireless communication device 200 has changed, the server 300 may search for the first wireless communication device 100 related with the second wireless communication device 200, in operation S530. Examples of the first wireless communication device 100 related with the second wireless communication device 200 may include an external wireless communication device corresponding to identification information stored in contact information in the second wireless communication device 200, an external wireless communication device corresponding to identification information remaining in a call record in the second wireless communication device 200, and a wireless communication device of a user who belongs to the same social group together with the second user (i.e., the user of the second wireless communication device 200) via an SNS.

Accordingly, in operation S540, the server 300 may transmit changed time zone information of the second wireless communication device 200 to the found first wireless communication device 100. For example, the server 300 may transmit changed standard time zone information, changed current time information, changed location information, and the like of the second wireless communication device 200 to the first wireless communication device 100.

Accordingly, when the time zone information of the second wireless communication device 200 has changed, the first wireless communication device 100 related with the second wireless communication device 200 may automatically receive the changed time zone information of the second wireless communication device 200 from the server 300.

Figure 6:
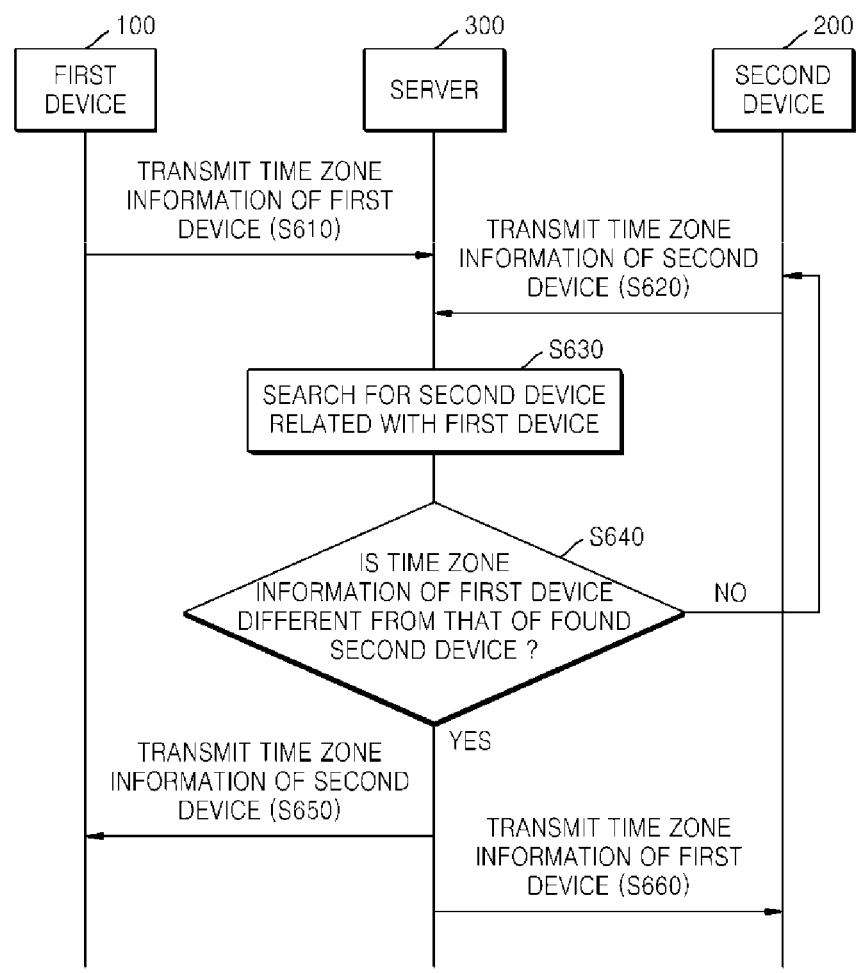
FIG. 6 is a flowchart of a method in which related wireless communication devices receive time zone information of other wireless communication devices from the other wireless communication devices, according to an exemplary embodiment.

FIG. 6 is a flowchart of a method in which related wireless communication devices receive time zone information of opposite wireless communication devices from the opposite wireless communication devices, according to an exemplary embodiment; Hereinafter, for convenience of explanation, the first wireless communication device 100 and the second wireless communication device 200 are referred to as related wireless communication devices.

Referring to FIG. 6, the first wireless communication device 100 and the second wireless communication device 200 may respectively transmit their own time zone information to the server 300, in operations S610 and S620. In this case, the first wireless communication device and the second wireless communication device 200 may respectively transmit their own time zone information to the server 300 at regular intervals. Alternatively, when the time zone information of the first wireless communication device 100 changes, the first wireless communication device 100 may transmit the time zone information of the first wireless communication device 100 to the server 300. When the time zone information of the second wireless communication device 200 changes, the second wireless communication device 200 may transmit the time zone information of the second wireless communication device to the server 300. For example, the first wireless communication device 100 and the second wireless communication device 200 may sense changes in the locations thereof by using a position sensor or the like.

The first wireless communication device 100 may transmit standard time zone information, current time information, location information, and the like of the first wireless communication device 100 to the server 300, and the second wireless communication device 200 may transmit the standard time zone information, the current time information, the location information, and the like of the second wireless communication device 200 to the server 300.

The server 300 may store the received time zone information of the first wireless communication device 100 and the received time zone information of the second wireless communication device 200 and compare pre-stored time zone information of the first wireless communication device 100 with the received time zone information of the first wireless communication device 100. When it is determined as a result of the comparison that the time zone information of the first wireless communication device 100 has changed, the server 300 may update and store the time zone information of the first wireless communication device 100. Similarly, when the time zone information of the second wireless communication device 200 has changed, the server 300 may update and store the time zone information of the second wireless communication device 200.

In operation S630, the server 300 may search for related wireless communication devices. The server 300 may search for the second wireless communication device 200 corresponding to identification information stored in the first wireless communication device 100 and may search for a wireless communication device of the second user who is included in the same social group together with the first wireless communication device 100 or the first user (i.e., the user of the first wireless communication device 100). For example, the server 300 may search for a wireless communication device of a second user of which telephone number has been registered in the contact information in the first wireless communication device 100 or a wireless communication device of a second user who has been registered as a social friend of the first user.

In operation S640, the server 300 may determine whether the time zone information of the found second wireless communication device 200 is different from that of the first wireless communication device 100, by comparing the time zone information of the found second wireless communication device 200 with that of the first wireless communication device 100.

For example, when the server 300 has received information about the standard time zones of the first wireless communication device 100 and the second wireless communication device 200, the server may determine whether the standard time zone of the first wireless communication device 100 is different from that of the second wireless communication device 200, by comparing them with each other. When the server 300 has received the current time information of the first wireless communication device 100 and the current time information of the second wireless communication device 200, the server 300 may determine whether the current time information of the first wireless communication device 100 is different from that of the second wireless communication device 200, by comparing them with each other. When the server 300 has received the location information of the first wireless communication device 100 and the location information of the second wireless communication device 200, the server 300 may determine whether the first wireless communication device 100 and the second wireless communication device 200 are located in the same standard time zone.

When the time zone information of the first wireless communication device 100 and the time zone information of the second wireless communication device 200 received by the server 300 are of different types, the server 300 may change the type of one of the time zone information of the first wireless communication device 100 and the time zone information of the second wireless communication device 200 to the type of the other time zone information and then may compare a result of the type change with the other time zone information.

For example, when the server 300 receives the standard time zone information of the first wireless communication device 100 and the current time information of the second wireless communication device 200, the server 300 may compare current time information of the first wireless communication device 100 calculated based on the standard time zone information of the first wireless communication device 100 with the current time information of the second wireless communication device 200. Alternatively, the server 300 may calculate standard time zone information of the second wireless communication device 200 based on the current time information of the second wireless communication device 200 and then compare the calculated standard time zone information of the second wireless communication device 200 with the standard time zone information of the first wireless communication device 100.

When it is determined in operation S640 that the time zone information of the first wireless communication device 100 is different from the time zone information of the second wireless communication device 200, the server 300 may transmit the time zone information of the second wireless communication device 200 to the first wireless communication device 100, in operation S650, and may transmit the time zone information of the first wireless communication device 100 to the second wireless communication device 200, in operation S660.

Accordingly, when the time zone information of the first wireless communication device 100 is different from the time zone information of the second wireless communication device 200, the first wireless communication device 100 and the second wireless communication device 200 related with the first wireless communication device 100 may automatically receive the different time zone information of opposite wireless communication devices thereof from the server 300.

Figure 7:
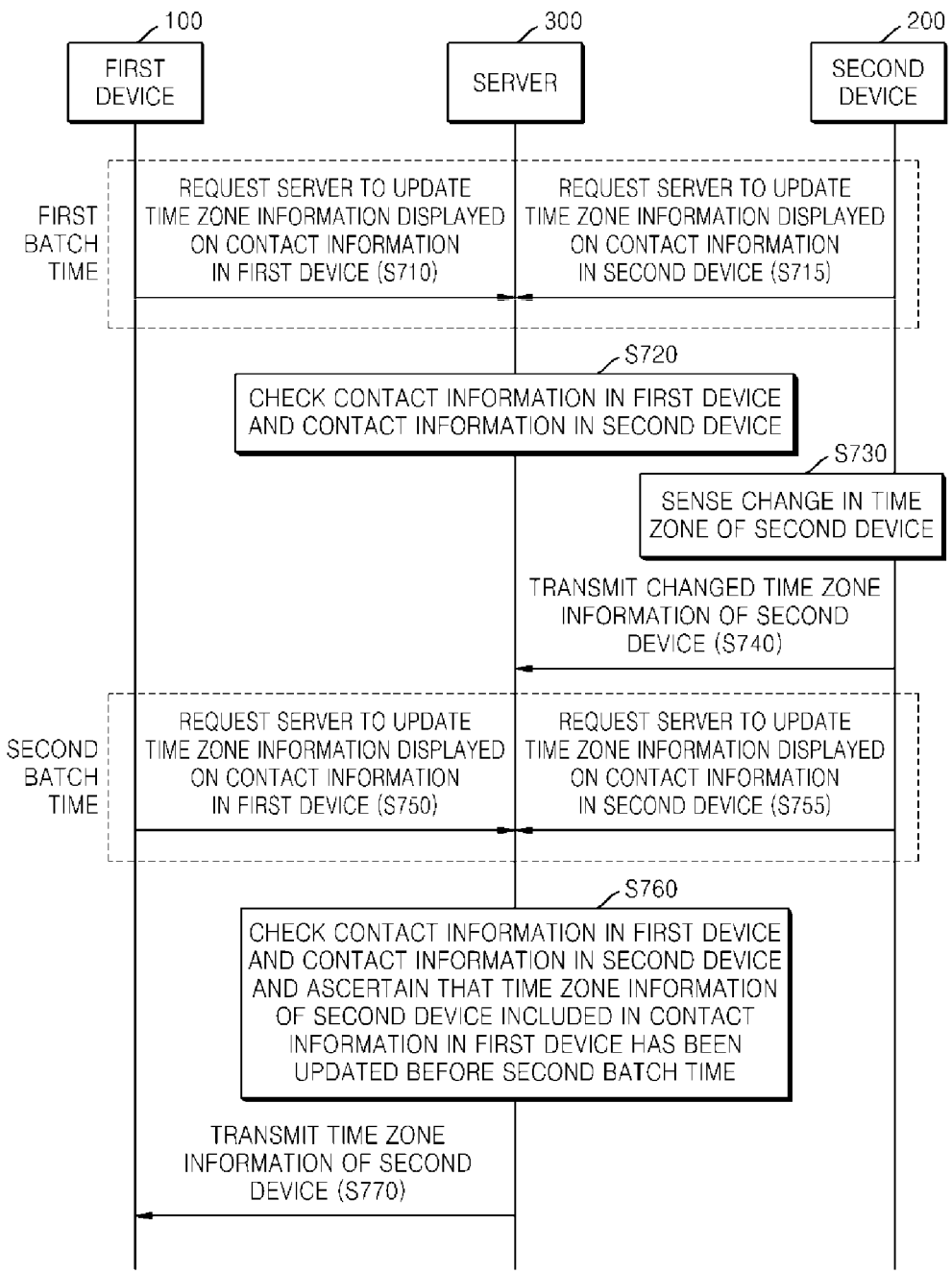
FIG. 7 is a flowchart of a method in which related wireless communication devices receive time zone information displayed on contact information in the related wireless communication devices in a batch manner, according to an exemplary embodiment.

FIG. 7 is a flowchart of a method in which related wireless communication devices receive time zone information displayed on contact information in the related wireless communication devices in a batch manner, according to an exemplary embodiment.

Referring to FIG. 7, the server 300 may be requested by the first wireless communication device 100 and the second wireless communication device 200 to update time zone information displayed on contact information in the first and second wireless communication devices 100 and 200 at a first batch time, respectively, in operations S710 and S715. A batch time may be the time during which the server 300 batch-processes updating of the contact information in wireless communication devices.

In operation S720, the server 300 may check the contact information in the first wireless communication device 100 and the contact information in the second wireless communication device 200 to determine whether any change exists. For example, the server 300 may search for a change in or an update on the contact information in the first wireless communication device 100 or the contact information in the second wireless communication device 200 before the first batch time.

When any change in or any update on the contact information in the first wireless communication device 100 before the first batch time is not found, the server 300 may not transmit update information for updating the contact information in the first wireless communication device 100 to the first wireless communication device 100. When any change in or any update on the contact information in the second wireless communication device 200 before the first batch time is not found, the server 300 may not transmit update information for updating the contact information in the second wireless communication device 200 to the second wireless communication device 200.

On the other hand, the second wireless communication device 200 may sense a change in the time zone of the second wireless communication device 200, in operation S730. In operation S740, the second wireless communication device 200 may transmit changed time zone information of the second wireless communication device 200 to the server 300.

In operations S750 and S755, the server 300 may receive contact information update requests from the first wireless communication device 100 and the second wireless communication device 200 at a second batch time, respectively.

In operation S760, the server 300 may check the contact information in the first wireless communication device 100 and the contact information in the second wireless communication device 200 to determine whether any change exists. For example, the server 300 may search for a change in or an update on the contact information in the first wireless communication device 100 or the contact information in the second wireless communication device 200 before the second batch time.

In this case, the server 300 may ascertain that the time zone information of the second wireless communication device 200 included in the contact information in the first wireless communication device 100 has been updated before the second batch time.

Accordingly, the server 300 may transmit the time zone information of the second wireless communication device 200 to the first wireless communication device 100, in operation S770. For example, because the time zone information of the second wireless communication device 200 included in the contact information in the first wireless communication device 100 has been updated before the second batch time, the server 300 may transmit update information including the time zone information of the second wireless communication device 200 to the first wireless communication device 100.

On the other hand, because any change in or any update on the contact information of the second wireless communication device 200 before the second batch time is not found, the server 300 may not transmit update information for updating the contact information in the second wireless communication device 200 to the second wireless communication device 200.

Figure 8:
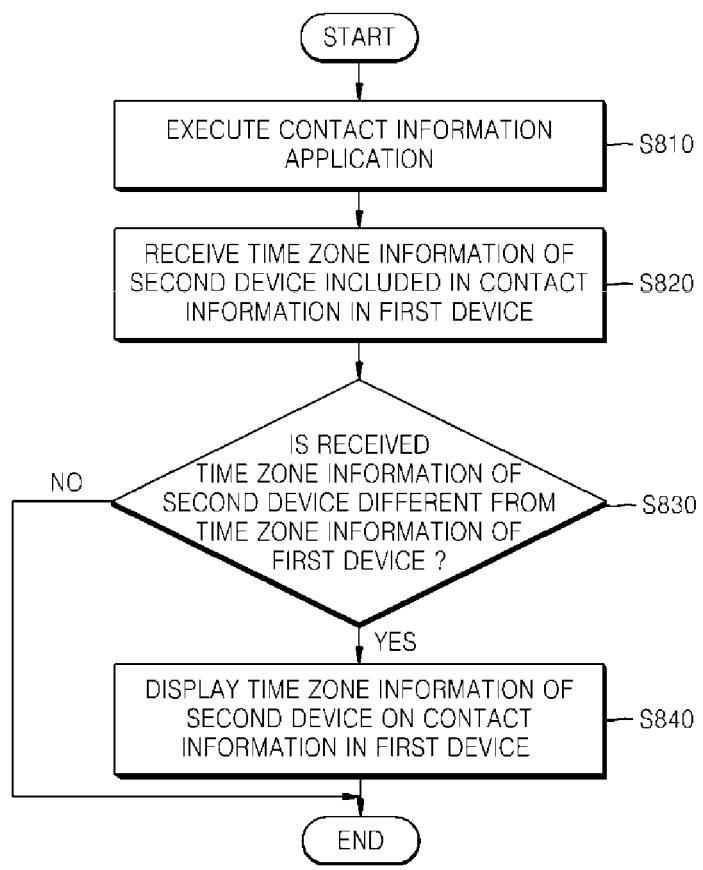
FIG. 8 is a flowchart of a method of displaying the time zone information of the second wireless communication device on the contact information in the first wireless communication device, according to an exemplary embodiment.

FIG. 8 is a flowchart of a method of displaying the time zone information of the second wireless communication device 200 on the contact information in the first wireless communication device 100, according to an exemplary embodiment.

Referring to FIG. 8, the first wireless communication device 100 may execute a contact information application, in operation S810. For example, the first wireless communication device 100 may execute the contact information application in response to a request from a user to execute the contact information application.

In operation S820, the first wireless communication device 100 may receive the time zone information of the second wireless communication device 200 included in the contact information in the first wireless communication device 100. For example, the first wireless communication device 100 may receive the time zone information of the second wireless communication device 200 included in the contact information in the first wireless communication device 100 from the server 300 by requesting the server 300 for the time zone information of the second wireless communication device 200. In this case, the first wireless communication device 100 may request time zone information of all wireless communication devices included in the contact information therein, or may select at least one of the wireless communication devices included in the contact information therein and request time zone information of the at least one selected wireless communication device.

In operation S830, the first wireless communication device 100 may determine whether the received time zone information of the second wireless communication device 200 is different from the time zone information of the first wireless communication device 100.

When it is determined that the received time zone information of the second wireless communication device 200 is different from the time zone information of the first wireless communication device 100, the first wireless communication device 100 may display the time zone information of the second wireless communication device 200 on the contact information in the first wireless communication device 100, in operation S840. For example, the first wireless communication device 100 may display the time zone information of the second wireless communication device 200 around the identification information of the second wireless communication device 200 (for example, the name, nickname, telephone number, e-mail address, photograph, shortcut number, or the like of the second user) included in a contact information screen of the first wireless communication device 100. The time zone information of the second wireless communication device 200 may be expressed as standard time zone information, current time information, location information, or the like, but is not limited thereto. The time zone information of the second wireless communication device 200 may be expressed in various ways. This will be described in greater detail later with reference to FIGS. 14A-14D.

As described above, the time zone information of the second wireless communication device 200 located at a different time zone from that of the first wireless communication device 100 may be displayed on the contact information screen of the first wireless communication device 100 so that the user of the first wireless communication device 100 may check the time zone information of the user of the second wireless communication device 200 before making a call or sending a message to the user of the second wireless communication device 200 and thus may determine whether to make a call or send a message to the user of the second wireless communication device 200. Alternatively, the wireless communication device 100 may check the time zone information upon launch of an application that refers to the time zone information.

Figure 9:
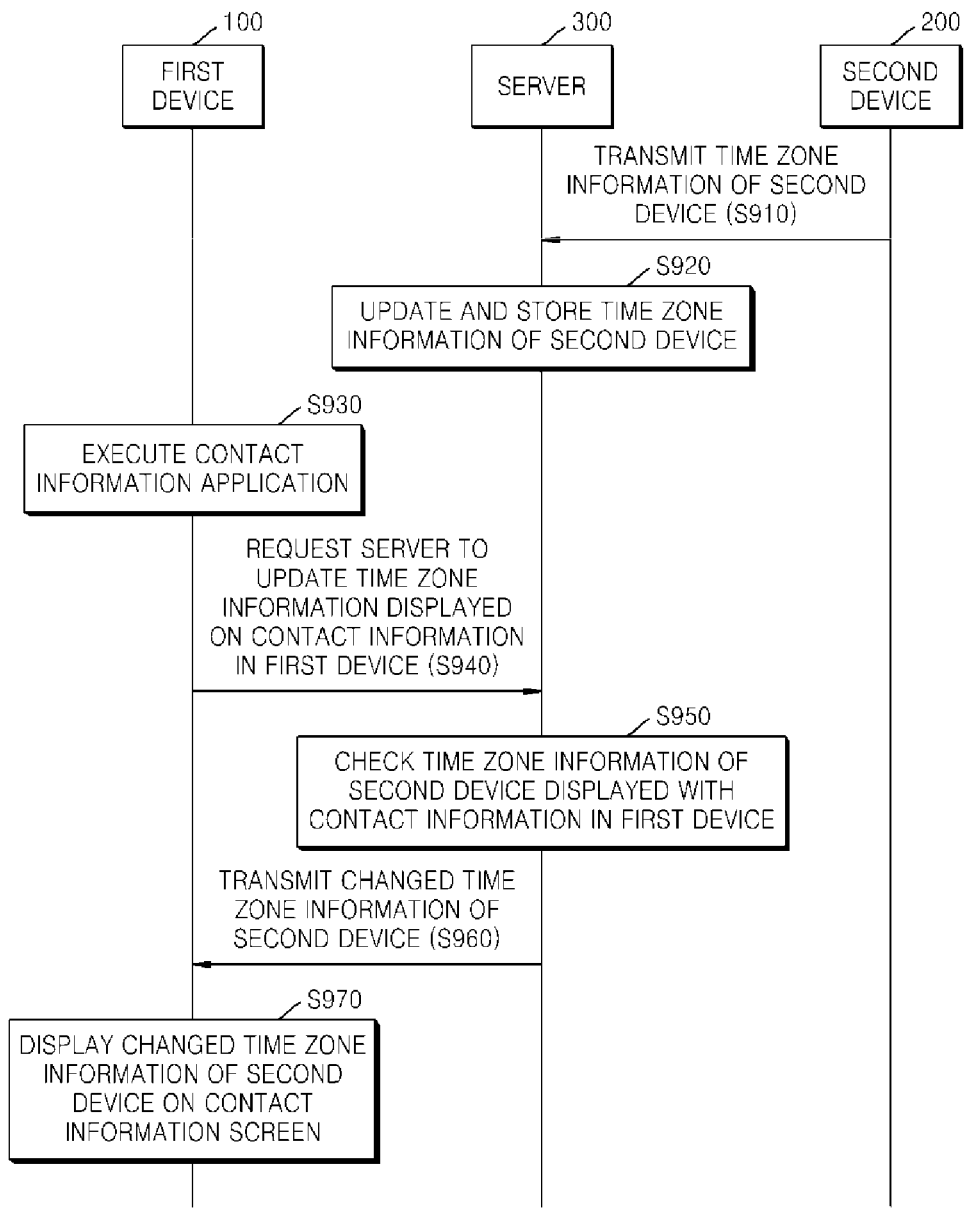
FIG. 9 is a flowchart of a method of updating and displaying time zone information while a contact information application is being executed, according to an exemplary embodiment.

FIG. 9 is a flowchart of a method of updating and displaying time zone information while a contact information application is being executed, according to an exemplary embodiment.

Referring to FIG. 9, the second wireless communication device 200 may transmit the time zone information of the second wireless communication device 200 to the server 300, in operation S910. Because operation S910 of FIG. 9 corresponds to operation S410 of FIG. 4, a repeated description thereof will be omitted.

In operation S920, the server 300 may compare pre-stored time zone information of the second wireless communication device 200 with the received time zone information of the second wireless communication device 200, and may update and store the time zone information of the second wireless communication device 200 when it is determined as a result of the comparison that the time zone information of the second wireless communication device 200 has changed.

In operation S930, the first wireless communication device 100 may execute a contact information application based on a user input. In operation S940, the first wireless communication device 100 may request the server 300 to update the time zone information displayed on the contact information in the first wireless communication device 100. The first wireless communication device 100 according to an exemplary embodiment may automatically transmit a time zone information update request to the server 300 when the contact information application is executed. Alternatively, when the contact information application is executed, the first wireless communication device 100 may transmit the time zone information update request to the server 300, based on a user input. This will now be described in greater detail with reference to FIGS. 10A and 10B.

Figure 10B:
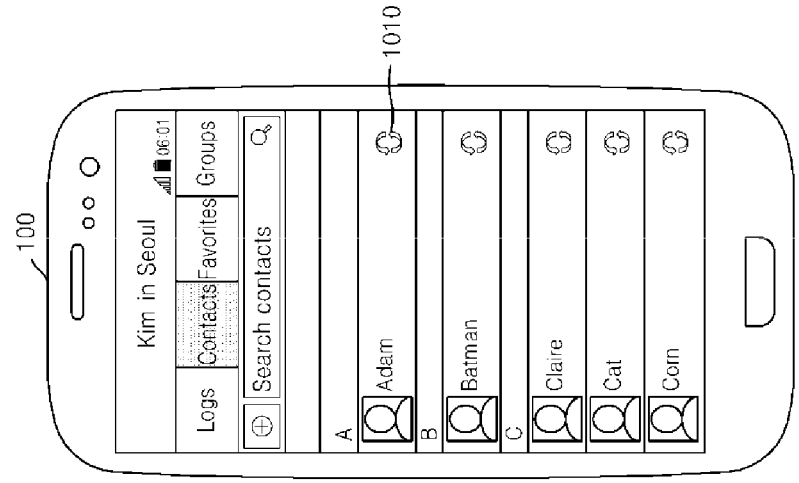
FIGS. 10A-10B are contact information application execution screens according to an exemplary embodiment.
Figure 10A:
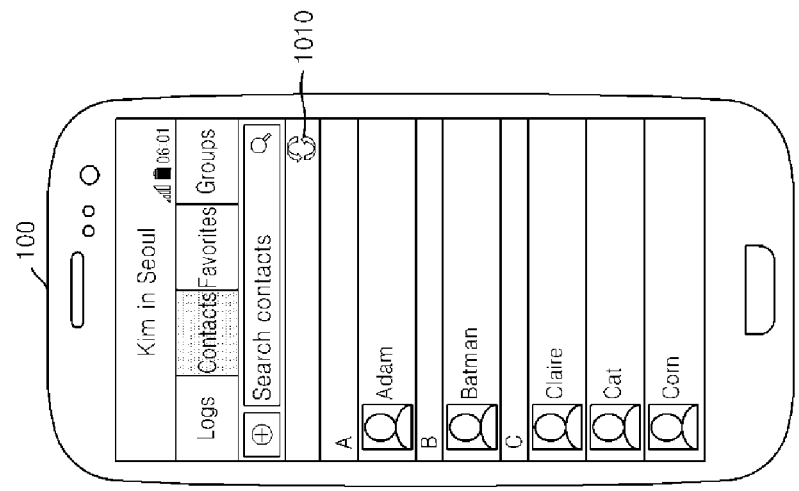

FIGS. 10A and 10B illustrate a contact information application execution screen (i.e., a contact information screen). Referring to FIGS. 10A and 10B, the contact information screen may include a list of users whose contact information is stored. The first wireless communication device 100 may display an update request icon 1010 together with the list on the contact information screen.

For example, in the case of FIG. 10A, when the first wireless communication device 100 displays only one update request icon 1010 and the update request icon 1010 is selected, the first wireless communication device 100 may request the server 300 to update the time zone information of wireless communication devices corresponding to all wireless communication devices stored in the contact information in the first wireless communication device 100.

On the other hand, in the case of FIG. 10B, when the first wireless communication device 100 displays an update request icon 1010 for each of the users listed on the contact information and at least one of the update request icons 1010 is selected, the first wireless communication device 100 may request the server 300 to update the time zone information of a user wireless communication device corresponding to the selected icon.

Alternatively, although not shown, when no icons are displayed and a user is selected from the list of users stored on the contact information, the first wireless communication device 100 may request the server 300 to update the time zone information of a wireless communication device of the selected user.

The above-described embodiments are only examples, and the first wireless communication device 100 may transmit the time zone information update request to the server 300 based on various other user inputs. As discussed above, however, the wireless communication device 100 may automatically update time zone information without user input, for example based on an application setting or by software design.

Referring back to FIG. 9, in operation S950, the server 300 may check the time zone information of the second wireless communication device 200 displayed with the contact information in the first wireless communication device 100, in response to the time zone information update request from the first wireless communication device 100. For example, when the first wireless communication device 100 requests time zone information of all users stored in the contact information therein or requests the time zone information of the user of the second wireless communication device 200, the server 300 may determine whether the time zone information of the second wireless communication device 200 has changed.

For example, the server may compare time zone information of the second wireless communication device 200 included in the contact information in the first wireless communication device 100 with time zone information of the second wireless communication device 200 pre-stored in the server 300 to thereby determine whether the time zone information of the second wireless communication device 200 included in the contact information in the first wireless communication device 100 has changed.

When the time zone information of the second wireless communication device 200 included in the contact information in the first wireless communication device 100 has changed, the server 300 may transmit changed time zone information of the second wireless communication device 200 to the first wireless communication device 100, in operation S960. On the other hand, when the time zone information of the second wireless communication device 200 included in the contact information in the first wireless communication device 100 has not changed, the server 300 may not transmit the time zone information of the second wireless communication device 200 to the first wireless communication device 100.

In operation S970, the first wireless communication device 100 may receive the changed time zone information of the second wireless communication device 200 from the server 300 and display the changed time zone information of the second wireless communication device 200 on the contact information screen. A method of displaying the time zone information of the second wireless communication device 200 will be described later in detail with reference to FIGS. 14A-14D.

FIGS. 11A-14D illustrate an example in which time zone information of a second wireless communication device is displayed on the contact information in the first wireless communication device 100.

FIGS. 11A and 11B illustrate an example of a contact information screen that is displayed according to whether the time zone information of the second wireless communication device is equal to or different from the time zone information of the first wireless communication device 100.

As illustrated in FIG. 11A, when a contact information application is executed, the first wireless communication device 100 may display a contact information screen including a list of contact information stored in the contact information in the first wireless communication device 100. The displayed contact information screen may include an update request icon 1110 for updating time zone information corresponding to the contact information listed in the contact information in the first wireless communication device 100.

When the user of the first wireless communication device 100 (i.e., the first user) selects the update request icon 1110, the first wireless communication device 100 may receive time zone information of wireless communication devices corresponding to the listed contact information. As illustrated in FIG. 11B, the first wireless communication device 100 may divide the wireless communication devices corresponding to the of contact information (i.e., second wireless communication devices) into wireless communication devices 1120 of which time zone information is equal to that of the first wireless communication device 100 and wireless communication devices 1130 of which time zone information is different from that of the first wireless communication device 100, and display the wireless communication devices 1120 and 1130.

The first wireless communication device 100 may also display time zone information 1140 of each wireless communication device of which time zone information is different from that of the first wireless communication device 100.

Alternatively, the wireless communication devices may be displayed according to an order of time zone information. For example, wireless communication devices may be displayed according to an increasing or decreasing offset from the time zone information of the wireless communication device 100, or from a base time zone, such as Greenwich mean time.

Accordingly, the first user may easily ascertain wireless communication devices having the same time zone information as that of the first wireless communication device 100 and wireless communication devices having different time zone information from that of the first wireless communication device 100.

Figure 12B:
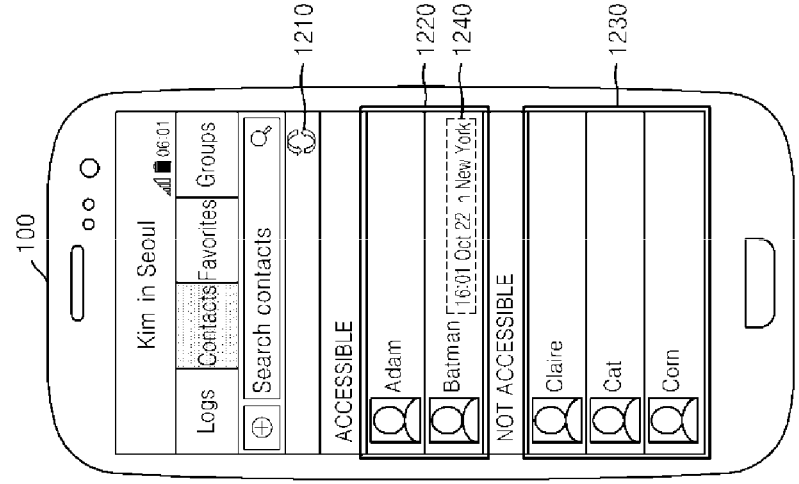
FIGS. 12A and 12B illustrate a contact information screen that is displayed according to whether the time zone information of the second wireless communication device is made accessible, according to an exemplary embodiment.
Figure 12A:
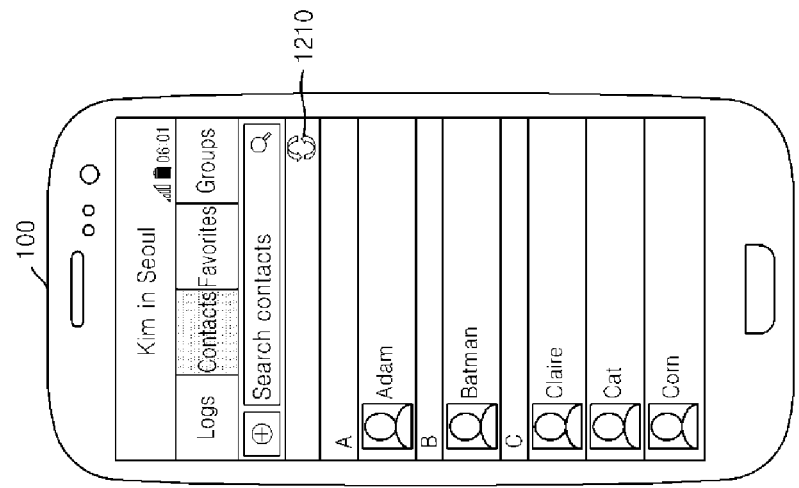

FIGS. 12A and 12B illustrate an example of a contact information screen that is displayed according to whether the time zone information of a second wireless communication device is made accessible.

As illustrated in FIG. 12A, when the contact information application is executed, the first wireless communication device 100 may display a contact information screen including a contact information list of contact information stored in the contact information in the first wireless communication device 100. The displayed contact information screen may include an update request icon 1210 for updating time zone information corresponding to the contact information listed in the contact information in the first wireless communication device 100.

When the user of the first wireless communication device 100 (i.e., the first user) selects the update request icon 1210, the first wireless communication device 100 may receive time zone information of wireless communication devices corresponding to the listed contact information. As illustrated in FIG. 12B, the first wireless communication device 100 may divide the wireless communication devices corresponding to the listed contact information into wireless communication devices 1220 of which time zone information is made accessible and wireless communication devices 1230 of which time zone information is made inaccessible, and display the wireless communication devices 1220 and 1230.

When the time zone information of a wireless communication device that is made accessible is different from that of the first wireless communication device 100, time zone information 1240 corresponding to the time zone information of the wireless communication device that is made accessible may be displayed.

Accordingly, the first user may easily ascertain wireless communication devices of which time zone information is made accessible and wireless communication devices of which time zone information is made inaccessible.

Figure 13A:
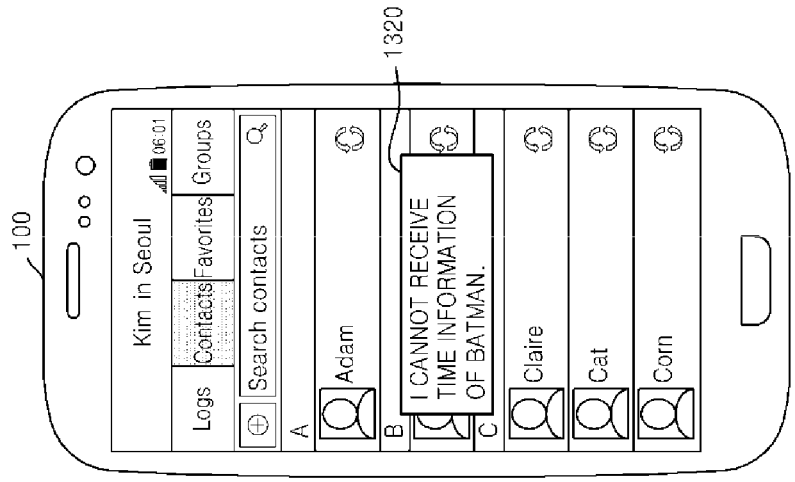
FIGS. 13A and 13B illustrate a screen that is displayed when the second wireless communication device sets time zone information thereof to be inaccessible, according to an exemplary embodiment.
Figure 13B:
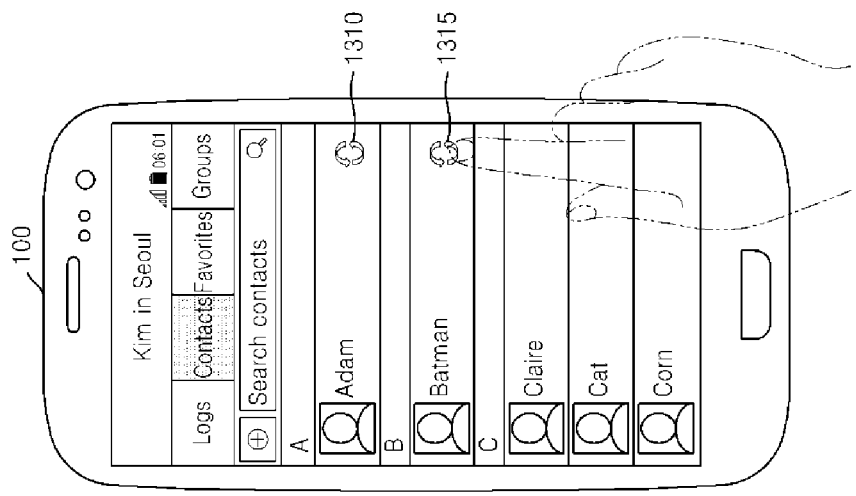

FIGS. 13A and 13B illustrate an example of a screen that is displayed when a second wireless communication device sets time zone information thereof to be inaccessible.

As illustrated in FIG. 13A, when the contact information application is executed, the first wireless communication device 100 may display a contact information screen including a contact information list of contact information stored in the contact information in the first wireless communication device 100. The displayed contact information screen may include time zone information update request icons 1310 and 1315 respectively corresponding to contact information listed in the contact information in the first wireless communication device 100.

In this case, when one is selected from a plurality of time zone information update request icons, the first wireless communication device 100 may receive the time zone information of a user wireless communication device corresponding to the selected time zone information update request icon. For example, when the time zone information update request icon 1310, corresponding to contact information referred to as 'Adam', is selected, the first wireless communication device 100 may receive the time zone information of a wireless communication device of a user 'Adam' from the server 300.

When the time zone information of a user wireless communication device corresponding to a selected time zone information update request icon is set to be inaccessible, the first wireless communication device 100 may display a message indicating that the time information of the user wireless communication device corresponding to the selected time zone information update request icon cannot be received.

For example, when the time zone information update request icon 1315, corresponding to contact information referred to as 'Batman', is selected and a user 'Batman' sets the time zone information of his or her wireless communication device to be inaccessible, a message 1320 saying 'I cannot receive time information of Batman' may be displayed, as illustrated in FIG. 13B.

FIGS. 14A-14D illustrate an example in which the time zone information of a second wireless communication device is displayed on the contact information screen of the first wireless communication device 100.

The first wireless communication device 100 may display, on the contact information screen of the first wireless communication device 100, the time zone information of the second wireless communication device 200 located at a different time zone from that of the first wireless communication device 100.

Figure 14A:
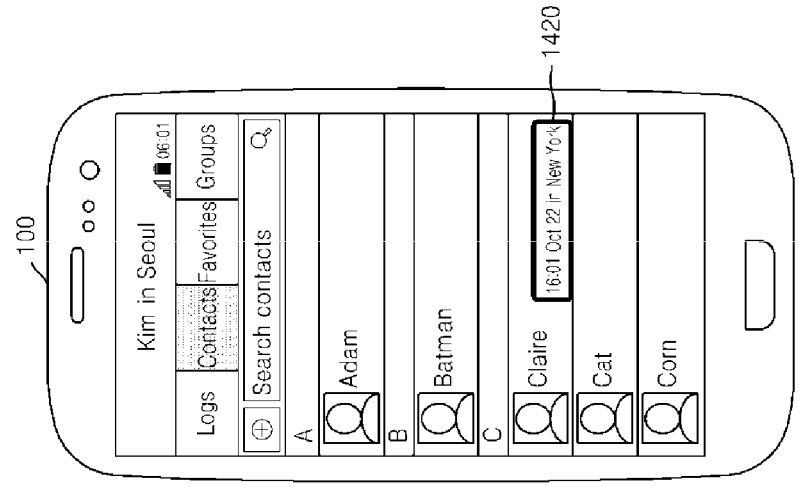
FIGS. 14A-14D illustrate an example in which the time zone information of the second wireless communication device is displayed on a contact information screen of the first wireless communication device, according to an exemplary embodiment.

For example, as illustrated in FIG. 14A, the first wireless communication device 100 may display current time information 1410 (for example, 16:01) of the second wireless communication device 200 in an area on the contact information screen on which the name of a user (for example, Claire) of the second wireless communication device 200 is displayed. Accordingly, the user of the first wireless communication device 100 may ascertain the current time information of a place where the second wireless communication device 200 of the second user is located.

Figure 14B:
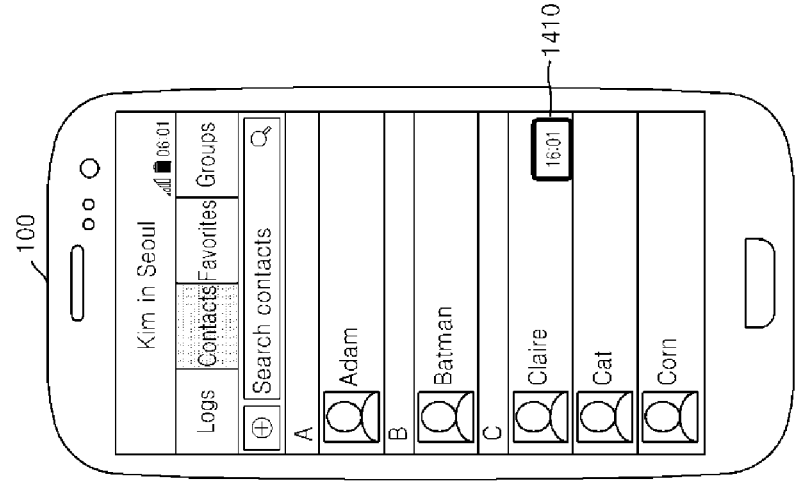

Alternatively, as illustrated in FIG. 14B, the first wireless communication device 100 may display information 1420 including both location information, for example, 'New York' of the second wireless communication device 200 and current time information, for example, 16:01, of the second wireless communication device 200, within an area on the contact information screen on which the name of a user (for example, Claire) of the second wireless communication device 200 is displayed.

Accordingly, the user of the first wireless communication device 100 may ascertain both the location of a wireless communication device of a second user (for example, Claire) and the current time information of a place where the wireless communication device of the second user is located.

Figure 14C:
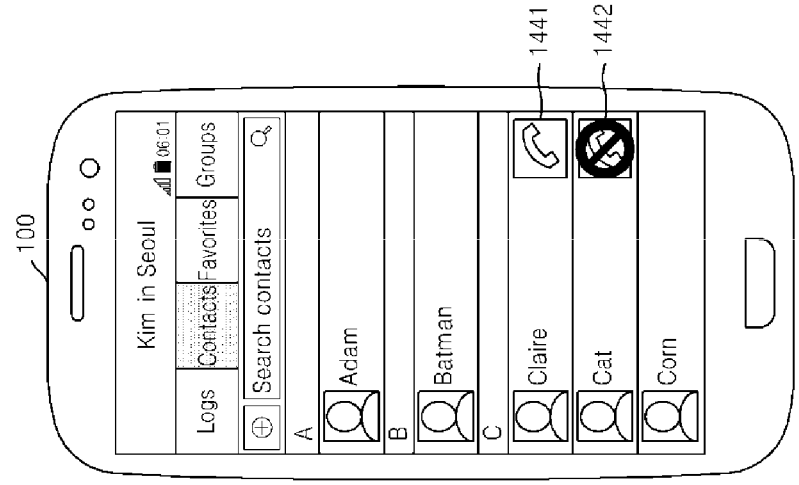
Figure 14D:
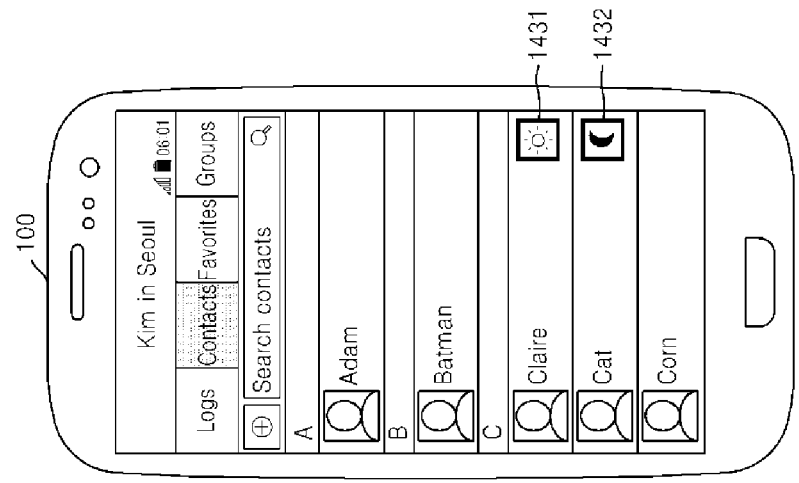

Alternatively, as illustrated in FIGS. 14C and 14D, the first wireless communication device 100 may display a brief information icon indicating the time zone information of the second wireless communication device 200 or a brief information icon indicating whether the user of the second wireless communication device 200 is available for a call.

For example, the first wireless communication device 100 may display brief information icons 1431 and 1432 briefly indicating the time zone information of the second wireless communication device 200 within an area on the contact information screen on which the name of a user (for example, Claire or Cat) of the second wireless communication device 200 is displayed. The brief information icons 1431 and 1432 may be icons from which it is only checked whether the time of a region where the second wireless communication device 200 is located is a.m./p.m. or the morning/afternoon/night.

For example, as illustrated in FIG. 14C, the first wireless communication device 100 may display a brief information icon 1431 on which a Sun is displayed, in an area on the contact information screen on which the name of a user (for example, Claire) of the second wireless communication device 200 is displayed. The brief information icon 1431 on which a Sun is displayed may indicate that the second wireless communication device 200 is located in a region where it is daytime.

The first wireless communication device 100 may also display a brief information icon 1432 on which a Moon is displayed, in an area on the contact information screen on which the name of a user (for example, Cat) of a third wireless communication device is displayed. The brief information icon 1432 on which a Moon is displayed may indicate that the third wireless communication device is located in a region where it is nighttime.

Alternatively, the first wireless communication device 100 may display icons 1441 and 1442 indicating whether a user of the second wireless communication device 200 (for example, Claire or Cat) is available for a call, within an area on the contact information screen on which the name of the user (for example, Claire or Cat) of the second wireless communication device 200 is displayed.

For example, as illustrated in FIG. 14D, when the user of the second wireless communication device 200 (for example, Claire) is available for a call, the icon 1441 may have an image indicating that a user is available for a call. When the user of the third wireless communication device (for example, Cat) is not available for a call, the icon 1442 may have an image indicating that a user is not available for a call.

Accordingly, when the user of the second wireless communication device 200 does not want to make detailed time information or location information thereof accessible, the time zone information of the second wireless communication device 200 or whether the second user is available for a call may be indicated by the brief information icons 1431, 1432, 1441, and 1442 as described above so that the privacy and personal information of the user of the second wireless communication device 200 may be protected.

What type of information is used as the time zone information of the second wireless communication device 200 displayed on the first wireless communication device 100 may be set by the first wireless communication device 100 or the second wireless communication device 200. For example, when the first wireless communication device 100 sets the time zone information of the second wireless communication device 200 to be displayed as current time information, the first wireless communication device 100 may display the time zone information of the second wireless communication device 200 as current time information. When the second wireless communication device 200 sets the time zone information thereof to be displayed as brief information, the first wireless communication device 100 may display the time zone information of the second wireless communication device 200 as brief information.

The first wireless communication device 100 according to an exemplary embodiment provides a contact information screen on which time zone information of a second wireless communication device located at a different time zone from that of the first wireless communication device 100 is displayed, in order to easily ascertain the second wireless communication device and prevent a call from being made to the user of the second wireless communication device 200 in a time zone when the user of the second wireless communication device 200 is hard to receive a call.

Figure 15:
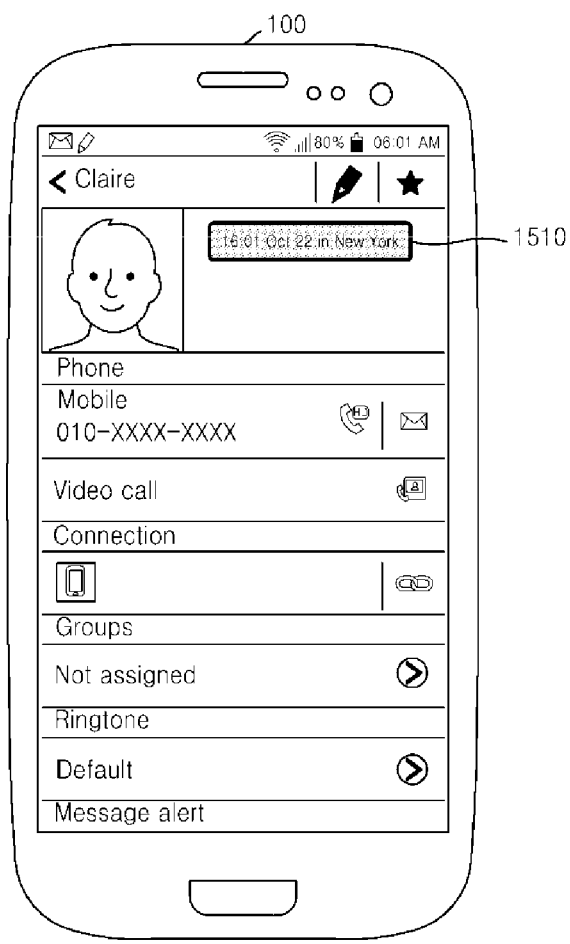
FIG. 15 illustrates an example in which the time zone information of the second wireless communication device is displayed on a contact information detailed information providing screen of the first wireless communication device, according to an exemplary embodiment.

FIG. 15 illustrates an example in which the time zone information of a second wireless communication device is displayed in a contact information detailed information provision screen of the first wireless communication device 100.

As illustrated in FIG. 15, the first wireless communication device 100 according to an exemplary embodiment may display the time zone information of a friend located at a different time zone from that of the first wireless communication device 100, in an area on the contact information in the first wireless communication device 100 that provides detailed information about the friend.

For example, when the first user selects the second user from among users listed on contact information in the first wireless communication device 100, the first wireless communication device 100 may display a detailed information screen including detailed information about the second user. The detailed information screen may include the identification information of the second wireless communication device (for example, the name, nickname, telephone number, e-mail address, photograph, shortcut number, and the like of the second user).

The first wireless communication device 100 may display time zone information 1510 of the second user on the detailed information screen including the detailed information about the second user.

According to an exemplary embodiment, the first user may easily ascertain second users located at different time zones from that of the first user, from the detailed information screen of the contact information in the first user. Thus, calling the second user when the second user is unable to receive a call may be prevented.

Figure 16:
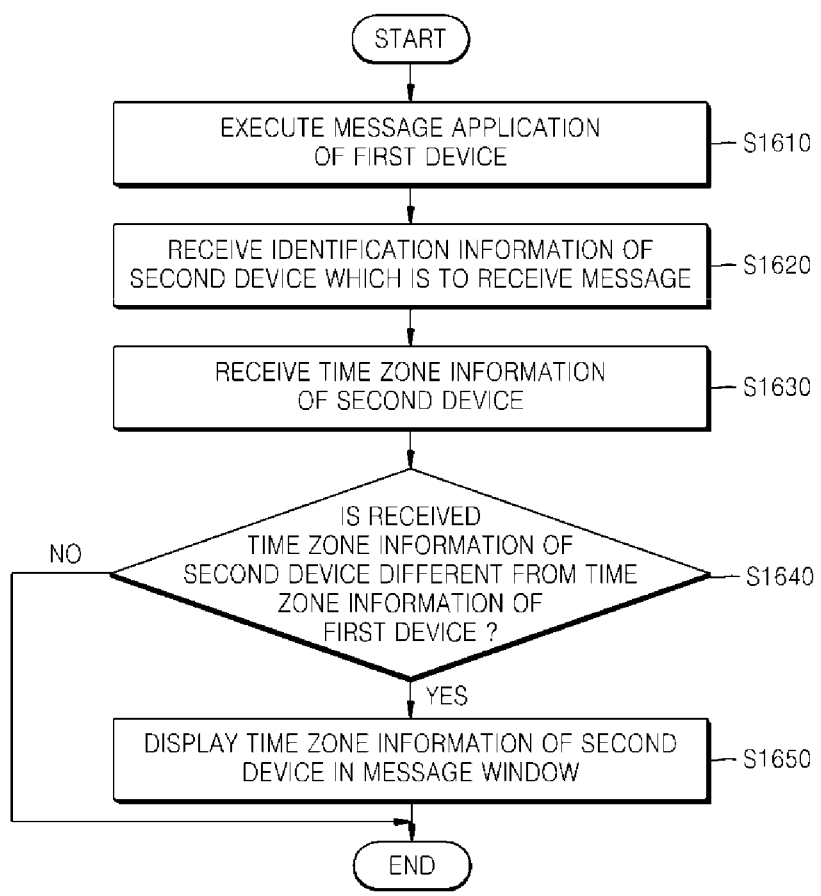
FIG. 16 is a flowchart of a method of displaying the time zone information of the second wireless communication device in a message window of the first wireless communication device, according to an exemplary embodiment.

FIG. 16 is a flowchart of a method of displaying the time zone information of the second wireless communication device 200 in a message window of the first wireless communication device 100, according to an exemplary embodiment.

Referring to FIG. 16, the first wireless communication device 100 may execute a message application, in operation S1610.

When the message application is executed, the first wireless communication device 100 may receive the identification information of the second wireless communication device 200 which is to receive a message, in operation S1620.

For example, when the user of the first wireless communication device 100 (i.e., the first user) intends to transmit a message to the user of the second wireless communication device 200 (i.e., the second user), the first user may directly input identification information of the second wireless communication device 200 (for example, the name, nick name, telephone number, e-mail address, photograph, or shortcut number of the second user) to the message window or may select identification information of the second wireless communication device 200 from a list (for example, contact information in the first wireless communication device 100) including pieces of identification information of the second wireless communication device 200.

In operation S1630, the first wireless communication device 100 may receive the time zone information of the second wireless communication device 200 based on the identification information of the second wireless communication device 200.

For example, the first wireless communication device 100 may extract the time zone information of the second wireless communication device 200 included in the contact information in the first wireless communication device 100, by using the identification information of the second wireless communication device 200. Alternatively, the first wireless communication device 100 may transmit the identification information of the second wireless communication device 200 to the server 300, request the server 300 for the time zone information of the second wireless communication device 200, and receive the time zone information of the second wireless communication device 200 from the server 300.

In operation S1640, the first wireless communication device 100 may determine whether the received time zone information of the second wireless communication device 200 is different from the time zone information of the first wireless communication device 100.

For example, the first wireless communication device 100 may compare the standard time zone information, the current time information, the location information, or the like of the first wireless communication device 100 with the standard time zone information, the current time information, the location information, or the like of the second wireless communication device 200 to determine whether the time zone information of the second wireless communication device 200 is different from the time zone information of the first wireless communication device 100.

When it is determined that the received time zone information of the second wireless communication device 200 is different from the time zone information of the first wireless communication device 100, the first wireless communication device 100 may display the time zone information of the second wireless communication device 200 in the message window, in operation S1650.

For example, the first wireless communication device 100 may display the time zone information of the second wireless communication device 200 based on at least one selected from a message input region and a message display region included in the message window. The message input region may be a region via which a message desired to be sent is input, and the message display region may be a region on which a sent or received message is displayed.

The first wireless communication device 100 according to an exemplary embodiment displays the time zone information of the second wireless communication device 200 before the user of the first wireless communication device 100 sends a message to the user of the second wireless communication device 200, whereby the first user may ascertain in advance whether the second user is able to receive the message.

Figure 17A:
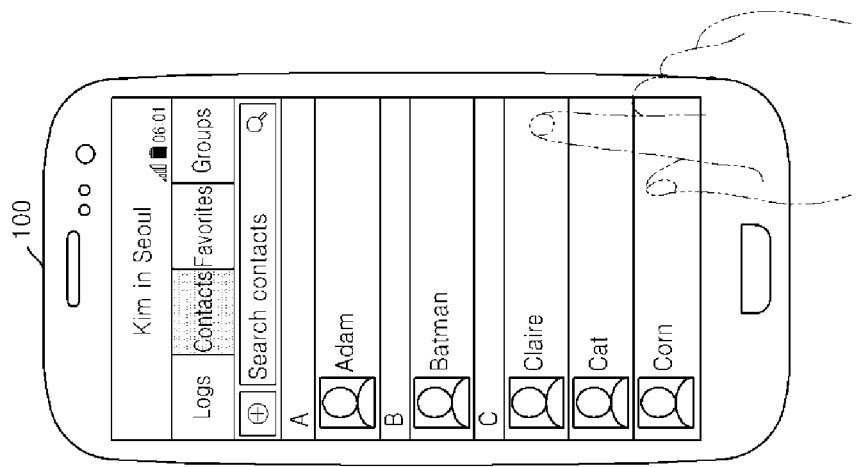
FIGS. 17A, 17B, and 18 illustrate an example in which the time zone information of the second wireless communication device is displayed in the message window of the first wireless communication device, according to an exemplary embodiment.
Figure 17B:
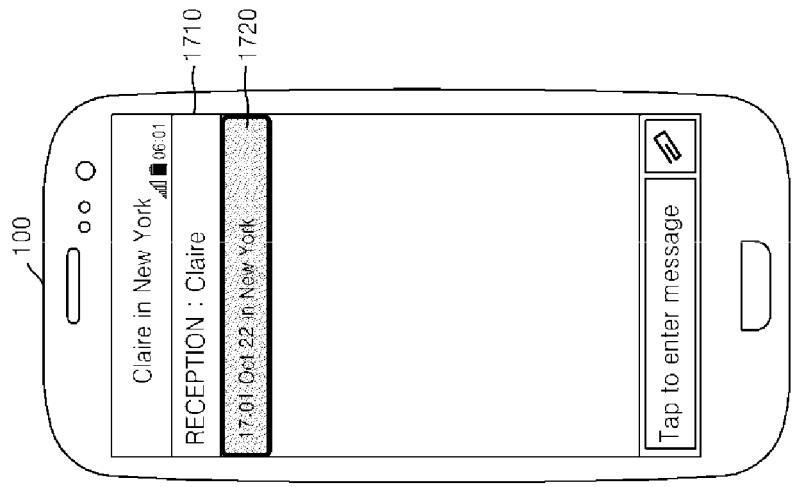
Figure 18:
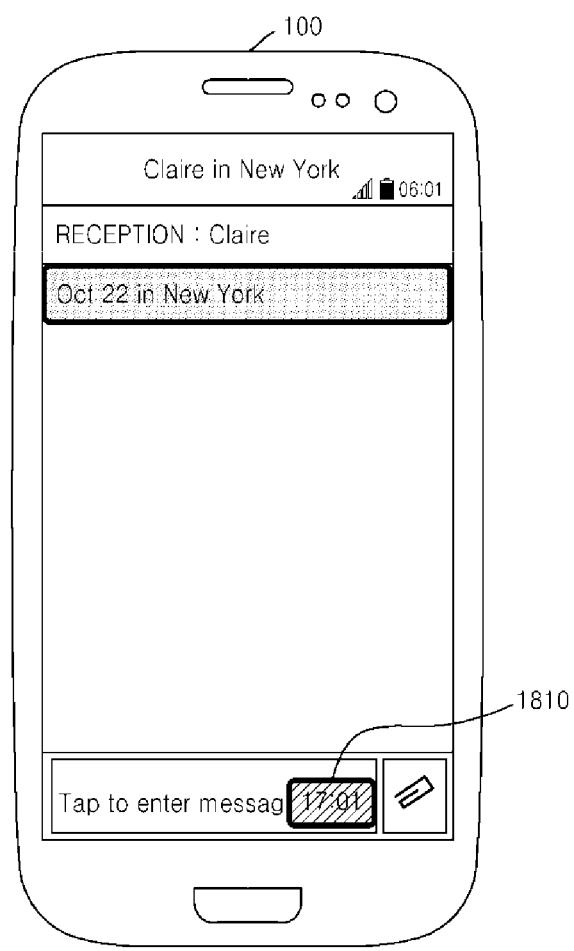

FIGS. 17A, 17B, and 18 illustrate an example in which the time zone information of the second wireless communication device 200 is displayed in the message window of the first wireless communication device 100, according to an exemplary embodiment.

As illustrated in FIG. 17A, the user of the first wireless communication device 100 may select the identification information of the second wireless communication device 200 which is to receive a message. For example, the name of the user of the second wireless communication device 200 (for example, Claire) may be selected from the contact information list stored in the first wireless communication device 100.

When the name of the user of the second wireless communication device 200, i.e., Claire, is selected, the first wireless communication device 100 may display a message window 1710 for performing message exchange with the second user. The first wireless communication device 100 may request the server 300 for the time zone information of the second wireless communication device 200 and receive the time zone information of the second wireless communication device 200 from the server 300, based on the selected name of the user of the second wireless communication device 200. Alternatively, the first wireless communication device 100 may extract the time zone information of the second wireless communication device 200 stored in the contact information in the first wireless communication device 100.

When the time zone information of the second wireless communication device 200 is different from the time zone information of the first wireless communication device 100, as illustrated in FIG. 17B, the first wireless communication device 100 may display time zone information 1720 of the second wireless communication device 200 below an area on the message window 1710 on which the name of the second user is displayed. The time zone information of the second wireless communication device 200 may be the standard time zone information, the current time information, the location information, or the like of the second wireless communication device 200, but is not limited thereto.

Alternatively, as illustrated in FIG. 18, the time zone information of the second wireless communication device 200 received from the server 300 or extracted from the contact information may be displayed on a plurality of areas on the message window 1710. For example, the first wireless communication device 100 may display a data included in the time zone information of the second wireless communication device 200 (for example, October 22) and the location information (for example, New York) thereof below the area on which the name of the second user is displayed, and may display a current time 1810 (for example, 17:01) included in the time zone information in a message input region.

As such, the first wireless communication device 100 displays the time zone information of the second wireless communication device 200 in the message window so that the user of the first wireless communication device 100 may check the time zone information of the second wireless communication device 200 before sending a message to the user of the second wireless communication device 200, whereby the user of the first wireless communication device 100 may ascertain in advance whether the user of the second wireless communication device 200 is able to receive the message.

Figure 19A:
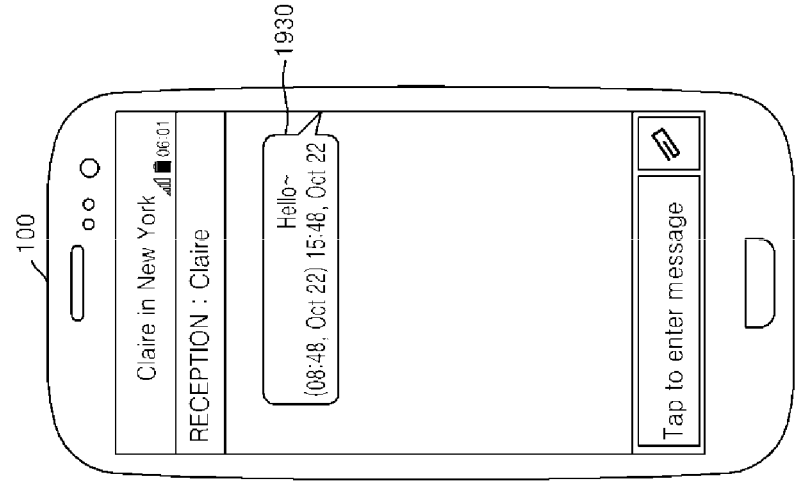
FIGS. 19A and 19B illustrate an example of displaying the time zone information of the second wireless communication device in the message window of the first wireless communication device, according to an exemplary embodiment.
Figure 19B:
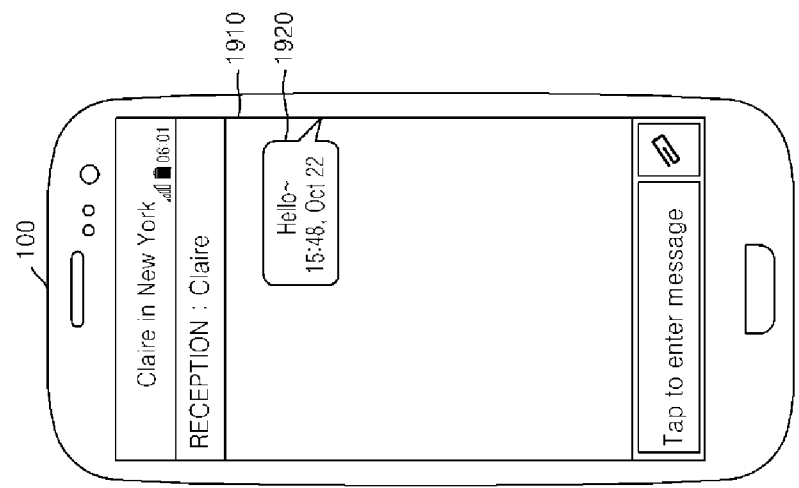

FIGS. 19A and 19B illustrate an example of displaying the time zone information of the second wireless communication device 200 in the message window of the first wireless communication device 100, according to an exemplary embodiment.

In FIGS. 19A and 19B, a case where the user of the first wireless communication device 100 (i.e., the first user) transmits a message to the user of the second wireless communication device 200 (i.e., the second user, for example, Claire) located at a different time zone from that of the first wireless communication device 100 is illustrated.

As illustrated in FIG. 19A, the first user may transmit a first message 1920 saying "Hello" to the second user. The first message 1920 may be displayed in a message display region 1910, together with a first message sent time.

As illustrated in FIG. 19A, the first wireless communication device 100 according to an exemplary embodiment may display the time when the first message 1920 is sent, based on the time zone of the second wireless communication device 200. The first wireless communication device 100 may display the standard time zone information, the current time information, the location information, brief information, and the like of the second wireless communication device 200 in the first message 1920.

For example, when the time when the first user sent the first message 1920 is '08:48' (i.e., a first message sent time based on the time zone information of the first wireless communication device 100) and a first message sent time based on the time zone information of the second wireless communication device 200 is '15:48', the first wireless communication device 100 may display '15:48' in the first message 1920.

Alternatively, as illustrated in FIG. 19B, the first wireless communication device 100 may display both a message sent time based on the time zone information of the first wireless communication device 100 and a message sent time based on the time zone information of the second wireless communication device 200.

For example, the first wireless communication device 100 may display both '08:48' (i.e., the first message sent time based on the time zone information of the first wireless communication device 100) and '15:48' (i.e., the first message sent time based on the time zone information of the second wireless communication device 200) in a first message 1930. The first wireless communication device 100 may display a message sent time and message received time based on the first wireless communication device 100 and a message sent time and message received time based on the second wireless communication device 200 in different colors so that they may be distinguished from each other.

Figure 20:
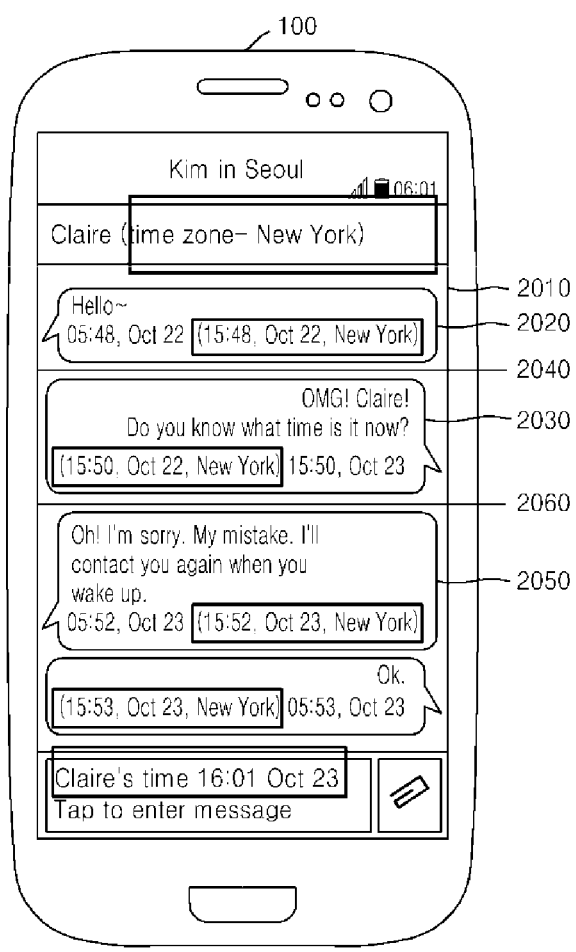
FIG. 20 illustrates a message window displayed on the first wireless communication device during message exchange between the first and second wireless communication devices, according to an exemplary embodiment.

FIG. 20 illustrates a message window displayed on the first wireless communication device 100 during message exchange between the first and second wireless communication devices 100 and 200, according to an exemplary embodiment.

As illustrated in FIG. 20, the first wireless communication device 100 may display time zones at which a plurality of messages were sent or received, within a plurality of message regions (i.e., regions where sent or received messages are respectively displayed) included in a message display region 2010, respectively.

In addition, as illustrated in FIG. 19B, the first wireless communication device 100 may display a message sent time and a message received time based on the time zone information of the first wireless communication device 100 and a message sent time and a message received time based on the time zone information of the second wireless communication device 200 together. However, exemplary embodiments are not limited thereto.

The first wireless communication device 100 may display a date division line between message regions on which sent or received messages are displayed. The date division line may be a line that is marked, when the date changes during message exchange, to distinguish a message exchanged before the date is changed from a message exchanged after the date was changed. However, exemplary embodiments are not limited thereto, and the date division line may be any of various types of objects other than a line that are marked to distinguish a message exchanged before the date is changed from a message exchanged after the date was changed.

For example, when a first message is exchanged on October 22 and a second message is exchanged on October 23, the first wireless communication device 100 may display a date division line 2040 between a first message region 2020 on which the first message is displayed and a second message region 2030 on which the second message is displayed.

In this case, the first wireless communication device 100 according to an exemplary embodiment may display at least one selected from a date division line based on the time zone information of the first wireless communication device 100 and a date division line based on the time zone information of the second wireless communication device 200.

For example, when the date on which the first message was sent is October 22 based on the time zone information of the first wireless communication device 100 and is also October 22 based on the time zone information of the second wireless communication device 20, the date on which the second message was received is October 22 based on the time zone information of the first wireless communication device 100 and is October 23 based on the time zone information of the second wireless communication device 200, and the date on which a third message was sent is October 23 based on the time zone information of the first wireless communication device 100 and is also October 23 based on the time zone information of the second wireless communication device 20, the first wireless communication device 100 may display the first date division line 2040 between the first message region 2020 and the second message region 2030 based on the time zone information of the second wireless communication device 200. Alternatively, the first wireless communication device 100 may display a second date division line 2060 between the second message region 2030 and a third message region 2050.

The first wireless communication device 100 may display both the first date division line 2040 and the second date division line 2060, display only the first date division line 2040, or display only the second date division line 2060, according to user settings. When the first wireless communication device 100 displays both the first date division line 2040 and the second date division line 2060, it may display them so that they may be distinguished from each other.

Accordingly, the first wireless communication device 100 may easily recognize a date change based on the time zone information of the first wireless communication device 100 and a date change based on the time zone information of the second wireless communication device 200.

Figure 21:
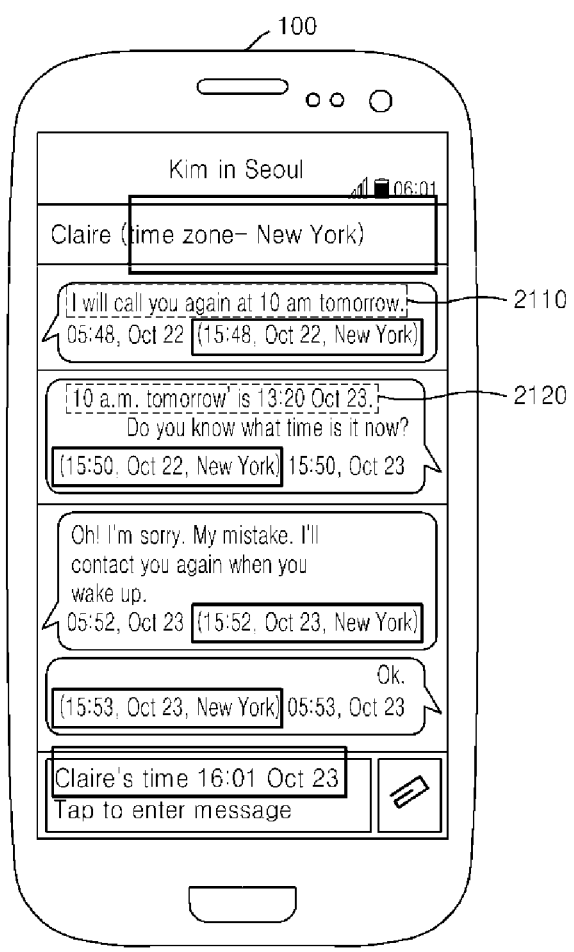
FIG. 21 illustrates a message screen displayed on the first wireless communication device during message exchange between the first and second wireless communication devices, according to an exemplary embodiment.

FIG. 21 illustrates a message screen displayed on the first wireless communication device 100 during message exchange between the first and second wireless communication devices 100 and 200, according to an exemplary embodiment.

As illustrated in FIG. 21, the user of the second wireless communication device 200 may write a text mentioning the time based on the time zone information of the second wireless communication device 200 and may send the text to the first user. For example, the second user may send the first user a message including a text of '10 am tomorrow'.

In this case, when the time zone information of the first wireless communication device 100 is different from the time zone information of the second wireless communication device 200, the first user may understand the text '10 am tomorrow' received from the second user, based on the time zone information of the first wireless communication device 100. Thus, smooth communication between the first user and the second user may not occur.

When a message received from the second wireless communication device 200 includes a text indicating time, the first wireless communication device 100 according to an exemplary embodiment may change the time indicated by the text to the time calculated based on the time zone information of the first wireless communication device 100 and display the calculated time.

For example, as illustrated in FIG. 21, when a message 2110 received from the second wireless communication device 200 includes a text of '10 am tomorrow', the first wireless communication device 100 may receive the time zone information of the second wireless communication device 200 and thus may determine whether the time zone information of the second wireless communication device 200 is different from the time zone information of the first wireless communication device 100.

When the time zone information of the second wireless communication device 200 is different from the time zone information of the first wireless communication device 100, the first wireless communication device 100 may change the text '10 am tomorrow' based on the time zone information of the second wireless communication device to a text '13:20 tomorrow (October 23)' based on the time zone information of the first wireless communication device 100 and may display a changed text 2120 corresponding to the text '13:20 tommorrow (October 23)' on the message screen. The wireless communication device may also display the time zone, in addition to the time, to avoid further confusion.

Accordingly, the first user may recognize what month, what day, and what time the time received from the second user is based on the time zone information of the first wireless communication device 100, and thus may perform smooth communication with the second user.

Figure 22:
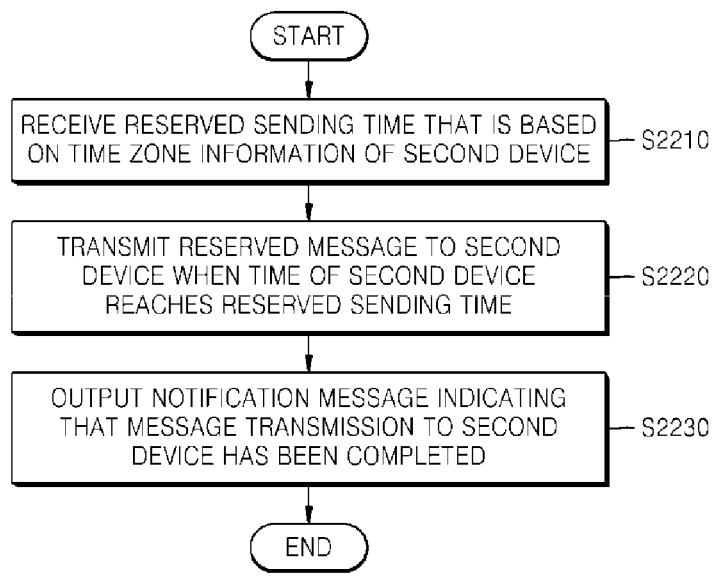
FIG. 22 is a flowchart of a method of making a reservation for message transmission from the first wireless communication device to the second wireless communication device, according to an exemplary embodiment.

FIG. 22 is a flowchart of a method of making a reservation for message transmission from the first wireless communication device 100 to the second wireless communication device 200, according to an exemplary embodiment.

Referring to FIG. 22, the first wireless communication device 100 may receive a reserved sending time for sending a message to the second wireless communication device 200, based on the time zone information of the second wireless communication device 200, in operation S2210. For example, when second time zone information of the second wireless communication device 200 is different from first time zone information of the first wireless communication device 100, the first user of the first wireless communication device 100 may input the reserved sending time based on the time of the second wireless communication device 200. In this regard, the wireless communication device 100 may store and queue messages to be transmitted, once a time for each message is reached. The time for sending each message may be associated with availability of a user of the destination wireless communication device 200, which may be based on the time zone information, as described below.

In operation S2220, when the time of the second wireless communication device 200 reaches the reserved sending time, the first wireless communication device 100 may transmit a reserved message to the second wireless communication device 200, based on the time zone information of the second wireless communication device 200.

In operation S2230, the first wireless communication device 100 may output a notification message indicating that message transmission to the second wireless communication device 200 has been completed. For example, the first wireless communication device 100 may display the notification message on a status indication window of the first wireless communication device 100 or a notification panel. The notification message may include a text indicating completion of message transmission, a message transmission completed time, and the like. The first wireless communication device 100 may output the notification message indicating that message transmission to the second wireless communication device 200 has been completed, as an audio signal or a vibration signal.

This will now be described in greater detail with reference to FIGS. 23A and 23B.

Figure 23A:
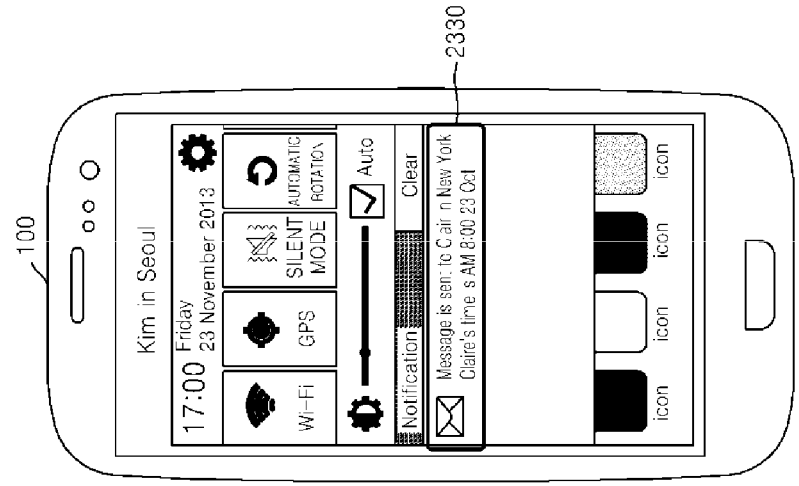
FIGS. 23A and 23B illustrate a message transmission reservation setting screen according to an exemplary embodiment.
Figure 23B:
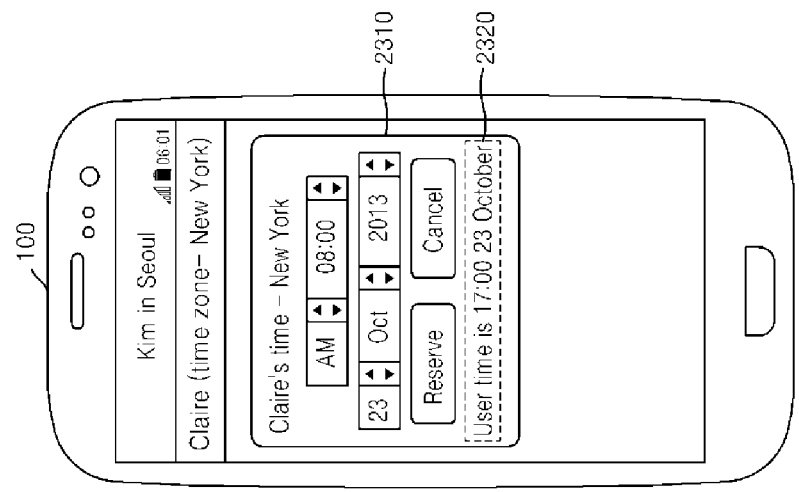

FIGS. 23A and 23B illustrate a message transmission reservation setting screen according to an exemplary embodiment.

The first wireless communication device 100 according to an exemplary embodiment may display a screen for setting a message transmission reservation time. For example, as illustrated in FIG. 23A, the first user (i.e., the user of the first wireless communication device 100) may set the time at which the first user wants to send a message to the second user (i.e., the user of the second wireless communication device 200), by using the first wireless communication device 100.

The first wireless communication device 100 may receive the time zone information of the second wireless communication device 200. When the received time zone information of the second wireless communication device 200 is different from the time zone information of the first wireless communication device 100, the first wireless communication device 100 may display the time zone information of the second wireless communication device 200 on a message transmission reservation setting window 2310. The time zone information of the second wireless communication device 200 may include standard time zone information, current time information, location information, and the like thereof. FIG. 23A illustrates a case where the received time zone information of the second wireless communication device 200 is location information 'New York'.

The first user may set a message transmission reservation time based on the time zone information of the second wireless communication device 200. For example, as illustrated in FIG. 23A, the first user may set the message transmission reservation time so that a message may be transmitted at 8 am based on the time of New York where the second wireless communication device 200 is located.

The first wireless communication device 100 may also display what time the message transmission reservation time set based on the time zone information of the second wireless communication device 200 is based on the time zone information of the first wireless communication device 100.

For example, as illustrated in FIG. 23A, when the message transmission reservation time is set to 8 am based on New York time, a reservation setting time 2320 (for example, User time is 17:00) based on the time zone information of the first wireless communication device 100 may also be displayed. Accordingly, the first user may set the message transmission reservation time based on the time zone information of the user of the second wireless communication device 200.

As such, when the first wireless communication device 100 sets a message transmission reservation based on the time zone information of the second wireless communication device 200 and the time of the second wireless communication device 200 reaches the message transmission reservation time, the first wireless communication device 100 may transmit a reserved message to the second wireless communication device 200.

As illustrated in FIG. 23B, when transmission of the reserved message is completed, the first wireless communication device 100 may output a notification message indicating that transmission of the reserved message to the second wireless communication device 200 has been completed. For example, the first wireless communication device 100 may display a notification message 2330 saying 'Message is sent to Claire in New York, Claire's time is AM 8:00 23 October' on a status indication window.

Figure 24:
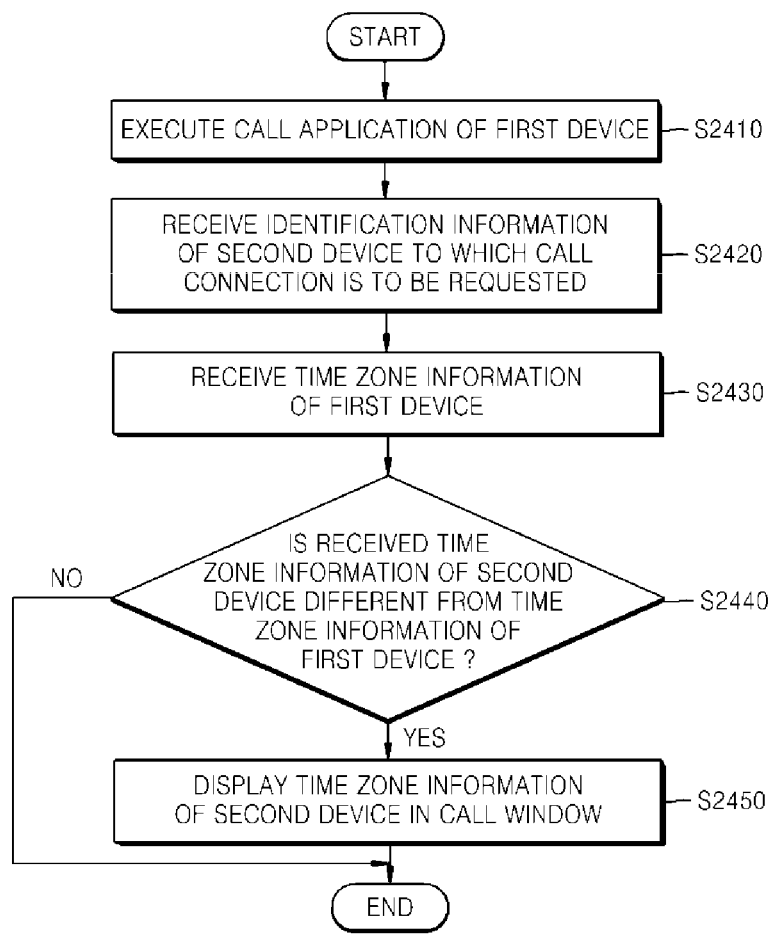
FIG. 24 is a flowchart of a method of displaying the time zone information of the second wireless communication device when a call application in the first wireless communication device is executed, according to an exemplary embodiment.

FIG. 24 is a flowchart of a method of displaying the time zone information of the second wireless communication device 200 when a call application in the first wireless communication device 100 is executed, according to an exemplary embodiment.

Referring to FIG. 24, the first wireless communication device 100 may execute a call application, in operation S2410. When the call application is executed, the first wireless communication device 100 may receive the identification information of the second wireless communication device 200 to which a call connection is to be requested, in operation S2420.

For example, when the user of the first wireless communication device 100 (i.e., the first user) requests a call connection to the user of the second wireless communication device 200 (i.e., the second user), the first user may directly input identification information of the second wireless communication device 200 (for example, the name, nick name, telephone number, e-mail address, photograph, or shortcut number of the second user) or may select identification information from a list (for example, contact information in the first wireless communication device 100) including pieces of identification information of the second wireless communication device 200.

In operation S2430, the first wireless communication device 100 may receive the time zone information of the first wireless communication device 100 based on the identification information of the second wireless communication device 200.

For example, the first wireless communication device 100 may extract the time zone information of the second wireless communication device 200 included in the contact information in the first wireless communication device 100, by using the identification information of the second wireless communication device 200. Alternatively, the first wireless communication device 100 may transmit the identification information of the second wireless communication device 200 to the server 300, request the server 300 for the time zone information of the second wireless communication device 200, and receive the time zone information of the second wireless communication device 200 from the server 300.

In operation S2440, the first wireless communication device 100 may determine whether the received time zone information of the second wireless communication device 200 is different from the time zone information of the first wireless communication device 100.

For example, the first wireless communication device 100 may compare the standard time zone information, the current time information, the location information, or the like of the first wireless communication device 100 with the standard time zone information, the current time information, the location information, or the like of the second wireless communication device 200 to determine whether the time zone information of the second wireless communication device 200 is different from the time zone information of the first wireless communication device 100.

When it is determined that the received time zone information of the second wireless communication device 200 is different from the time zone information of the first wireless communication device 100, the first wireless communication device 100 may display the time zone information of the second wireless communication device 200 in a call window of the first wireless communication device 100, in operation S2450.

For example, the first wireless communication device 100 may display the standard time zone information, the current time information, the location information, brief information, and the like of the second wireless communication device 200. This will be described in greater detail below with reference to FIGS. 25A-25D.

The first wireless communication device 100 according to an exemplary embodiment displays the time zone information of the second wireless communication device 200 before the user of the first wireless communication device 100 requests a call connection to the user of the second wireless communication device 200, whereby the first user may ascertain in advance whether the second user is available for a call.

FIGS. 25A-25D illustrate an example in which the first wireless communication device 100 displays the time zone information of the second wireless communication device 200 before a call is connected to the second wireless communication device 200, according to an exemplary embodiment.

Figure 25B:
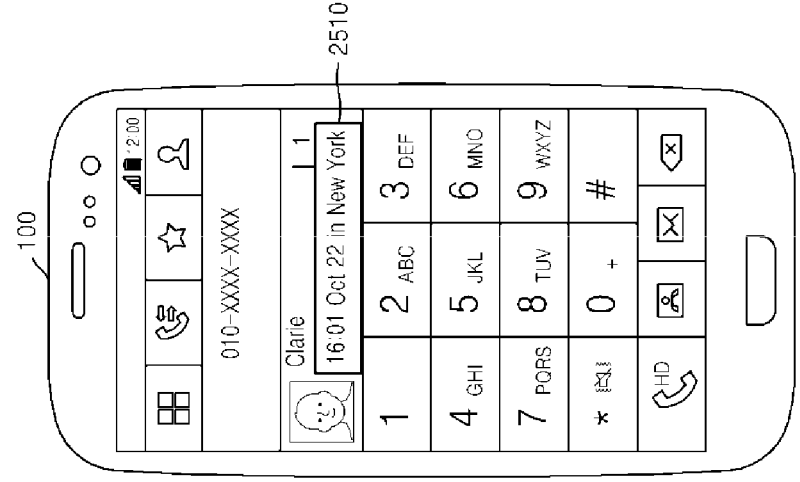
FIGS. 25A-25D illustrate an example in which the first wireless communication device displays the time zone information of the second wireless communication device before a call is connected to the second wireless communication device 200, according to an exemplary embodiment.
Figure 25A:
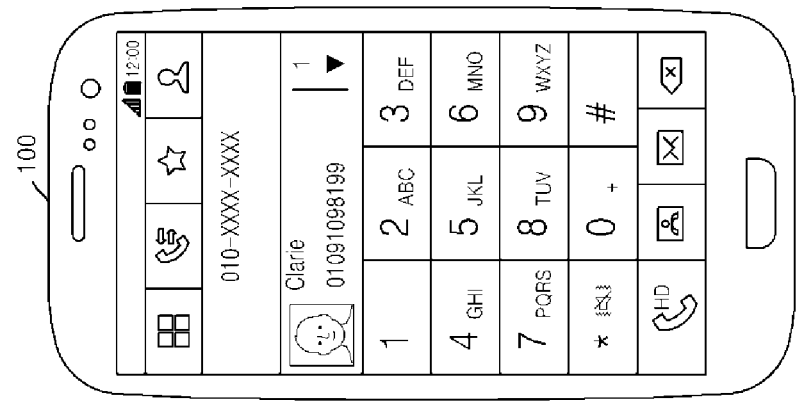

As illustrated in FIG. 25A, the user of the first wireless communication device 100 may directly input identification information of the second wireless communication device 200 to which a call connection is to be requested, or select the name of the user of the second wireless communication device 200 (for example, Claire) from a contact information list stored in the first wireless communication device 100.

When the name of the user of the second wireless communication device 200 is selected, the first wireless communication device 100 may request the server 300 for the time zone information of the second wireless communication device 200 and receive the time zone information of the second wireless communication device 200 from the server 300, based on the selected name of the user of the second wireless communication device 200. Alternatively, the first wireless communication device 100 may extract the time zone information of the second wireless communication device 200 stored in the contact information in the first wireless communication device 100.

When the time zone information of the second wireless communication device 200 is different from the time zone information of the first wireless communication device 100, as illustrated in FIG. 25B, the first wireless communication device 100 may display time zone information 2510 of the second wireless communication device 200 around an area on which the identification information of the second wireless communication device 200 (for example, the name of the second user) is displayed. The time zone information of the second wireless communication device 200 may be the standard time zone information, the current time information, the location information, or the like of the second wireless communication device 200, but is not limited thereto.

Figure 25C:
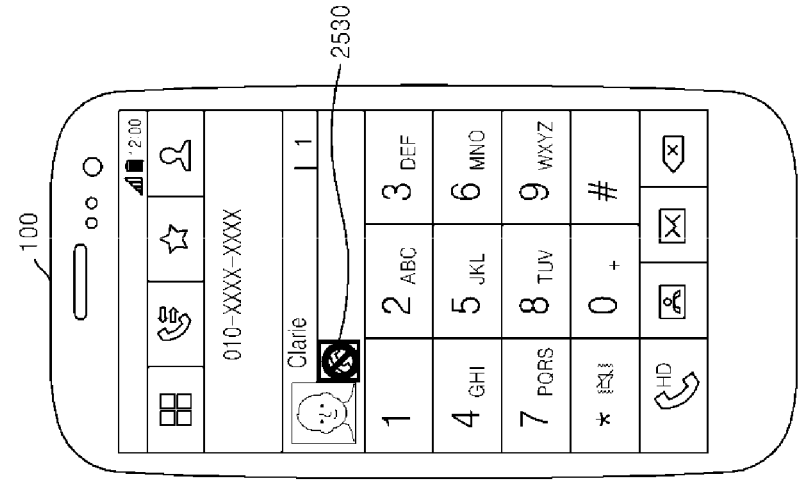

Alternatively, as illustrated in FIG. 25C, the first wireless communication device 100 may display a brief information icon 2520 briefly indicating the time zone information of the second wireless communication device 200. For example, when the second wireless communication device 200 is located in a region where it is nighttime, the brief information icon 2520 displays a moon to indicate that the second wireless communication device 200 is located in a region where it is nighttime. On the other hand, when the second wireless communication device 200 is located in a region where it is daytime, the brief information icon 2520 displays a sun to indicate that the second wireless communication device 200 is located in a region where it is daytime.

Accordingly, when the time zone information of the second wireless communication device is expressed as an icon on which a moon is displayed, the first user may determine that the user of the second wireless communication device is at a time zone when it is impossible to receive a call.

Figure 25D:
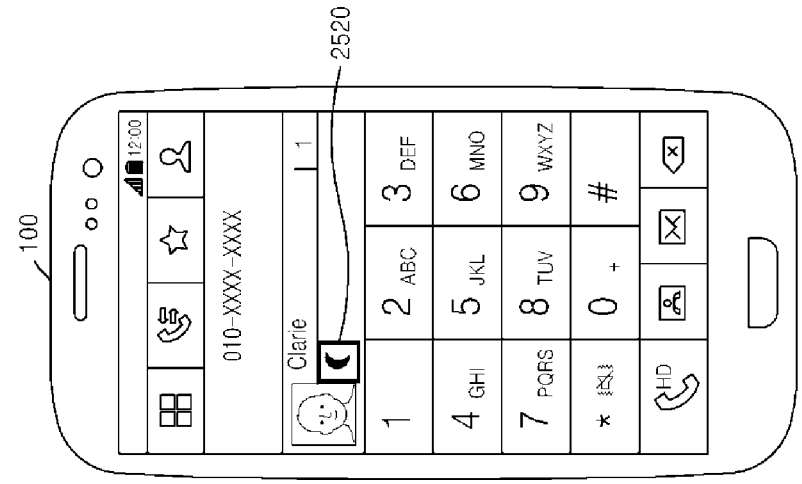

Alternatively, as illustrated in FIG. 25D, the first wireless communication device 100 may display a brief information icon 2530 indicating whether the user of the second wireless communication device 200 is available for a call. For example, when the user of the second wireless communication device 200 is not available for a call, the brief information icon 2520 displays an image of 'No call' to indicate that the user of the second wireless communication device 200 is not available for a call.

As described above, the first wireless communication device 100 according to an exemplary embodiment displays the time zone information of the second wireless communication device 200 before the user of the first wireless communication device 100 requests a call connection to the user of the second wireless communication device 200, whereby the first user may ascertain in advance whether the second user is available for a call.

Figure 26:
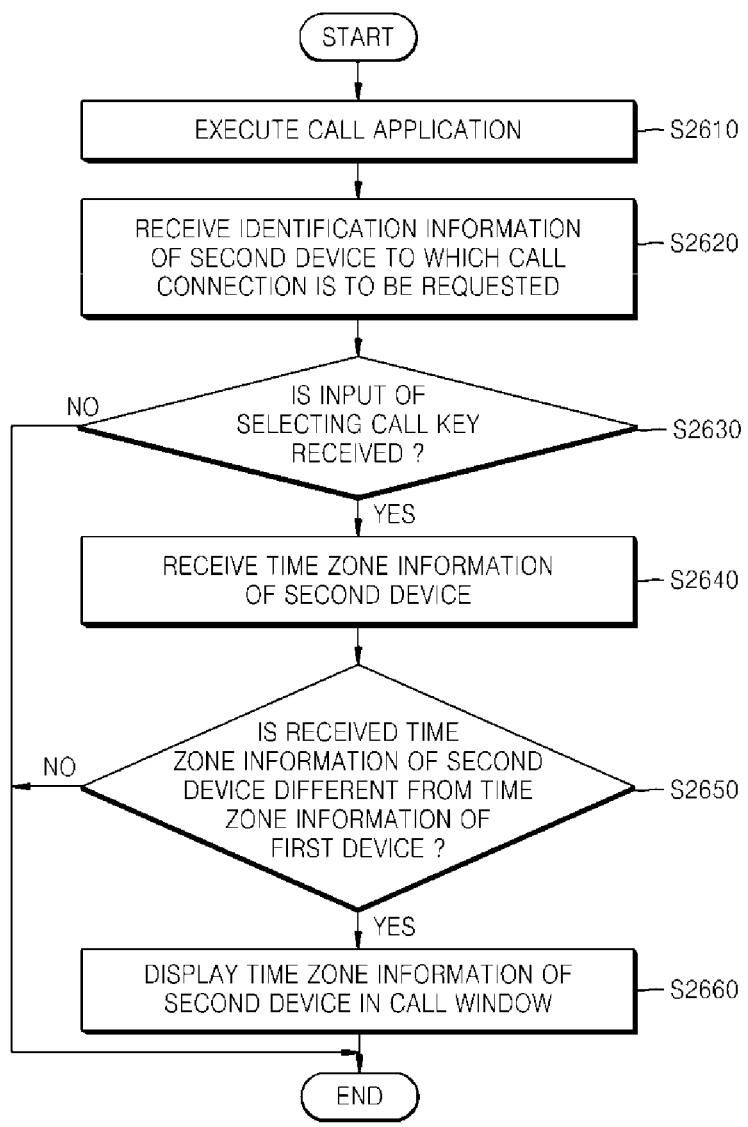
FIG. 26 is a flowchart of a method of displaying the time zone information of the second wireless communication device when the first wireless communication device selects a call key, according to an exemplary embodiment.

FIG. 26 is a flowchart of a method of displaying the time zone information of the second wireless communication device 200 when the first wireless communication device 100 selects a 'call' key, according to an exemplary embodiment.

Referring to FIG. 26, the first wireless communication device 100 may execute a call application (i.e., an application to execution the function of making a telephone call), in operation S2610.

When the call application is executed, the first wireless communication device 100 may receive the identification information of the second wireless communication device 200 to which a call connection is to be requested, in operation S2620.

Because operations S2610 and S2620 of FIG. 26 correspond to operations S2410 and S2420 of FIG. 24, a repeated description thereof will be omitted.

In operation S2630, the first wireless communication device 100 may receive an input of selecting a 'call' key.

When the first wireless communication device 100 receives the input of selecting the 'call' key, the first wireless communication device 100 may receive the time zone information of the second wireless communication device 200 based on the identification information of the second wireless communication device 200, in operation S2640. In operation S2650, the first wireless communication device 100 may determine whether the received time zone information of the second wireless communication device 200 is different from the time zone information of the first wireless communication device 100.

Because operations S2640 and S2650 of FIG. 26 correspond to operations S2430 and S2440 of FIG. 24, a repeated description thereof will be omitted.

When it is determined that the received time zone information of the second wireless communication device 200 is different from the time zone information of the first wireless communication device 100, the first wireless communication device 100 may display the time zone information of the second wireless communication device 200 in a call window of the first wireless communication device 100, in operation S2660.

For example, the first wireless communication device 100 may request a call connection to the second wireless communication device 200 and at the same time may display the time zone information of the second wireless communication device 200 on a call connection request screen. Alternatively, the first wireless communication device 100 may display a message window indicating the time zone information of the second wireless communication device 200. This will now be described in greater detail with reference to FIGS. 27A-30B.

Figure 27A:
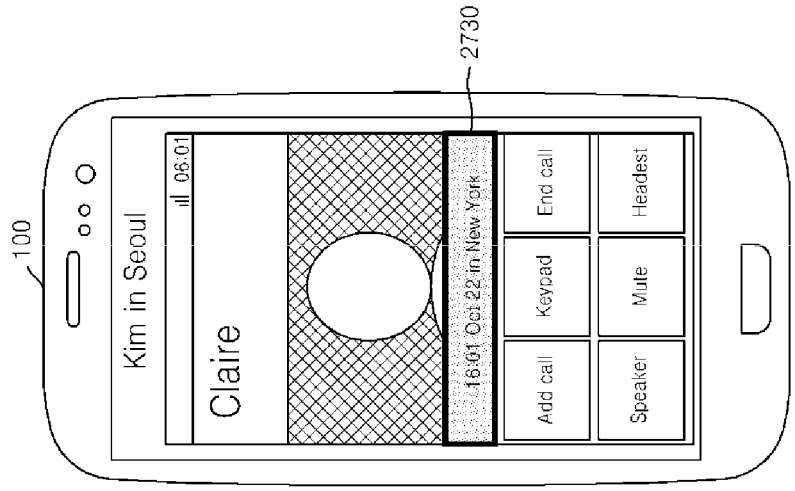
FIGS. 27A and 27B illustrate an example in which the first wireless communication device displays the time zone information of the second wireless communication device when requesting a call connection to the second wireless communication device, according to an exemplary embodiment.
Figure 27B:
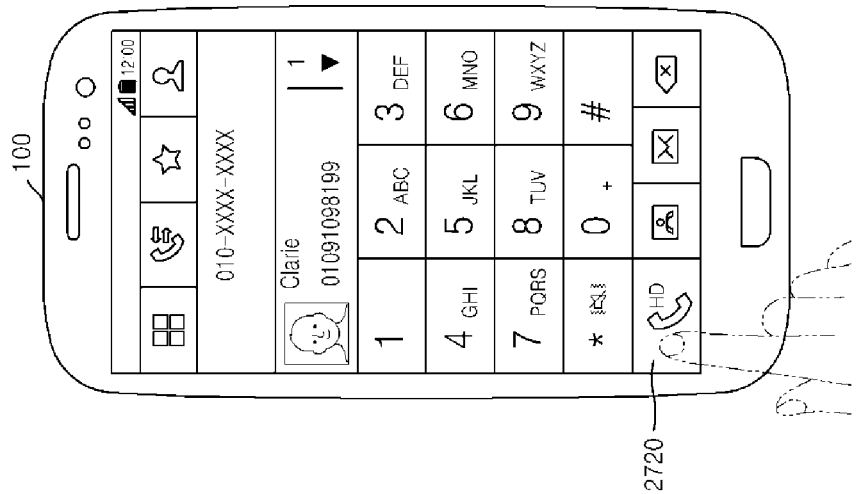

FIGS. 27A and 27B illustrate an example in which the first wireless communication device 100 displays the time zone information of the second wireless communication device 200 when requesting a call connection to the second wireless communication device 200, according to an exemplary embodiment.

As illustrated in FIG. 27A, the user of the first wireless communication device 100 may directly input identification information of the second wireless communication device 200 to which a call connection is to be requested, or select the name of the user of the second wireless communication device 200 (for example, Claire) from a contact information list stored in the first wireless communication device 100.

When the identification information of the second wireless communication device 200 is input, the user of the first wireless communication device 100 may select a 'call' key 2720. In response to the 'call' key selection, the first wireless communication device 100 may request the server 300 for the time zone information of the second wireless communication device 200 and receive the time zone information of the second wireless communication device 200 from the server 300, based on the input identification information of the second wireless communication device 200. Alternatively, the first wireless communication device 100 may extract the time zone information of the second wireless communication device 200 stored in the contact information in the first wireless communication device 100.

When it is determined that the received time zone information of the second wireless communication device 200 is different from the time zone information of the first wireless communication device 100, as illustrated in FIG. 27B, the first wireless communication device 100 may display the time zone information of the second wireless communication device 200 on a call connection screen while requesting a call connection to the second wireless communication device 200.

For example, the first wireless communication device 100 may display the standard time zone information, the current time information, the location information, and the like of the second wireless communication device 200, and the time zone information of the second wireless communication device 200 may be displayed as a brief information icon. In the case of FIG. 27B, time zone information 2730 of the second wireless communication device 200 may be expressed as current time information (i.e., 16:01) and location information (i.e., New York) of the second wireless communication device 200.

Even when calling of the first wireless communication device 100 is connected to the second wireless communication device 200 and the first wireless communication device 100 and the second wireless communication device 20 are in the middle of conversion, the first wireless communication device 100 may display the time zone information of the second wireless communication device on a mid-call screen. Accordingly, the first user may ascertain the time zone information of the second user as a counterpart call participant even when requesting a call connection to the second user or in the middle of conversion with the second user.

Figure 28A:
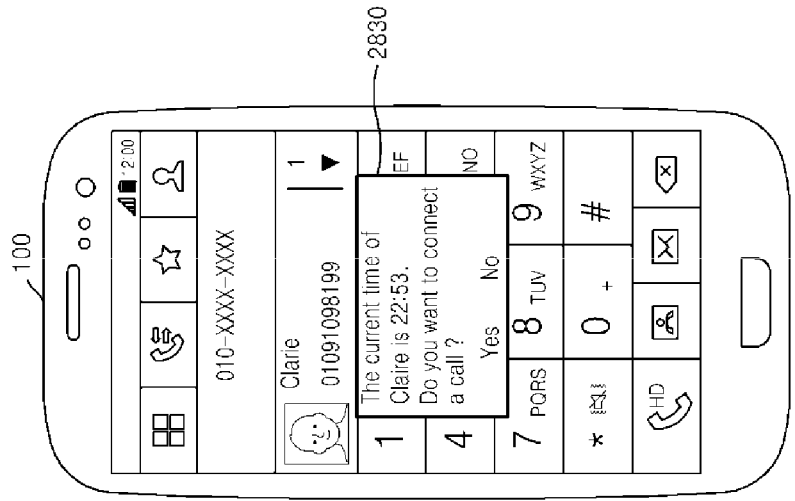
FIGS. 28A and 28B illustrate an example in which the first wireless communication device displays the time zone information of the second wireless communication device when requesting a call connection to the second wireless communication device, according to an exemplary embodiment.
Figure 28B:
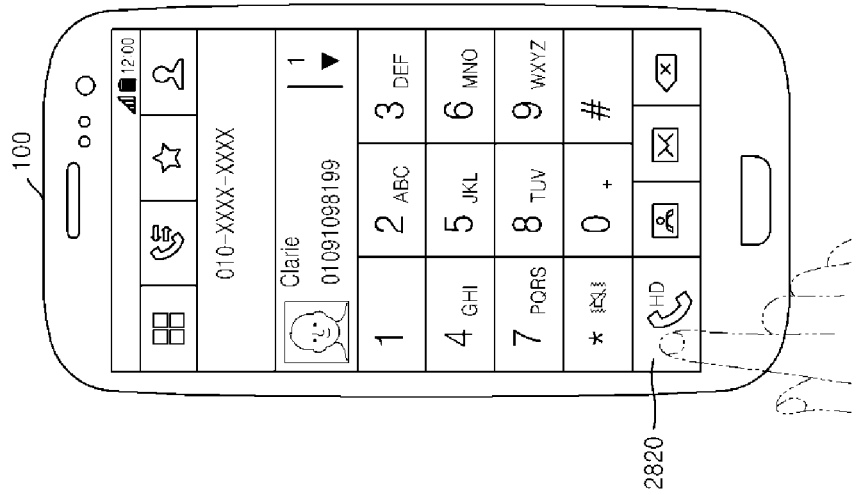

FIGS. 28A and 28B illustrate an example in which the first wireless communication device 100 displays the time zone information of the second wireless communication device 200 when requesting a call connection to the second wireless communication device 200, according to an exemplary embodiment.

As illustrated in FIG. 28A, the user of the first wireless communication device 100 may directly input identification information of the second wireless communication device 200 to which a call connection is to be requested, or select the name of the user of the second wireless communication device 200 (for example, Claire) from a contact information list stored in the first wireless communication device 100.

When the identification information of the second wireless communication device 200 is input, the user of the first wireless communication device 100 may select a 'call' key 2820. In response to the 'call' key selection, the first wireless communication device 100 may request the server 300 for the time zone information of the second wireless communication device 200 and receive the time zone information of the second wireless communication device 200 from the server 300, based on the input identification information of the second wireless communication device 200. Alternatively, the first wireless communication device 100 may extract the time zone information of the second wireless communication device 200 stored in the contact information in the first wireless communication device 100.

When the time zone information of the second wireless communication device 200 is different from the time zone information of the first wireless communication device 100, the first wireless communication device 100 may display a message window indicating the time zone information of the second wireless communication device 200.

For example, referring to FIG. 28B, the first wireless communication device 100 may display a message 2830 that indicates current time information (e.g., 22:53) of the second wireless communication device 200 and that asks if a call connection is to proceed. Although the displayed time zone information of the second wireless communication device 200 is the current time information thereof in FIG. 28B, exemplary embodiments are not limited thereto. The displayed time zone information of the second wireless communication device 200 may be the standard time zone information, the location information, the brief information icon, or the like of the second wireless communication device 200.

Accordingly, the first user may check the time zone information of the second wireless communication device 200 displayed on a message window and then may determine whether to request a call connection to the second wireless communication device 200. For example, when the first user selects a 'yes' key, the first wireless communication device 100 may requests a call connection to the second wireless communication device 200. On the other hand, when the first user selects a 'no' key, the first wireless communication device 100 may conclude the call application without requesting a call connection to the second wireless communication device 200.

Figure 29A:
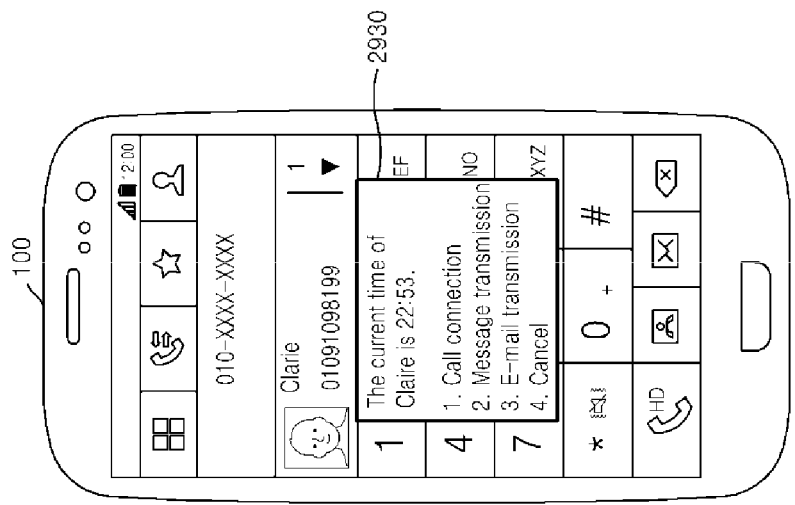
FIGS. 29A and 29B illustrate an example in which the first wireless communication device displays the time zone information of the second wireless communication device when requesting a call connection to the second wireless communication device, according to an exemplary embodiment.
Figure 29B:
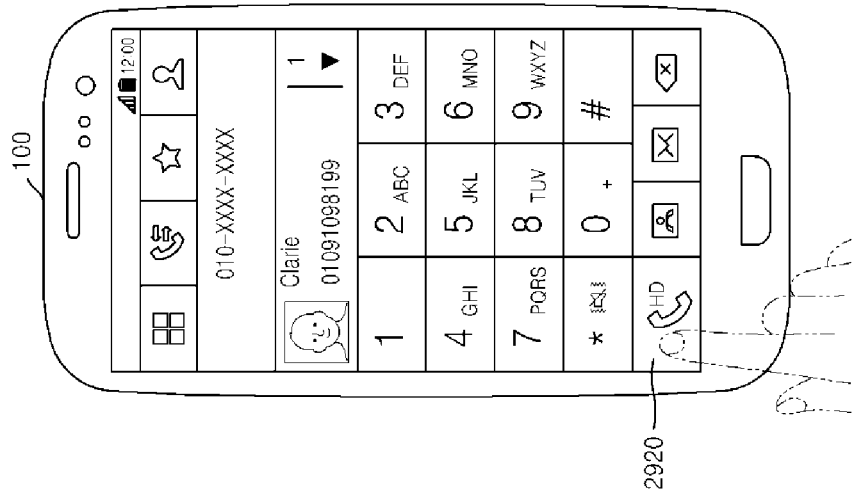

FIGS. 29A and 29B illustrate an example in which the first wireless communication device 100 displays the time zone information of the second wireless communication device 200 when requesting a call connection to the second wireless communication device 200, according to an exemplary embodiment.

As illustrated in FIG. 29A, the user of the first wireless communication device 100 may directly input identification information of the second wireless communication device 200 to which a call connection is to be requested, or select the name of the user of the second wireless communication device 200 (for example, Claire) from a contact information list stored in the first wireless communication device 100.

When the identification information of the second wireless communication device 200 is input, the user of the first wireless communication device 100 may select a 'call' key 2920. In response to the 'call' key selection, the first wireless communication device 100 may request the server 300 for the time zone information of the second wireless communication device 200 and receive the time zone information of the second wireless communication device 200 from the server 300, based on the input identification information of the second wireless communication device 200. Alternatively, the first wireless communication device 100 may extract the time zone information of the second wireless communication device 200 stored in the contact information in the first wireless communication device 100.

When the time zone information of the second wireless communication device 200 is different from the time zone information of the first wireless communication device 100, the first wireless communication device 100 may display a message that indicates the time zone information of the second wireless communication device 200 and alternative communication options instead of call.

For example, referring to FIG. 29B, the first wireless communication device 100 may display a message 2930 that indicates current time information (for example, 22:53) of the second wireless communication device 200 and shows a call connection option and alternative communication options (for example, text message and e-mail).

In this case, the first wireless communication device 100 may determine whether the time zone information of the second wireless communication device 200 is daytime or nighttime, whether the time zone information of the second wireless communication device 200 is later than a preset time, or whether the time zone information of the second wireless communication device 200 is earlier than another preset time, to thereby determine whether to provide an alternative communication option to the first user.

For example, when it is determined that the time zone information of the second wireless communication device 200 received by the first wireless communication device 100 is nighttime or a daybreak time zone, the first wireless communication device 100 may display the message 2930 indicating alternative communication options instead of communication by telephone call.

Alternatively, when it is determined that the time zone information of the second wireless communication device 200 received by the first wireless communication device 100 is after a first time (for example, 12:00 midnight) set by the second wireless communication device 200 or that the time zone information of the second wireless communication device 200 received by the first wireless communication device 100 is before a second time (for example, 6:00 am) set by the second wireless communication device 200, the first wireless communication device 100 may display the message 2930 indicating alternative communication options instead of communication by telephone call.

Accordingly, the first user may check the time zone information of the second wireless communication device 200 displayed on a message window and then may determine whether to request a call connection to the second wireless communication device 200. For example, when the first user selects a call connection option, the first wireless communication device 100 may request a call connection to the second wireless communication device 200.

When the first user selects a message transmission option, the call application may be concluded, a message application may be executed, and a message window for transmitting a message to the second wireless communication device 200 may be displayed based on the identification information of the second wireless communication device 200.

When the first user selects an e-mail transmission option, the call application may be concluded, an e-mail application may be executed, and a message window for transmitting a message to the second wireless communication device 200 may be displayed based on the identification information of the second wireless communication device 200.

When the first user selects a cancel option, the first wireless communication device 100 may conclude the call application without requesting a call connection to the second wireless communication device 200.

Figure 30B:
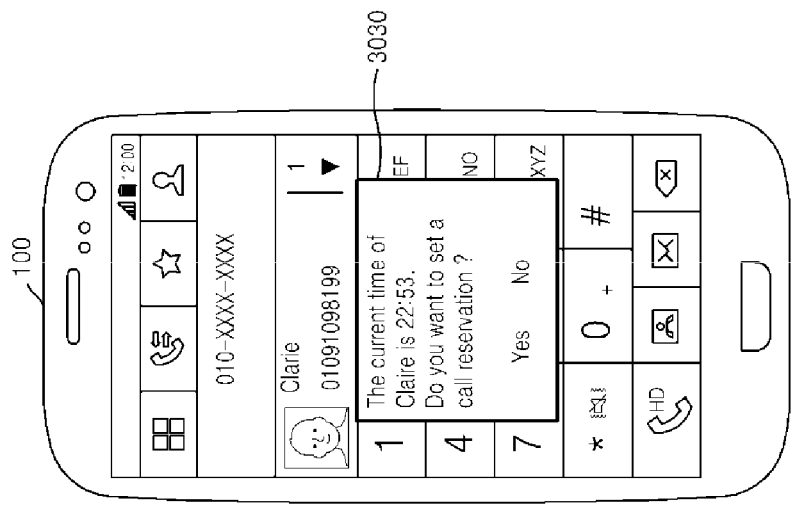
FIGS. 30A and 30B illustrate an example in which the first wireless communication device displays the time zone information of the second wireless communication device when requesting a call connection to the second wireless communication device, according to an exemplary embodiment.
Figure 30A:
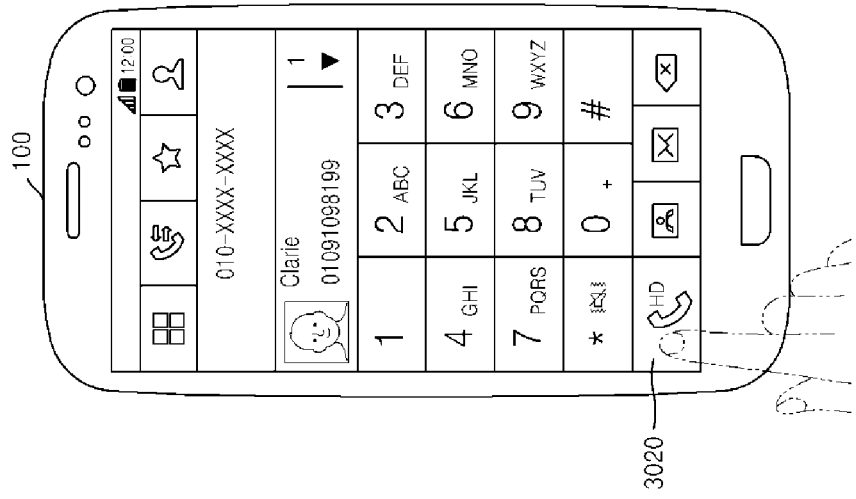

FIGS. 30A and 30B illustrate an example in which the first wireless communication device 100 displays the time zone information of the second wireless communication device 200 when requesting a call connection to the second wireless communication device 200, according to an exemplary embodiment.

As illustrated in FIG. 30A, the user of the first wireless communication device 100 may directly input identification information of the second wireless communication device 200 to which a call connection is to be requested, or select the name of the user of the second wireless communication device 200 (for example, Claire) from a contact information list stored in the first wireless communication device 100.

When the identification information of the second wireless communication device 200 is input, the user of the first wireless communication device 100 may select a 'call' key 3020. In response to the 'call' key selection, the first wireless communication device 100 may request the server 300 for the time zone information of the second wireless communication device 200 and receive the time zone information of the second wireless communication device 200 from the server 300, based on the input identification information of the second wireless communication device 200. Alternatively, the first wireless communication device 100 may extract the time zone information of the second wireless communication device 200 stored in the contact information in the first wireless communication device 100.

When the time zone information of the second wireless communication device 200 is different from the time zone information of the first wireless communication device 100, the first wireless communication device 100 may display a message that indicates the time zone information of the second wireless communication device 200 and the asks whether to set a call reservation.

For example, referring to FIG. 30B, the first wireless communication device 100 may display a message 3030 that indicates current time information (e.g., 22:53) of the second wireless communication device 200 and that asks whether to set a call reservation.

In this case, the first wireless communication device 100 may determine whether the time zone information of the second wireless communication device 200 is daytime or nighttime, whether the time zone information of the second wireless communication device 200 is later than a preset time, or whether the time zone information of the second wireless communication device 200 is earlier than another preset time.

For example, when it is determined that the time zone information of the second wireless communication device 200 received by the first wireless communication device 100 is nighttime or a daybreak time zone, the time zone information of the second wireless communication device 200 received by the first wireless communication device 100 is after a first time (for example, 12 midnight) set by the second wireless communication device 200 or that the time zone information of the second wireless communication device 200 received by the first wireless communication device 100 is before a second time (for example, 6 am) set by the second wireless communication device 200, the first wireless communication device 100 may display the message 3020 asking whether to set a call reservation.

When the first user selects a 'yes' key, a call reservation setting screen may be displayed, which will now be described in detail with reference to FIGS. 31A and 31B.

Figure 31B:
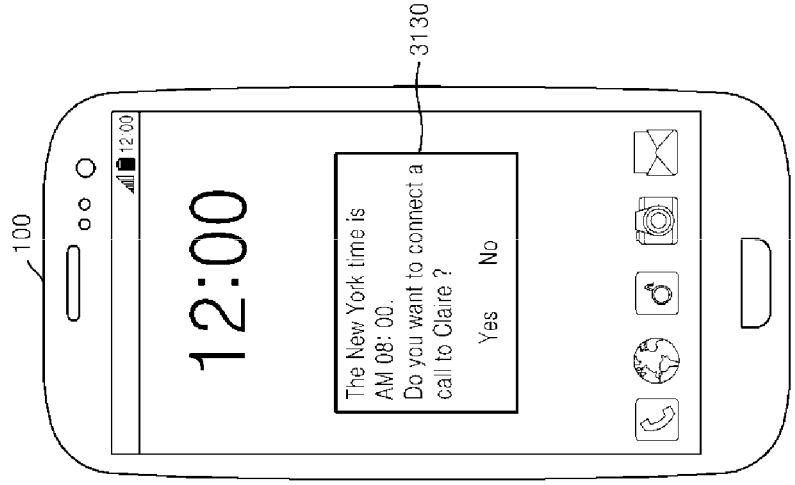
FIGS. 31A and 31B illustrate a call reservation setting screen according to an exemplary embodiment.
Figure 31A:
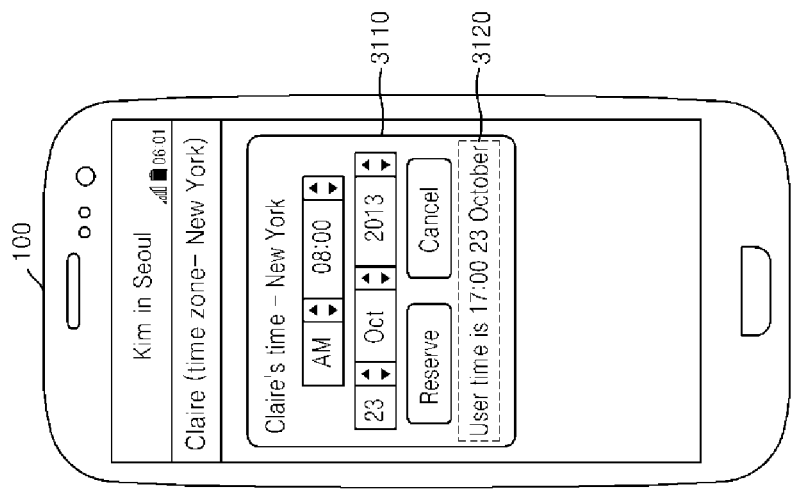

FIGS. 31A and 31B illustrate a call reservation setting screen according to an exemplary embodiment.

The first wireless communication device 100 according to an exemplary embodiment may display a screen for setting a call reservation time. Referring to FIGS. 31A and 31B, the first wireless communication device 100 may directly input identification information of the second wireless communication device 200 to which a call connection is to be reserved or select the second wireless communication device 200 from a contact information list stored in the first wireless communication device 100, and may select a call reservation setting menu.

The first wireless communication device 100 may receive the time zone information of the second wireless communication device 200. When the received time zone information of the second wireless communication device 200 is different from the time zone information of the first wireless communication device 100, the first wireless communication device 100 may display the time zone information of the second wireless communication device 200 on a call reservation setting window 3110. The time zone information of the second wireless communication device 200 may include standard time zone information, current time information, location information, and the like thereof. FIG. 31A illustrates a case where the received time zone information of the second wireless communication device 200 is location information 'New York'.

Alternatively, as described above in FIG. 30B, when a 'yes' key is selected on a message asking whether to set a call reservation, the call reservation setting window 3110, via which a call reservation for a call to the second wireless communication device 200 may be set, may be displayed.

When the call reservation setting window 3110 is displayed, the first user may set a call reservation time based on the time zone information of the second wireless communication device 200. For example, as illustrated in FIG. 31A, the first user may set the call reservation time so that a call reservation notification message may be output at 8:00 am based on the time of New York where the second wireless communication device 200 is located.

The first wireless communication device 100 may also display what time the call reservation time set based on the time zone information of the second wireless communication device 200 is based on the time zone information of the first wireless communication device 100. For example, as illustrated in FIG. 31A, when the call reservation time is set to 8:00 am based on New York time, a reservation setting time 3120 (for example, User time is 17:00) based on the time zone information of the first wireless communication device 100 may also be displayed.

Accordingly, the first user may set the call reservation time based on the time zone information of the user of the second wireless communication device 200, and may also display the time zone information of the first wireless communication device 100, whereby the call reservation time may be set to be the time when the first user and the second user are both available for a call.

As such, when the first wireless communication device 100 sets a call reservation based on the time zone information of the second wireless communication device 200 and the time of the second wireless communication device 200 reaches the call reservation time, the first wireless communication device 100 may output a call reservation notification message.

Referring to FIG. 31B, when the time of a region where the second wireless communication device 200 is located reaches the set call reservation time, the first wireless communication device 100 may display a message 3130 that indicates the call reservation time (i.e., 8:00 am) and that asks whether to connect a call.

In this case, when the first user selects a 'yes' key, the first wireless communication device 100 may request a call connection to the second wireless communication device 200.

Figure 32A:
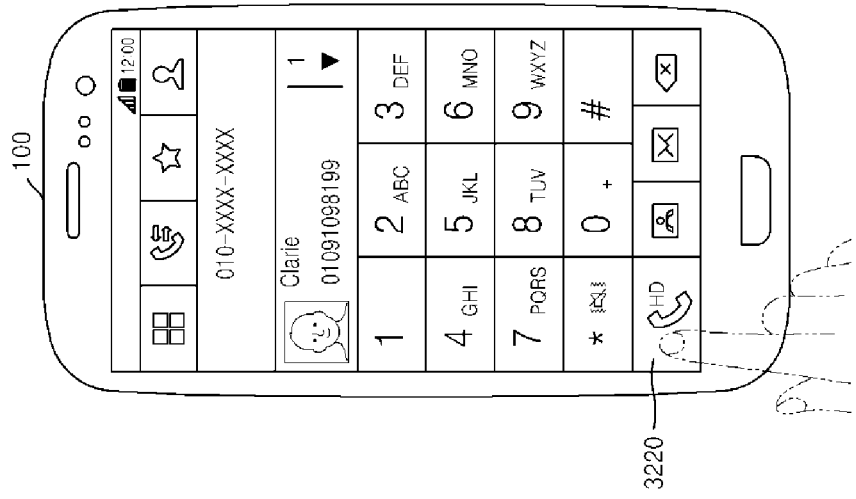
FIGS. 32A and 32B illustrate an example in which the first wireless communication device displays the time zone information of the second wireless communication device when requesting a call connection to the second wireless communication device, according to an exemplary embodiment.
Figure 32B:
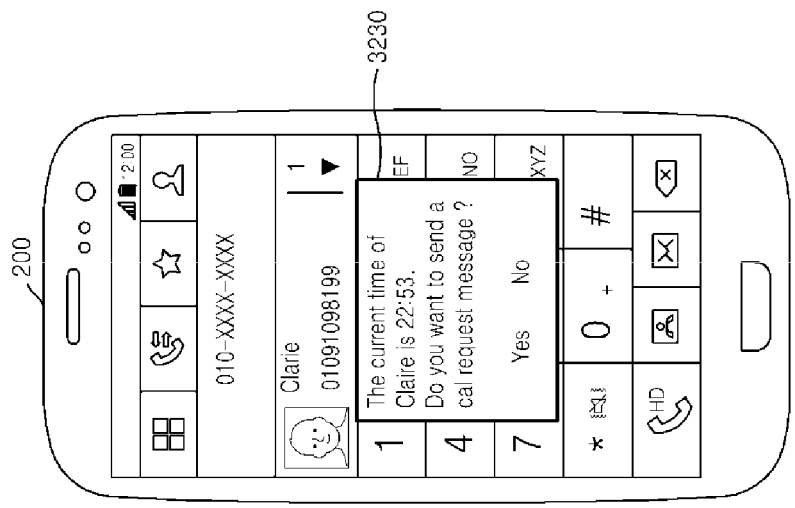

FIGS. 32A and 32B illustrate an example in which the first wireless communication device 100 displays the time zone information of the second wireless communication device 200 when requesting a call connection to the second wireless communication device 200, according to an exemplary embodiment.

As illustrated in FIG. 32A, the user of the first wireless communication device 100 may directly input identification information of the second wireless communication device 200 to which a call connection is to be requested, or select the name of the user of the second wireless communication device 200 (for example, Claire) from a contact information list stored in the first wireless communication device 100.

When the identification information of the second wireless communication device 200 is input, the user of the first wireless communication device 100 may select a 'call' key 3220. In response to the 'call' key selection, the first wireless communication device 100 may request the server 300 for the time zone information of the second wireless communication device 200 and receive the time zone information of the second wireless communication device 200 from the server 300, based on the input identification information of the second wireless communication device 200. Alternatively, the first wireless communication device 100 may extract the time zone information of the second wireless communication device 200 stored in the contact information in the first wireless communication device 100.

When the time zone information of the second wireless communication device 200 is different from the time zone information of the first wireless communication device 100, the first wireless communication device 100 may display a message that indicates the time zone information of the second wireless communication device 200 and the asks whether to set a call reservation.

For example, referring to FIG. 32B, the first wireless communication device 100 may display a message 3230 that indicates current time information (e.g., 22:53) of the second wireless communication device 200 and also asks whether to send a call request message. The call request message is a message that requests the second wireless communication device 200 to call the first wireless communication device 100.

In this case, the first wireless communication device 100 may determine whether the time zone information of the second wireless communication device 200 is daytime or nighttime, whether the time zone information of the second wireless communication device 200 is later than a preset time, or whether the time zone information of the second wireless communication device 200 is earlier than another preset time.

For example, when it is determined that the time zone information of the second wireless communication device 200 received by the first wireless communication device 100 is nighttime or a daybreak time zone, the time zone information of the second wireless communication device 200 received by the first wireless communication device 100 is after a first time (for example, 12:00 midnight) set by the second wireless communication device 200 or that the time zone information of the second wireless communication device 200 received by the first wireless communication device 100 is before a second time (for example, 6:00 am) set by the second wireless communication device 200, the first wireless communication device 100 may display the message 3230 asking whether to send a call request message.

When the first user selects a 'yes' key, a call request message setting screen may be displayed, which will now be described in detail with reference to FIGS. 33A and 33B.

Figure 33A:
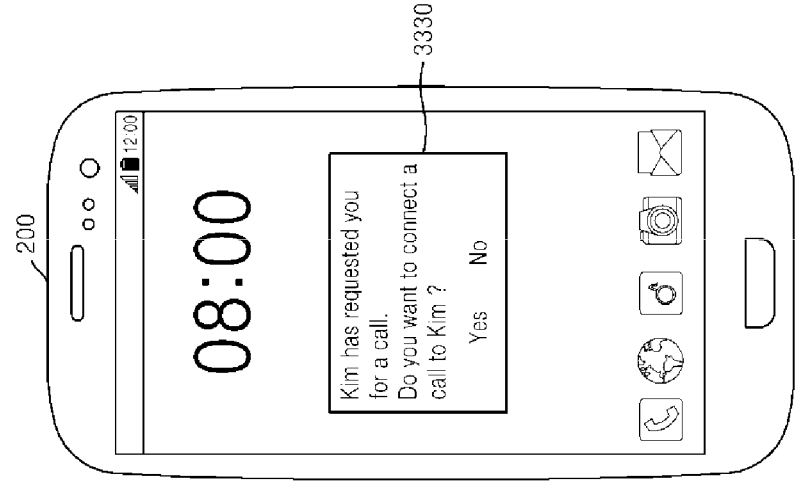
FIGS. 33A and 33B illustrate a call request message setting screen according to an exemplary embodiment.
Figure 33B:
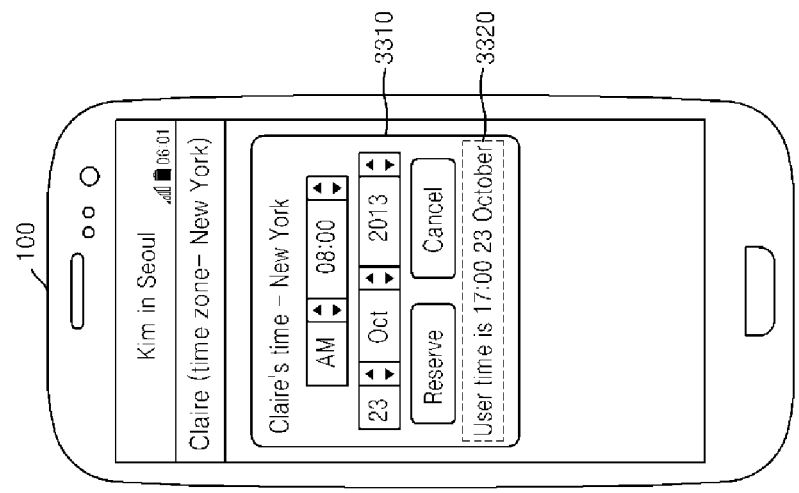

FIGS. 33A and 33B illustrate a call request message setting screen according to an exemplary embodiment.

The first wireless communication device 100 may directly input identification information of the second wireless communication device 200 to which a call request message is to be sent or may select the second wireless communication device 200 from a contact information list stored in the first wireless communication device 100, and may select a call request message sending menu.

The first wireless communication device 100 may receive the time zone information of the second wireless communication device 200. When the received time zone information of the second wireless communication device 200 is different from the time zone information of the first wireless communication device 100, as illustrated in FIG. 33A, the first wireless communication device 100 may display the time zone information of the second wireless communication device 200 on a call request message setting window 3310. The time zone information of the second wireless communication device 200 may include standard time zone information, current time information, location information, and the like thereof. FIG. 33A illustrates a case where the received time zone information of the second wireless communication device 200 is location information 'New York'.

Alternatively, as described above in FIG. 32B, when a 'yes' key is selected on a message asking whether to send a call request message, the call request message setting window 3310, via which a call request message may be set to be transmitted to the second wireless communication device 200, may be displayed.

When the call request message setting window 3310 is displayed, the first user may set a call request message based on the time zone information of the second wireless communication device 200. For example, as illustrated in FIG. 33A, the first user may set a call request message transmission time so that a call request message may be output to the second wireless communication device 200 at 8:00 am based on the time of New York where the second wireless communication device 200 is located.

The first wireless communication device 100 may also display what time the call request message transmission time set based on the time zone information of the second wireless communication device 200 is based on the time zone information of the first wireless communication device 100. For example, as illustrated in FIG. 33A, when the call request message transmission time is set to 8:00 am based on New York time, a reservation setting time 3320 (for example, User time is 17:00) based on the time zone information of the first wireless communication device 100 may also be displayed.

Accordingly, the first user may set the call request message transmission time based on the time zone information of the user of the second wireless communication device 200 and may also display the time zone information of the first wireless communication device 100, whereby the call request message transmission time may be set to be the time when the first user and the second user are both available for a call.

As such, when the first wireless communication device 100 sets a call request message transmission time based on the time zone information of the second wireless communication device 200 and the time of the second wireless communication device 200 reaches the set call request message transmission time, the second wireless communication device 200 may output a call request message.

Referring to FIG. 33B, when the time of a region where the second wireless communication device 200 is located reaches the set call request message transmission time, the first wireless communication device 100 may transmit a call request message 3330 to the second wireless communication device 200, and the second wireless communication device 200 may display a call request message 3330. In this case, the second user may request a call connection to the first user.

Figure 34:
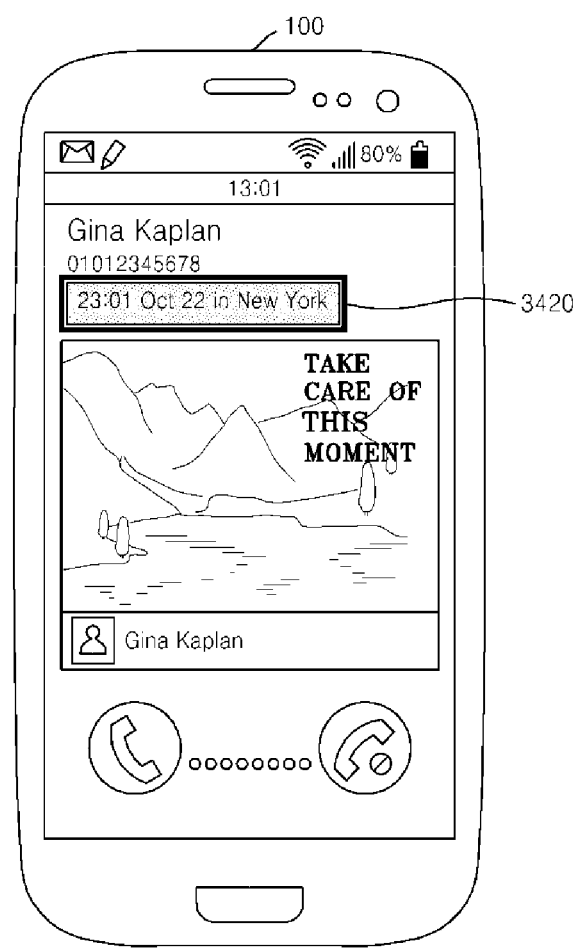
FIG. 34 illustrate an example in which the first wireless communication device displays the time zone information of the second wireless communication device when receiving a call connection request from the second wireless communication device 200, according to an exemplary embodiment.

FIG. 34 illustrates an example in which the first wireless communication device 100 displays the time zone information of the second wireless communication device 200 when receiving a call connection request from the second wireless communication device 200, according to an exemplary embodiment.

Referring to FIG. 34, the first wireless communication device 100 may receive the call connection request from the second wireless communication device 200. In this case, the first wireless communication device 100 may extract the time zone information of the second wireless communication device 200 stored in the contact information in the first wireless communication device 100. Alternatively, the server 300 may receive the time zone information of the second wireless communication device 200 from the server 300. Alternatively, when the first wireless communication device 100 receives a call connection request from the second wireless communication device 200, the first wireless communication device 100 may also receive the time zone information of the second wireless communication device 200.

The first wireless communication device 100 may compare the time zone information of the second wireless communication device 200 with the time zone information of the first wireless communication device 100. When the time zone information of the second wireless communication device 200 is different from the time zone information of the first wireless communication device 100, the first wireless communication device 100 may display time zone information 3420 of the second wireless communication device 200 on a call connection request receiving screen.

In this case, the first wireless communication device 100 may display the standard time zone information, the current time information, the location information, and the like of the second wireless communication device 200, as the time zone information 3420 of the second wireless communication device 200. For example, as illustrated in FIG. 34, '23:01 October in New York' may be displayed as the time zone information 3420 of the second wireless communication device 200.

Accordingly, the first user may ascertain the time zone information of the second user, before selecting a call connection button.

Figure 35:
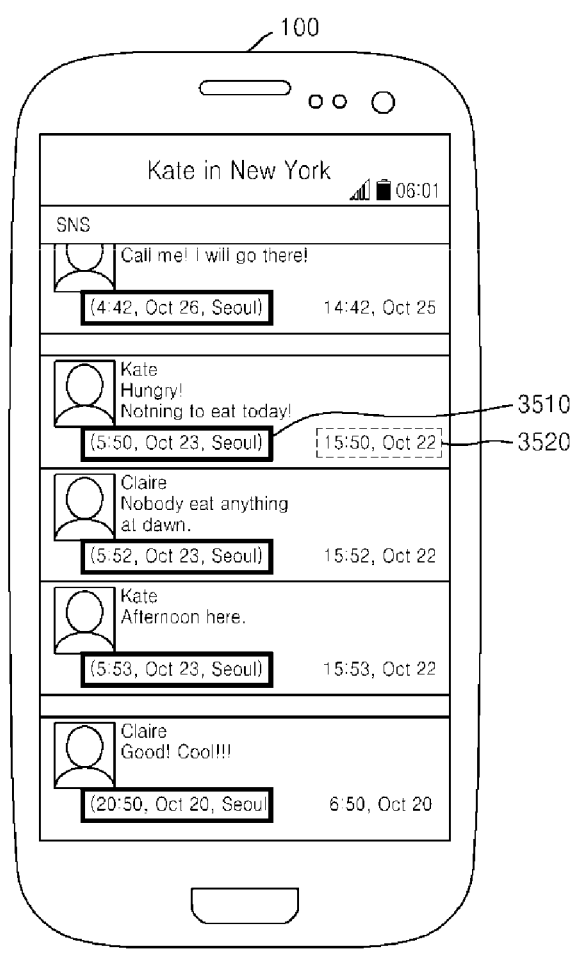
FIG. 35 illustrates an example in which the first wireless communication device displays the time zone information of the second wireless communication device when an SNS application is executed, according to an exemplary embodiment.

FIG. 35 illustrates an example in which the first wireless communication device 100 displays the time zone information of the second wireless communication device 200 when an SNS application is executed, according to an exemplary embodiment.

The SNS application is an application that provides social networking services (SNSs), which are online services that establish a network between people who share a particular interest or activity. Subscribers to SNSs, such as, Twitter™ and Facebook™, may share information and opinions with one another and expand interpersonal relations.

Referring to FIG. 35, when the user of the first wireless communication device 100 (i.e., the first user) executes an SNS application, the first wireless communication device 100 may display content (for example, text, audio files, images, and moving pictures) that the first user or second users connected to the first user via an SNS has registered or shared with each other.

The first wireless communication device 100 may also display the time when the first user or the second users has registered or shared the content with each other.

In this case, the first wireless communication device 100 may receive time zone information of a region where the wireless communication device of the second user (i.e., the second wireless communication device 200) is located. When the received time zone information of the second wireless communication device 200 is different from the time zone information of the first wireless communication device 100, the first wireless communication device 100 may display the time zone information of the second wireless communication device 200.

Alternatively, the server 300 (for example, an SNS server) may receive the time zone information of the first wireless communication device 100 and the time zone information of the second wireless communication device 200 and compare them with each other. When the time zone information of the first wireless communication device 100 and the time zone information of the second wireless communication device 200 are different from each other, the server 300 may transmit the time zone information of the second wireless communication device 200 to the first wireless communication device 100. Accordingly, the first wireless communication device 100 may display the time zone information of the second wireless communication device 200.

The time zone information of the second wireless communication device 200 may be the standard time zone information, the current time information, the location information, and the like thereof.

For example, as illustrated in FIG. 35, when the first wireless communication device 100 of the first user (for example, Kate) is located in Seoul and the second wireless communication device 200 of the second user (for example, Claire) is located in New York, the first wireless communication device 100 may display a time 3510 (i.e., a first time) based on the time zone information of the first wireless communication device 100 and a time 3520 (i.e., a second time) based on the time zone information of the second wireless communication device 200, as the time when the first user or the second user has registered or shared the content with each other.

For example, the first time 3510 may be displayed in brackets, and the second time 3520 may be displayed without brackets. Alternatively, the first time 3510 and the second time 3520 may be displayed in different colors. Alternatively, the first time 3510 may be first displayed, and, when the first user selects (for example, touches) the first time 3510, the second time 3520 may be displayed.

Accordingly, the first user may easily ascertain when registered or shared content is registered or shared based on the time zone information of the second user.

Figure 36:
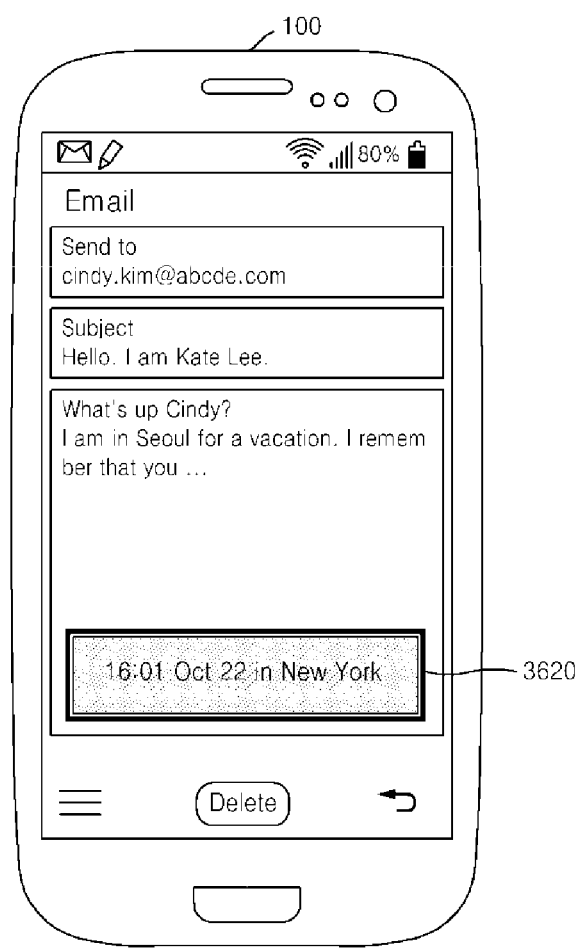
FIG. 36 illustrates an example in which the first wireless communication device displays the time zone information of the second wireless communication device when an e-mail application is executed, according to an exemplary embodiment.

FIG. 36 illustrates an example in which the first wireless communication device 100 displays the time zone information of the second wireless communication device 200 when an e-mail application is executed, according to an exemplary embodiment.

When the user of the first wireless communication device 100 (i.e., the first user) wants to transmit an e-mail to the user of the second wireless communication device 200 (i.e., the second user), the user of the first wireless communication device 100 may input the identification information of the second wireless communication device 200. For example, the first user may directly input identification information of the second wireless communication device 200 (for example, the name, nickname, telephone number, e-mail address, photograph, shortcut number, or the like of the second user) or select identification information of the second wireless communication device 200 from a contact information list stored in the first wireless communication device 100.

When the identification information of the second wireless communication device 200 is input, the first wireless communication device 100 may receive the time zone information of the second wireless communication device 200 based on the identification information of the second wireless communication device 200. For example, the first wireless communication device 100 may request the server 300 for the time zone information of the second wireless communication device 200 and receive the time zone information of the second wireless communication device 200 from the server 300, based on the identification information of the second wireless communication device 200.

Alternatively, the first wireless communication device 100 may extract the time zone information of the second wireless communication device 200 stored in the contact information in the first wireless communication device 100, based on the identification information of the second wireless communication device 200.

The first wireless communication device 100 may compare the time zone information of the second wireless communication device 200 with the time zone information of the first wireless communication device 100. When the time zone information of the second wireless communication device 200 is different from the time zone information of the first wireless communication device 100, the first wireless communication device 100 may display the time zone information of the second wireless communication device 200. The time zone information of the second wireless communication device 200 may be displayed as the standard time zone information, the current time information, the location information, and the like thereof.

For example, as illustrated in FIG. 36, the first wireless communication device 100 may display time zone information 3620 of the second wireless communication device 200 (for example, 16:01 October 22 in New York) on a part of an e-mail screen.

Accordingly, the first wireless communication device 100 according to an exemplary embodiment displays the time zone information of the second wireless communication device 200 on an e-mail screen so that the first user may ascertain whether the second user is able to receive an e-mail before transmitting the e-mail.

Figure 37:
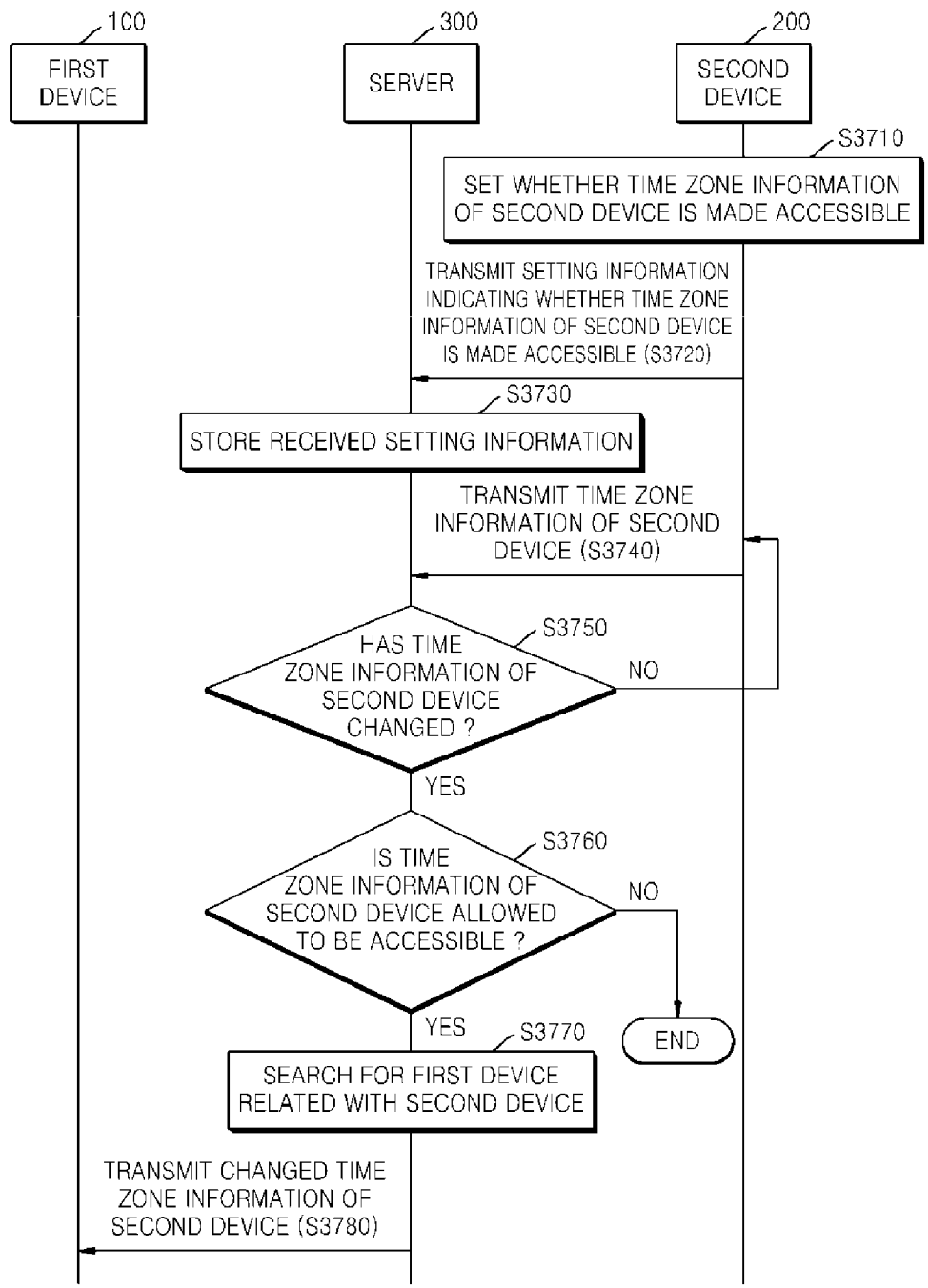
FIG. 37 is a flowchart of a method in which the first wireless communication device receives the time zone information of the second wireless communication device based on whether the time zone information of the second wireless communication device is made accessible, according to an exemplary embodiment.

FIG. 37 is a flowchart of a method in which the first wireless communication device 100 receives the time zone information of the second wireless communication device 200 based on whether the time zone information of the second wireless communication device 200 is made accessible, according to an exemplary embodiment.

Referring to FIG. 37, in operation S3710, the second wireless communication device 200 may receive an input as to whether the time zone information of the second wireless communication device 200 is made accessible to wireless communication devices related to the second wireless communication device 200. For example, the user of the second wireless communication device 200 (i.e., the second user) may set whether the time zone information of the second wireless communication device 200 is made accessible to an external wireless communication device corresponding to identification information stored in contact information in the second wireless communication device 200, an external wireless communication device corresponding to identification information remaining in a call record in the second wireless communication device 200, and a wireless communication device of a user who belongs to the same social group together with the second user via an SNS.

In operation S3720, the second wireless communication device 200 may transmit to the server 300 setting information indicating whether time zone information of the second wireless communication device 200 is made accessible. In operation S3730, the server 300 may store the received setting information.

In operation S3740, the second wireless communication device 200 may transmit the time zone information of the second wireless communication device 200 to the server 300. In operation S3750, the server 300 may store the received time zone information of the second wireless communication device 200 and compare pre-stored time zone information of the second wireless communication device 200 with the received time zone information of the second wireless communication device 200 to determine whether the time zone information of the second wireless communication device 200 has changed.

When the time zone information of the second wireless communication device 200 has changed, the server 300 may update and store the time zone information of the second wireless communication device 200, and may determine whether the time zone information of the second wireless communication device 200 is allowed to be accessible, based on the received setting information indicating whether the time zone information of the second wireless communication device 200 is made accessible, in operation S3760.

When the time zone information of the second wireless communication device 200 is not allowed to be accessible, the server 300 may not transmit the time zone information of the second wireless communication device 200 to wireless communication devices other than the second wireless communication device 200.

When the time zone information of the second wireless communication device 200 is not allowed to be accessible, the server 300 may not receive the time zone information of the second wireless communication device 200. For example, when the time zone information of the second wireless communication device 200 is not allowed to be accessible, the server 300 may not receive the time zone information of the second wireless communication device 200 until receiving setting information indicating that the time zone information of the second wireless communication device 200 is allowed to be accessible.

On the other hand, when the time zone information of the second wireless communication device 200 is allowed to be accessible, the server 300 may search for the first wireless communication device 100 related with the second wireless communication device 200, in operation S3770.

Examples of the first wireless communication device 100 related with the second wireless communication device 200 may include an external wireless communication device corresponding to identification information stored in contact information in the second wireless communication device 200, an external wireless communication device corresponding to identification information remaining in a call record in the second wireless communication device 200, and a wireless communication device of a user who belongs to the same social group together with the second user (i.e., the user of the second wireless communication device 200) via an SNS.

Accordingly, in operation S3780, the server 300 may transmit changed time zone information of the second wireless communication device 200 to the found first wireless communication device 100. For example, the server 300 may transmit changed standard time zone information, changed current time information, changed location information, and the like of the second wireless communication device 200 to the first wireless communication device 100.

Figure 38:
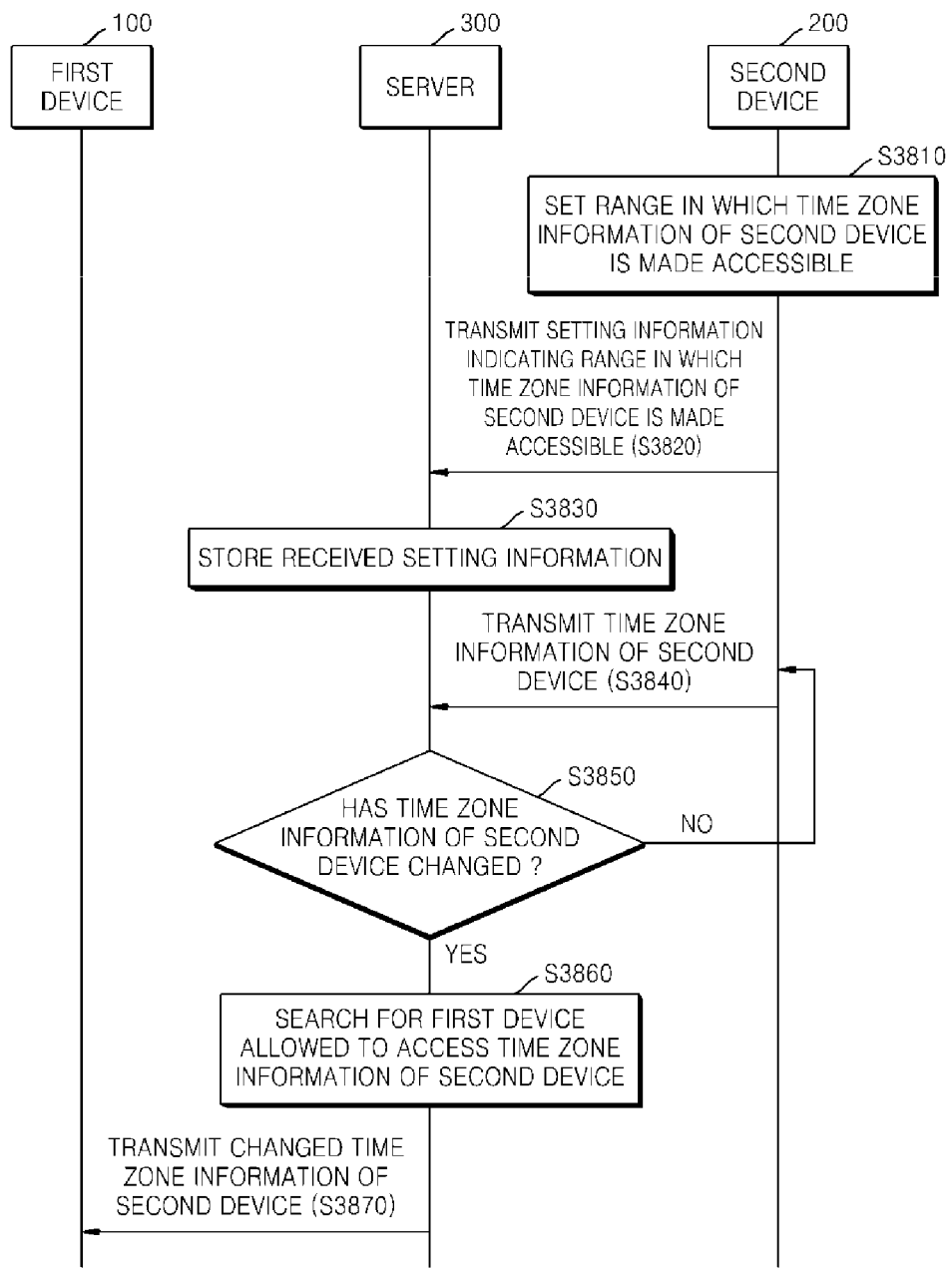
FIG. 38 is a flowchart of a method in which the first wireless communication device receives the time zone information of the second wireless communication device based on the range in which the time zone information of the second wireless communication device is made accessible, according to an exemplary embodiment.

FIG. 38 is a flowchart of a method in which the first wireless communication device 100 receives the time zone information of the second wireless communication device 200 based on the range in which the time zone information of the second wireless communication device 200 is made accessible, according to an exemplary embodiment.

Referring to FIG. 38, the second wireless communication device 200 may receive an input about the range in which the time zone information thereof is made accessible. At this time, the user of the second wireless communication device 200 (i.e., the second user) may set the range in which the time zone information of the second wireless communication device 200 is made accessible, in operation S3810. For example, the second user may set some of the external wireless communication devices related with the second wireless communication device 200, as the wireless communication devices to which the time zone information of the second wireless communication device 200 is to be made accessible.

In operation S3820, the second wireless communication device 200 may transmit to the server 300 setting information indicating the range in which the time zone information of the second wireless communication device 200 is made accessible. In operation S3830, the server 300 may store the received setting information.

In operation S3840, the second wireless communication device 200 may transmit the time zone information of the second wireless communication device 200 to the server 300. In operation S3850, the server 300 may store the received time zone information of the second wireless communication device 200 and compare pre-stored time zone information of the second wireless communication device 200 with the received time zone information of the second wireless communication device 200 to determine whether the time zone information of the second wireless communication device 200 has changed.

When the time zone information of the second wireless communication device 200 has changed, the server 300 may update and store the time zone information of the second wireless communication device 200, and may search for the first wireless communication device 100 allowed to access the time zone information of the second wireless communication device 200, based on the received setting information indicating the range in which the time zone information of the second wireless communication device 200 is made accessible, in operation S3860.

Accordingly, in operation S3870, the server 300 may transmit changed time zone information of the second wireless communication device 200 to the found first wireless communication device 100. For example, the server 300 may transmit changed standard time zone information, changed current time information, changed location information, and the like of the second wireless communication device 200 to the first wireless communication device 100.

Figure 39:
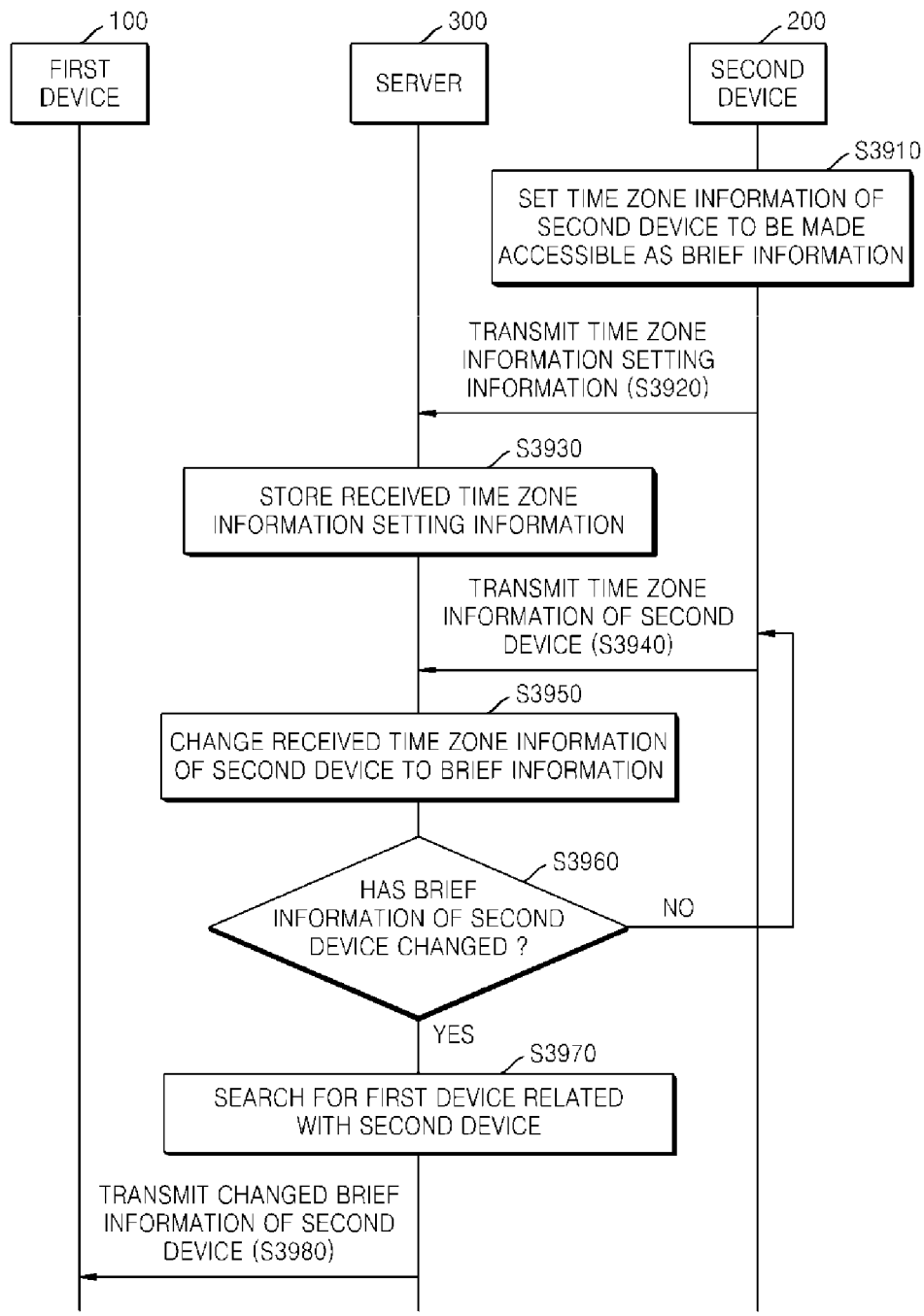
FIG. 39 is a flowchart of a method in which the first wireless communication device receives the time zone information of the second wireless communication device when the second wireless communication device sets the time zone information of the second wireless communication device to be made accessible as brief information, according to an exemplary embodiment.

FIG. 39 is a flowchart of a method in which the first wireless communication device 100 receives the time zone information of the second wireless communication device 200 when the second wireless communication device 200 sets the time zone information of the second wireless communication device 200 to be made accessible as brief information, according to an exemplary embodiment.

Referring to FIG. 39, the second wireless communication device 200 may set the time zone information of the second wireless communication device 200 to be made accessible as brief information, in operation S3910. The brief information may be information briefly indicating the time zone information of the second wireless communication device 200, and only whether the second wireless communication device 200 is located in a region where it is a.m. or p.m., or it is morning, afternoon, or night may be ascertained from the brief information.

For example, the brief information may be displayed as a brief information icon. A brief information icon on which a sun is displayed may indicate that the second wireless communication device 200 is located in a region where it is daytime. A brief information icon on which a moon is displayed may indicate that the second wireless communication device 200 is located in a region where it is nighttime.

In operation S3920, the second wireless communication device 200 may transmit time zone information setting information to the server 300. In operation S3930, the server 300 may store the received time zone information setting information.

In operation S3940, the second wireless communication device 200 may transmit the time zone information of the second wireless communication device 200 to the server 300. In operation S3950, the server 300 may change the received time zone information of the second wireless communication device 200 to brief information and store the brief information.

In operation S3960, the server 300 may compare brief information corresponding to pre-stored time zone information of the second wireless communication device 200 with the brief information corresponding to the received time zone information of the second wireless communication device 200 to determine whether the brief information of the second wireless communication device 200 has changed.

If it is determined that the brief information of the second wireless communication device 200 has changed, the server 300 may update and store the brief information of the second wireless communication device 200, and may search for the first wireless communication device 100 related with the second wireless communication device 200, in operation S3970. Because operation S3970 of FIG. 39 corresponds to operation S3770 of FIG. 37, a repeated description thereof will be omitted.

Accordingly, in operation S3980, the server 300 may transmit changed brief information of the second wireless communication device 200 to the found first wireless communication device 100.

Alternatively, the second wireless communication device 200 may change the time zone information of the second wireless communication device 200 to brief information and transmit the brief information instead of the time zone information of the second wireless communication device 200 to the server 300, in operation S3940. In this case, not only the first wireless communication device 100 related with the second wireless communication device 200 but also the server 300 may not ascertain detailed time zone information of the second wireless communication device 200. Accordingly, security may be strengthened in the personal information of the user of the second wireless communication device 200.

Figure 40:
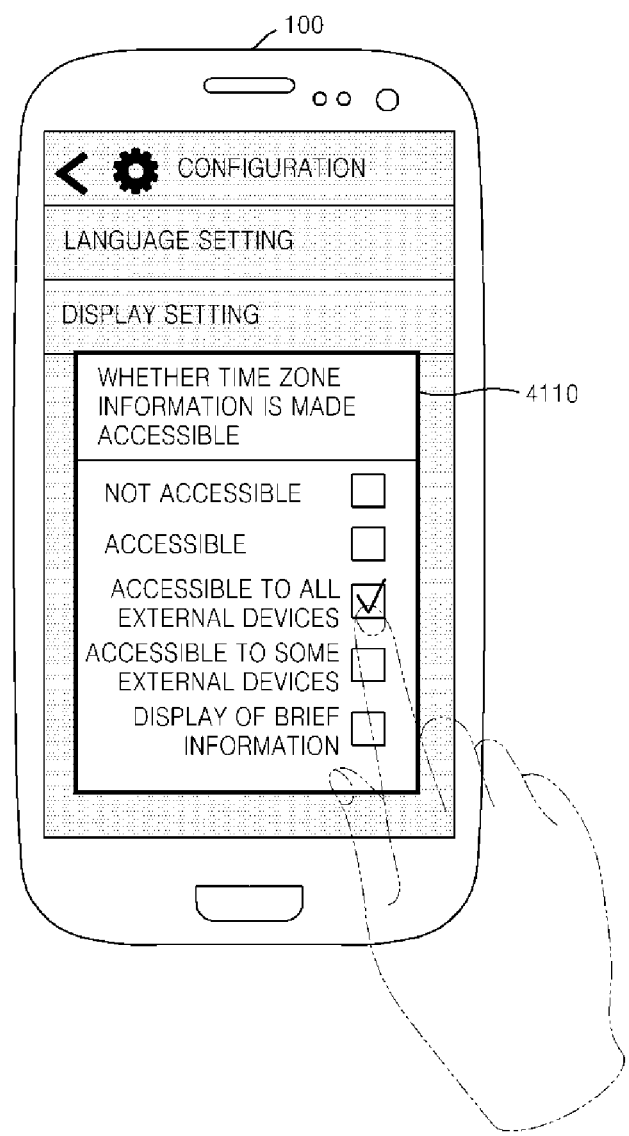
FIGS. 40, 41A, and 41B illustrate a screen for setting whether the time zone information of the second wireless communication device is made accessible.
Figure 41A:
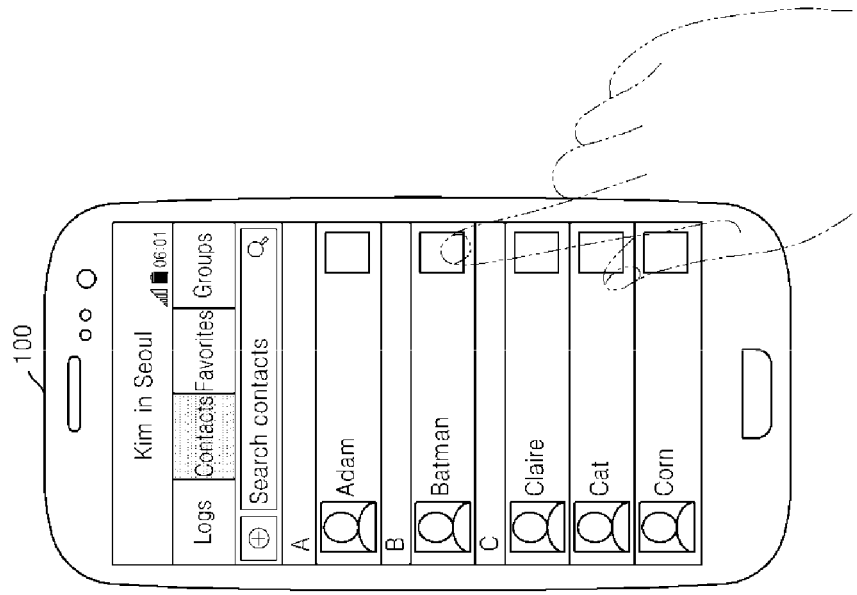
Figure 41B:
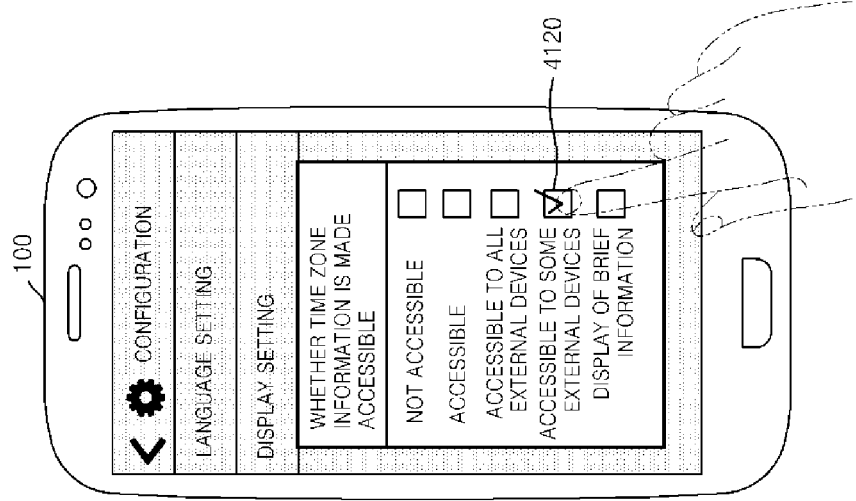

FIGS. 40, 41A, and 41B illustrate a screen for setting whether the time zone information of the second wireless communication device is made accessible.

As illustrated in FIG. 40, the second wireless communication device 200 may provide a graphical user interface (GUI) 4110 for setting whether the time zone information of the second wireless communication device 200 is made accessible. In this case, when the user of the second wireless communication device 200 (i.e., the second user) does not want to make the time zone information of the second wireless communication device accessible, the user of the second wireless communication device 200 may select a not-accessible option on the GUI 4110.

Alternatively, as illustrated in FIG. 41A, the second wireless communication device 200 may provide a GUI 4110 for setting the range in which the time zone information of the second wireless communication device 200 is made accessible. In this case, the second user may select an accessible-to-all option on the GUI 4110 when the second user wants the time zone information of the second wireless communication device 200 to be accessible to all external wireless communication devices, and may select an accessible-to-some option on the GUI 4110 when the second user wants the time zone information of the second wireless communication device 200 to be accessible to some external wireless communication devices.

When the second user selects the accessible-to-some option on the GUI 4110, as illustrated in FIG. 41B, the second wireless communication device 200 may display a list including respective identification information of wireless communication devices related with the second wireless communication device 200. For example, the second wireless communication device 200 may display a contact information screen. In this case, the second user may select external wireless communication devices to which the second user wants the time zone information of the second wireless communication device 200 to be accessible, from the displayed list. Alternatively, the user may select whether the time zone information is available based on a group of users (i.e., family, friends, etc.).

Accordingly, the second user may set the time zone information of the second wireless communication device 200 to be accessible to only the external wireless communication devices that he or she wants.

Referring to FIGS. 40 and 41A, the second wireless communication device 200 may also provide the GUI 4110 for setting the time zone information of the second wireless communication device 200 to be made accessible as brief information. When the second user wants the time zone information of the second wireless communication device 200 to be made accessible as brief information, the second user may select a brief information display option on the GUI 4110.

Accordingly, the second user may display the time zone information of the second wireless communication device 200 as brief information indicating only whether the second wireless communication device 200 is located in a region where it is a.m. or p.m., or it is morning, afternoon, or night, without displaying a detailed time of the second wireless communication device 200.

FIGS. 42A-44B illustrate examples in which the first wireless communication device 100 displays information about the user of the second wireless communication device 200.

Figure 42B:
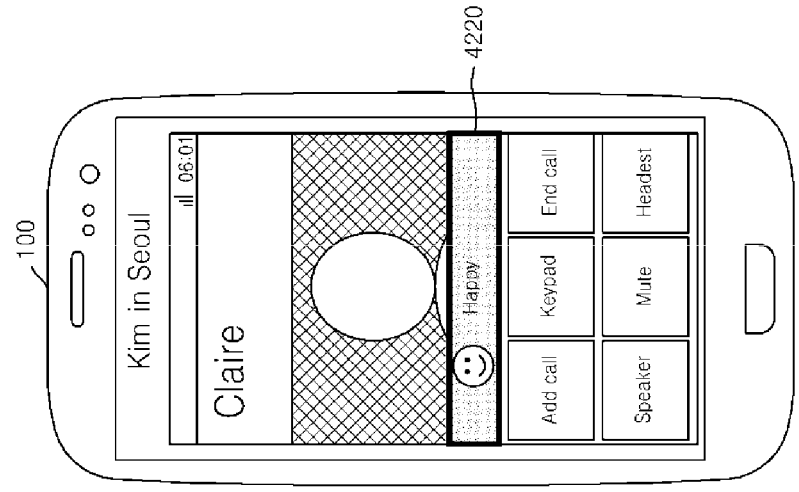
FIGS. 42A-44B illustrate examples in which the first wireless communication device displays information about the user of the second wireless communication device, according to an exemplary embodiment.
Figure 42A:
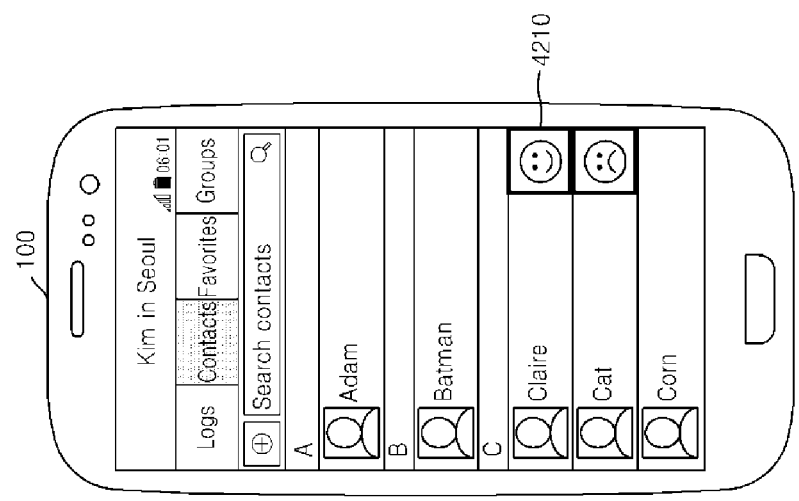

FIG. 42A illustrates an example in which emotion state information of the user of the second wireless communication device 200 is displayed on a contact information screen of the first wireless communication device 100. FIG. 42B illustrates an example in which the first wireless communication device 100 displays the emotion state information of the user of the second wireless communication device 200 when requesting a call connection to the second wireless communication device 200.

Referring to FIG. 42A, the first wireless communication device 100 may request the server 300 to update the emotion state information of the user of the second wireless communication device 200 displayed on the contact information screen of the first wireless communication device 100. The first wireless communication device 100 according to an exemplary embodiment may automatically transmit an update request for the emotion state information of the user of the second wireless communication device 200 to the server 300 when the contact information application is executed. Alternatively, when the contact information application is executed, the first wireless communication device 100 may transmit the update request for the emotion state information of the user of the second wireless communication device 200 to the server 300, based on a user input.

The first wireless communication device 100 may display the identification information of the user of the second wireless communication device 200 (for example, the name, nickname, telephone number, e-mail address, photograph, shortcut number, or the like of the second user) on the contact information screen of the first wireless communication device 100.

The first wireless communication device 100 may display the emotion state information of the user of the second wireless communication device 200 within or around an area on the contact information screen on which the identification information of the second wireless communication device 200 is displayed. For example, as illustrated in FIG. 42A, the emotion state information may be displayed as an emoticon 4210. The emoticon 4210 is a pictorial symbol capable of expressing emotion, and may be an angry-face emoticon, a smiley-face emoticon, or the like. However, exemplary embodiments are not limited thereto.

Referring to FIG. 42B, the first wireless communication device 100 may request a call connection to the second wireless communication device 200.

For example, the user of the first wireless communication device 100 may directly input identification information of the second wireless communication device 200 to which a call connection is to be requested, or select the name of the user of the second wireless communication device 200 (for example, Claire) from a contact information list stored in the first wireless communication device 100. When the identification information of the second wireless communication device 200 is input, the user of the first wireless communication device 100 may select a 'call' key.

In response to the 'call' key selection, the first wireless communication device 100 may request the server 300 for the emotion state information of the user of the second wireless communication device 200 and receive the emotion state information of the user of the second wireless communication device 200 from the server 300, based on the input identification information of the second wireless communication device 200. Alternatively, the first wireless communication device 100 may extract the emotion state information of the user of the second wireless communication device 200 stored in the contact information in the first wireless communication device 100.

The first wireless communication device 100 may request a call connection to the second wireless communication device 200 and at the same time may display the emotion state information of the user of the second wireless communication device 200 on a call connection request screen. For example, as illustrated in FIG. 42B, the first wireless communication device 100 may display the emoticon 4220 (for example, a smiley-face emoticon) indicating an emotion of the user of the second wireless communication device 299, but exemplary embodiments are not limited thereto.

Figure 43A:
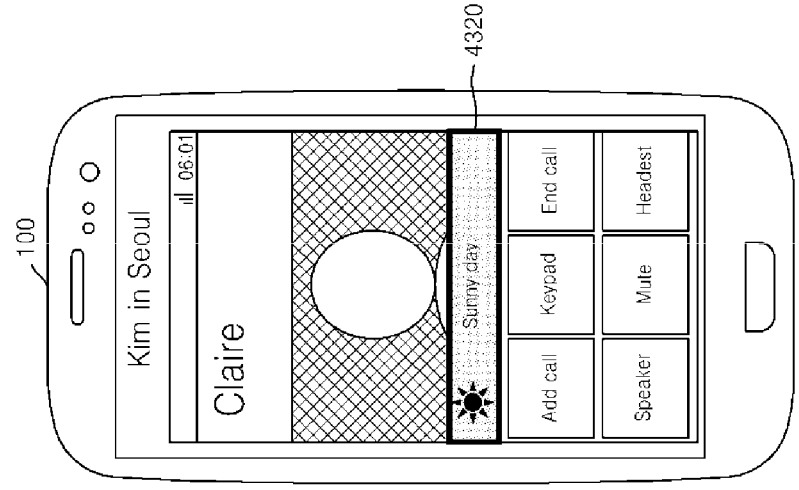
Figure 43B:
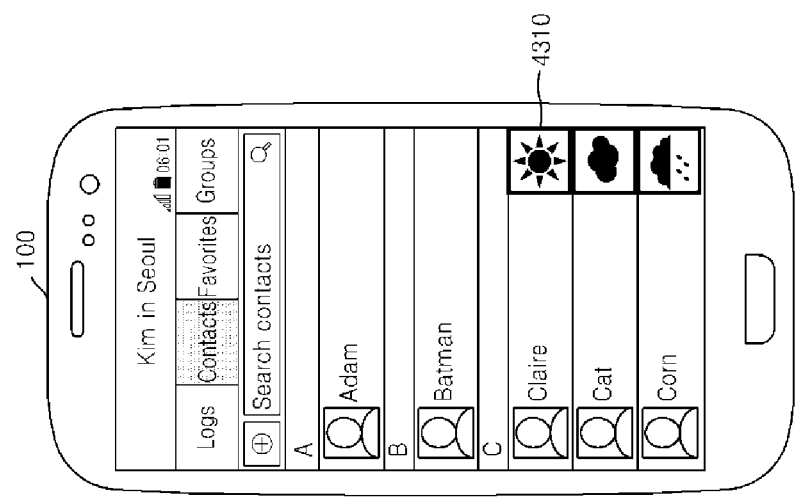

FIG. 43A illustrates an example in which weather information of a region where the second wireless communication device 200 is located is displayed on a contact information screen of the first wireless communication device 100. FIG. 43B illustrates an example in which the first wireless communication device 100 displays the weather information of the region where the second wireless communication device 200 is located, when requesting a call connection to the second wireless communication device 200.

Referring to FIG. 43A, the first wireless communication device 100 may request the server 300 to update the weather information of the region where the second wireless communication device 200 is located, the weather information being displayed on the contact information screen of the first wireless communication device 100. The first wireless communication device 100 according to an exemplary embodiment may automatically transmit to the server 300 an update request for the weather information of the region where the second wireless communication device 200 is located, when the contact information application is executed. Alternatively, when the contact information application is executed, the first wireless communication device 100 may transmit to the server 300 the update request for the weather information of the region where the second wireless communication device 200 is located, based on a user input.

The first wireless communication device 100 may display the identification information of the user of the second wireless communication device 200 (for example, the name, nickname, telephone number, e-mail address, photograph, shortcut number, or the like of the second user) on the contact information screen of the first wireless communication device 100.

The first wireless communication device 100 may display the weather information of the region where the second wireless communication device 200 is located, within or around an area on the contact information screen on which the identification information of the second wireless communication device 200 is displayed. For example, as illustrated in FIG. 43A, the weather information may be displayed as a weather icon 4310. The weather icon is a pictorial symbol that expresses the weather, and may be an icon indicating a fine weather, an icon indicating a cloud weather, an icon indicating a rainy weather, or the like. However, exemplary embodiments are not limited thereto.

Referring to FIG. 43B, the first wireless communication device 100 may request a call connection to the second wireless communication device 200.

For example, the user of the first wireless communication device 100 may directly input identification information of the second wireless communication device 200 to which a call connection is to be requested, or select the name of the user of the second wireless communication device 200 (for example, Claire) from a contact information list stored in the first wireless communication device 100. When the identification information of the second wireless communication device 200 is input, the user of the first wireless communication device 100 may select a 'call' key.

In response to the 'call' key selection, the first wireless communication device 100 may request the server 300 for the weather information of the region where the second wireless communication device 200 is located, and receive the weather information of the region where the second wireless communication device 200 is located from the server 300, based on the input identification information of the second wireless communication device 200. Alternatively, the first wireless communication device 100 may extract the weather information of the region where the second wireless communication device 200 is located, which is stored in the contact information in the first wireless communication device 100.

The first wireless communication device 100 may request a call connection to the second wireless communication device 200 and at the same time may display the weather information of the region where the second wireless communication device 200 is located on a call connection request screen. For example, as illustrated in FIG. 43B, the first wireless communication device 100 may display an icon 4320 (for example, an icon indicating fine weather) indicating the weather information of the region where the second wireless communication device 200 is located, but exemplary embodiments are not limited thereto.

Figure 44A:
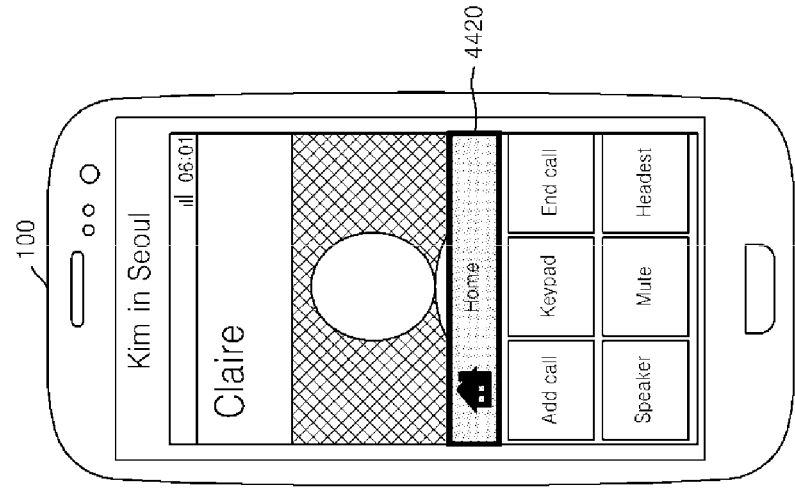
Figure 44B:
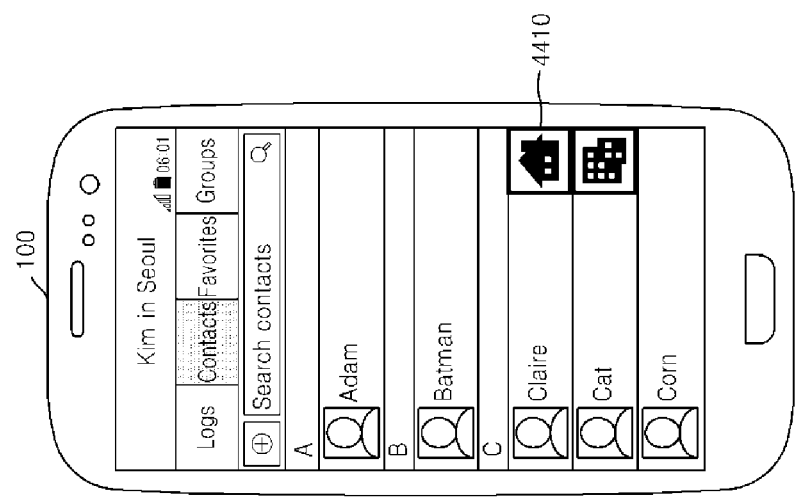

FIG. 44A illustrates an example in which relative location information of the second wireless communication device 200 is displayed on a contact information screen of the first wireless communication device 100. FIG. 44B illustrates an example in which the first wireless communication device 100 displays the relative location information of the second wireless communication device 200 when requesting a call connection to the second wireless communication device 200.

The relative location information of the second wireless communication device 200 may indicate location information based on the second user. For example, the relative location information of the second wireless communication device 200 may indicate whether the second user is located in the house, office, school, library, or the like. The relative location information may be determined by, for example, a wireless access point to which the wireless communication device is connected or GPS information. Alternatively, a user may manually set the relative location information to indicate the relative location thereof.

Referring to FIG. 44A, the first wireless communication device 100 may request the server 300 to update the relative location information of the second wireless communication device 200 that is displayed on the contact information screen of the first wireless communication device 100. The first wireless communication device 100 according to an exemplary embodiment may automatically transmit an update request for the relative location information of the second wireless communication device 200 to the server 300 when the contact information application is executed. Alternatively, when the contact information application is executed, the first wireless communication device 100 may transmit the update request for the relative location information of the second wireless communication device 200 to the server 300, based on a user input.

The first wireless communication device 100 may display the identification information of the user of the second wireless communication device 200 (for example, the name, nickname, telephone number, e-mail address, photograph, shortcut number, or the like of the second user) on the contact information screen of the first wireless communication device 100.

The first wireless communication device 100 may display the relative location information of the second wireless communication device 200, within or around an area on the contact information screen on which the identification information of the second wireless communication device 200 is displayed. For example, as illustrated in FIG. 44A, the relative location information may be displayed as an icon. A relative location information icon 4410 may be a house icon (i.e., an icon indicating that the second user is in the house), an office icon (i.e., an icon indicating that the second user is in the office), a library icon (i.e., an icon indicating that the second user is in the library), or the like. However, exemplary embodiments are not limited thereto.

Referring to FIG. 44B, the first wireless communication device 100 may request a call connection to the second wireless communication device 200.

For example, the user of the first wireless communication device 100 may directly input identification information of the second wireless communication device 200 to which a call connection is to be requested, or select the name of the user of the second wireless communication device 200 (for example, Claire) from a contact information list stored in the first wireless communication device 100. When the identification information of the second wireless communication device 200 is input, the user of the first wireless communication device 100 may select a 'call' key.

In response to the 'call' key selection, the first wireless communication device 100 may request the server 300 for the relative location information of the second wireless communication device 200 and receive the relative location information of the second wireless communication device 200 from the server 300, based on the input identification information of the second wireless communication device 200. Alternatively, the first wireless communication device 100 may extract the relative location information of the second wireless communication device 200 stored in the contact information in the first wireless communication device 100.

The first wireless communication device 100 may request a call connection to the second wireless communication device 200 and at the same time may display the relative location information of the second wireless communication device 200 on a call connection request screen. For example, as illustrated in FIG. 44B, the first wireless communication device 100 may display an icon 4420 (for example, a house icon) indicating the relative location information of the second wireless communication device 200, but embodiments of the present invention are not limited thereto.

Figure 45:
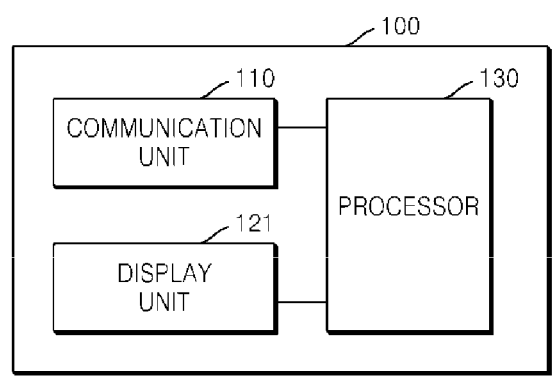
FIGS. 45 and 46 are block diagrams of a structure of the first wireless communication device, according to an exemplary embodiment.
Figure 46:
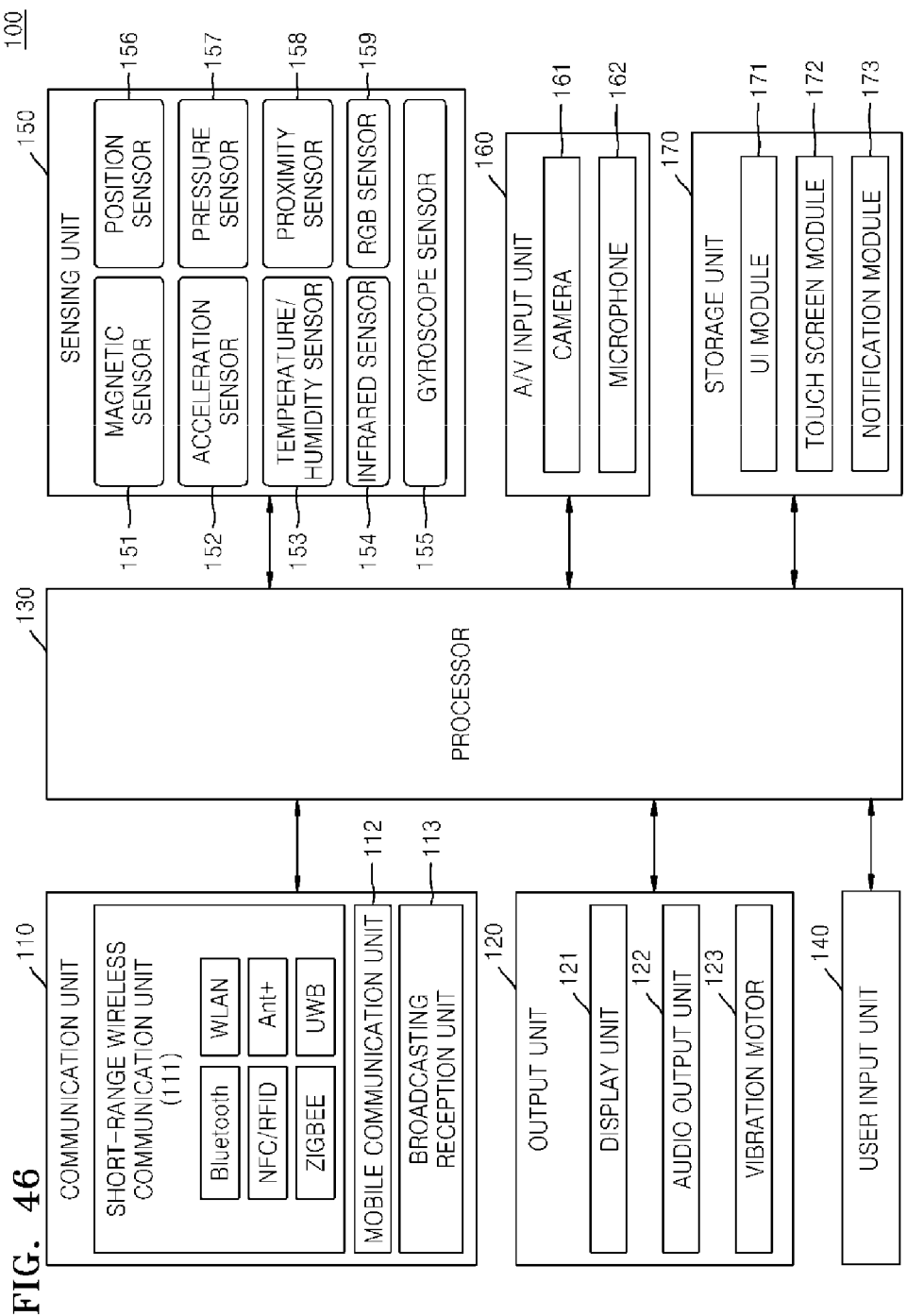

FIGS. 45 and 46 are block diagrams of a structure of the first wireless communication device 100, according to an exemplary embodiment.

Referring to FIG. 45, the first wireless communication device 100 may include a communication unit 110, a display unit 121, and a processor 130. The first wireless communication device 100 may be implemented by more components than those illustrated in FIG. 45 or by fewer components than those illustrated in FIG. 45.

For example, as illustrated in FIG. 46, the first wireless communication device 100 may further include an output unit 120, a user input unit 140, a sensing unit 150, an audio/video (A/V) input unit 160, and a storage unit 150, in addition to the communication unit 110, the display unit 121, and the processor 130.

The aforementioned components will now be described in detail.

The communication unit 110 may include at least one component that enables communication between the first wireless communication device 100 and the second wireless communication device 200 or between the first wireless communication device 100 and the server 300. For example, the communication unit 110 may include a short-range wireless communication unit 111, a mobile communication unit 112, and a broadcasting reception unit 113.

Examples of the short-range wireless communication unit 111 may include, but is not limited thereto, a Bluetooth communication unit, a Near Field Communication unit, a WLAN (i.e., WiFi) communication unit, a Zigbee) communication unit, an infrared Data Association (IrDA) communication unit, an ultra wideband (UWB) communication unit, an Ant+ communication unit, and the like.

The mobile communication unit 112 may exchange a wireless signal with at least one selected from a base station, an external terminal, and the server 300 on a mobile communication network. Examples of the wireless signal may include a voice call signal, a video call signal, and various types of data generated during a short message service (SMS)/multimedia messaging service (MMS).

The broadcasting reception unit 113 receives a broadcasting signal and/or broadcasting-related information from an external source via a broadcasting channel. The broadcasting channel may be a satellite channel, a ground wave channel, or the like. According to exemplary embodiments, the first wireless communication device 100 may not include the broadcasting reception unit 1130.

The communication unit 110 may receive the time zone information of the second wireless communication device 200 related with the first wireless communication device 100 from the server 300. For example, when the time zone information of the second wireless communication device 200 changes, the communication unit 110 may receive the time zone information of the second wireless communication device 200 from the server 300. The communication unit 110 may request the server 300 for the time zone information of the second wireless communication device 200 and receive the time zone information of the second wireless communication device 200 from the server 300.

The communication unit 110 may transmit to the server 300 an update request for contact information in the first wireless communication device 100 including identification information of the second wireless communication device 200, and may receive the time zone information of the second wireless communication device 200 as a response to the update request from the server 300.

When the time of the second wireless communication device 200 reaches the reserved sending time, the communication unit 110 may transmit a reserved message to the second wireless communication device 200, based on the received time zone information of the second wireless communication device 200.

The communication unit 110 may transmit the time zone information of the first wireless communication device 100 to the server 300 at regular intervals. Alternatively, when an event where the time zone information of the first wireless communication device 100 changes occurs, the communication unit 110 may transmit the time zone information of the first wireless communication device 100 to the server 300.

The output unit 120 outputs an audio signal, a video signal, or a vibration signal, and may include a display unit 121, an audio output unit 122, and a vibration motor 123.

The display unit 121 displays information that is processed by the first wireless communication device 100. For example, when the time zone information of the second wireless communication device 200 is different from the time zone information of the first wireless communication device 100, the display unit 121 may display the time zone information of the second wireless communication device 200 on an area of the display unit 121 that provides information about the second wireless communication device 200.

The display unit 121 may display the time zone information of the second wireless communication device 200 on the contact information in the first wireless communication device 100 including the identification information of the second wireless communication device 200.

The display unit 121 may display the time zone information of the second wireless communication device in a message window for exchanging messages between the first wireless communication device 100 and the second wireless communication device 200. For example, the display unit 121 may display the time zone information of the second wireless communication device 200 on at least one region selected from a message input region and a message display region included in the message window.

The display unit 121 may display an execution window on which an SNS application is executed, and may display the time zone information of the second wireless communication device 200 on an area on the execution window that corresponds to the identification information of the second wireless communication device 200.

The display unit 121 may output a notification message indicating that transmission of a reserved message to the second wireless communication device 200 has been completed. When the time of the second wireless communication device 200 reaches the call reservation time, the display unit 121 may output a call reservation notification message, based on the received time zone information of the second wireless communication device 200.

When the display unit 121 forms a layer structure together with a touch pad to construct a touch screen, the display unit 121 may be used as an input wireless communication device as well as an output wireless communication device. The display unit 121 may include at least one selected from a liquid crystal display (LCD), a thin film transistor-liquid crystal display (TFT-LCD), an organic light-emitting diode (OLED), a flexible display, a 3D display, and an electrophoretic display. According to exemplary embodiments of the first wireless communication device 100, the first wireless communication device 100 may include at least two display units 121.

The audio output unit 122 may output audio data that is received from the communication unit 110 or stored in the storage unit 170. The audio output unit 122 may also output an audio signal (for example, a call signal receiving sound, a message receiving sound, a notification sound) related with a function of the first wireless communication device 100. The audio output unit 122 may include a speaker, a buzzer, and the like.

The vibration motor 123 may output a vibration signal. For example, the vibration motor 123 may output a vibration signal corresponding to an output of audio data or video data (for example, a call signal receiving sound or a message receiving sound). The vibration motor 123 may also output a vibration signal when the touch screen is touched.

The processor 130 (central processing unit, microprocessor, etc.) controls all operations of the first wireless communication device 100. For example, the processor 130 may control the communication unit 110, the output unit 120, the user input 140, the sensing unit 150, the A/V input unit 160, and the like by executing programs stored in the storage unit 170.

The processor 130 may compare the time zone information of the first wireless communication device 100 with the time zone information of the second wireless communication device 200. When the time zone information of the second wireless communication device 200 is different from the time zone information of the first wireless communication device 100, the processor 130 may control the display unit 121 to display the time zone information of the second wireless communication device 200 on the area of the display unit 121 that provides the information about the second wireless communication device 200.

The processor 130 may extract the time zone information of the first wireless communication device 100 based on the identification information of the second wireless communication device 200. When the extracted time zone information of the second wireless communication device 200 is different from the time zone information of the first wireless communication device 100, the processor 130 may control the display unit 121 to display the time zone information of the second wireless communication device 200 on a dialing screen displayed before a call connection to the second wireless communication device 200.

When the processor 130 has received the location information of the second wireless communication device 200 from the server 300, the processor 130 may search for time zone information of the second wireless communication device 200 that corresponds to the location information of the second wireless communication device 200.

The user input unit 140 denotes a unit via which a user inputs data for controlling the first wireless communication device 100. For example, the user input unit 140 may be, but not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The user input 140 may receive the identification information of the second wireless communication device 200. For example, the user input 140 may receive the name, nickname, photography, telephone number, e-mail address, or the like of the second user that uses the second wireless communication device 200.

The user input unit 140 may receive a reserved sending time for sending a message to the second wireless communication device 200, based on the time zone information of the second wireless communication device 200. The user input unit 140 may also receive a call reservation time for requesting a call connection to the second wireless communication device 200, based on the time zone information of the second wireless communication device 200.

The sensing unit 150 may sense the status of the first wireless communication device 100 or the status of the surrounding of the first wireless communication device 100 and may transmit information corresponding to the sensed status to the processor 130.

The sensing unit 150 may include, but is not limited thereto, at least one selected from a magnetic sensor 151, an acceleration sensor 152, a temperature/humidity sensor 153, an infrared sensor 154, a gyroscope sensor 155, a position sensor (e.g., a GPS) 156, a pressure sensor 157, a proximity sensor 158, and an RGB sensor 159 (i.e., an luminance sensor). Functions of most of the sensors would be instinctively understood by one of ordinary skill in the art in view of their names and thus detailed descriptions thereof will be omitted herein.

The A/V input unit 160 inputs an audio signal or a video signal, and may include a camera 161 and a microphone 162. The camera 161 may acquire an image frame, such as a still image or a moving picture, via an image sensor in a video call mode or a photography mode. An image captured via the image sensor may be processed by the processor 130 or a separate image processor (not shown).

The image frame obtained by the camera 161 may be stored in the storage unit 170 or transmitted to the outside via the communication unit 110. At least two cameras 161 may be included according to embodiments of the first wireless communication device 100.

The microphone 162 receives an external audio signal and converts the external audio signal into electrical audio data. For example, the microphone 162 may receive an audio signal from an external wireless communication device or a speaking person. The microphone 162 may use various noise removal algorithms in order to remove noise that is generated while receiving the external audio signal.

The storage unit 170 may store identification information of an external wireless communication device (for example, the second wireless communication device 200). For example, the storage unit 170 may store the name, nick name, telephone number, e-mail address, photography, shortcut number, and the like of a user who uses an external wireless communication device.

The storage unit 170 may store a program used by the processor 130 to perform processing and control, and may also store input/output data (for example, an application, content, time zone information of an external wireless communication device, and an address book).

The storage unit 170 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The first wireless communication device 100 may operate a web storage or a cloud server on the internet which performs a storage function of the storage unit 170.

The programs stored in the storage unit 170 may be classified into a plurality of modules according to their functions, for example, a user interface (UI) module 171, a touch screen module 172, and a notification module 173.

The UI module 171 may provide a UI, GUI, or the like that is specialized for each application and interoperates with the first wireless communication device 100. The touch screen module 172 may detect a touch gesture on a touch screen of a user and transmit information regarding the touch gesture to the processor 130. The touch screen module 172 according to an exemplary embodiment may recognize and analyze a touch code. The touch screen module 172 may be configured by separate hardware including a controller.

In order to detect the actual touch or the proximate touch on the touch pad, the touch screen may internally or externally have various sensors. An example of the sensor used to detect the actual touch or the proximate touch on the touch screen may include a tactile sensor. The tactile sensor detects a contact of a specific object, with a sensitivity that is equal to or greater than that of human touch. The tactile sensor may detect various types of information, such as the roughness of a contact surface, the hardness of the contact object, the temperature of a contact point, or the like.

Another example of the sensor used to detect the actual touch or the proximate touch on the touch pad may include a proximity sensor.

The proximity sensor detects the existence of an object that approaches a predetermined detection surface or that exists nearby, by using a force of an electro-magnetic field or infrared rays, without using a mechanical contact. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. Examples of the touch gesture of the user may include tap, touch and hold, double tap, drag, panning, flick, drag and drop, swipe, and the like.

The notification module 173 may generate a signal for notifying that an event has been generated in the first wireless communication device 100. Examples of the event generated in the first wireless communication device 100 may include call signal receiving, message receiving, a key signal input, schedule notification, and the like. The notification module 173 may output a notification signal in the form of a video signal via the display unit 121), in the form of an audio signal via the audio output unit 122, or in the form of a vibration signal via the vibration motor 123.

Figure 47:
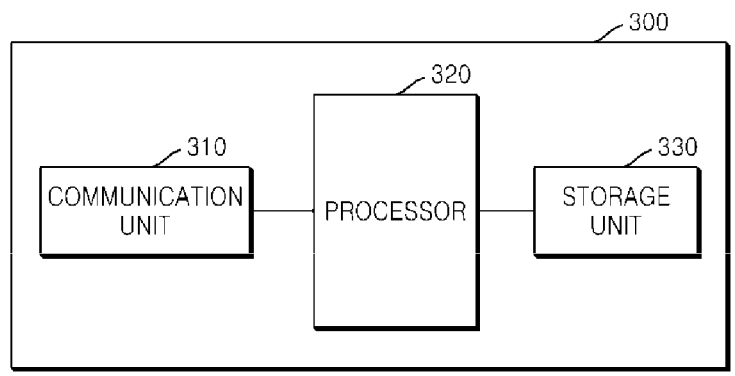
FIG. 47 is a block diagram of a structure of a server, according to an exemplary embodiment.

FIG. 47 is a block diagram of a structure of the server 300, according to an exemplary embodiment.

Referring to FIG. 47, the server 300 may include a communication unit 310, a processor 320, and a storage unit 330. The server 300 may be implemented by more components than those illustrated in FIG. 47 or by fewer components than those illustrated in FIG. 47.

The aforementioned components will now be described in detail.

The communication unit 310 may include at least one component that enables communication between the server 300 and the first wireless communication device 100 or between the second wireless communication device 200 and the server 300. The communication unit 310 may include a reception unit and a transmission unit.

The reception unit may receive time zone information of the first wireless communication device 100 from the first wireless communication device 100. For example, the reception unit may receive the time zone information of the first wireless communication device 100 from the first wireless communication device 100 at regular intervals. When an event in which the time zone information of the first wireless communication device 100 changes is generated in the first wireless communication device 100, the reception unit may receive the time zone information of the first wireless communication device 100 from the first wireless communication device 100.

The reception unit may receive time zone information of the second wireless communication device 200 from the second wireless communication device 200. The reception unit may receive an update request for the contact information in the second wireless communication device 200 from the second wireless communication device 200.

The reception unit may receive setting information indicating whether the time zone information of the first wireless communication device 100 is made accessible, from the first wireless communication device 100.

The transmission unit may transmit the time zone information of the first wireless communication device 100 to the second wireless communication device 200 related with the first wireless communication device 100. For example, when the time zone information of the first wireless communication device 100 and the time zone information of the second wireless communication device 200 are different from each other, the transmission unit may transmit the time zone information of the first wireless communication device 100 to the second wireless communication device 200.

The transmission unit may transmit the time zone information of the first wireless communication device 100 to the second wireless communication device 200 in response to the update request for the contact information in the second wireless communication device 200.

The transmission unit may transmit the time zone information of the first wireless communication device 100 to the second wireless communication device 200, based on the setting information indicating whether the time zone information of the first wireless communication device 100 is made accessible.

The transmission unit may also transmit the time zone information of the second wireless communication device 200 to the first wireless communication device 100.

The processor 320 (microprocessor, central processing unit, etc.) controls all operations of the server 300. For example, when the time zone information of the first wireless communication device 100 has changed, the processor 320 may search for the second wireless communication device 200 related with the first wireless communication device 100.

The processor 320 may compare the time zone information of the first wireless communication device 100 with the time zone information of the second wireless communication device 200. When it is determined as a result of the comparison that the time zone information of the first wireless communication device 100 is different from the time zone information of the second wireless communication device 200, the controller 320 may control the transmission unit to transmit the time zone information of the first wireless communication device 100 to the second wireless communication device 200 and the time zone information of the second wireless communication device 200 to the first wireless communication device 100.

The storage unit 330 may store a program that is used by the controller 320 to perform processing, or may store input/output data. For example, the server 300 may establish time zone information database (DB), contact information DB, social media information DB, and the like. The time zone information DB may include the time zone information of wireless communication devices. The contact information DB may include contact information of wireless communication devices. The social media information DB may include information about social friends of users.

The above described operations according to an exemplary embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the present invention or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware wireless communication device specially configured to store and execute program commands such as a ROM, a random-access memory (RAM), or a flash memory. Examples of the program commands are advanced language codes that can be executed by a computer by using an interpreter or the like as well as machine language codes made by a compiler.

According to an exemplary embodiment, the first wireless communication device 100 receives the time zone information of the second wireless communication device 200 located in a different time zone from that of the first wireless communication device 100, from the server 300 or the second wireless communication device 200 and displays the received time zone information. Thus, the first user of the first wireless communication device 100 may be prevented from contacting the second user of the second wireless communication device 200 when the second user of the second wireless communication device 200 is not available.

The exemplary embodiments should be considered in descriptive sense only and not for purposes of limitation. Descriptions of features or aspects within each exemplary embodiment should typically be considered as available for other similar features or aspects in other embodiments.

While the exemplary embodiments have been particularly shown and described, it will be understood by those of ordinary skill in the art that various changes in form and details may be made therein without departing from the spirit and scope of the present disclosure as defined by the following claims.

What is claimed is:

1. A first device comprising:
a communication interface;
a memory storing one or more instructions; and
a processor configured to execute the one or more instructions to perform operations for:
 executing communication application stored in the first device;
 obtaining first time zone information of the first device;
 receiving a user input to select a second device;
 obtaining second time zone information of the second device;

determining whether the second time zone information is different from the first time zone information;

displaying a GUI for reserving a communication with the second device at a preset time, based on a result of the determining;

queuing the communication with the second device at the preset time based on user input into the GUI for reserving the communication with the second device at the present time, and performing the communication with the second device at the preset time.

2. The first device of claim 1, wherein the GUI is displayed when the first time zone information and the second time zone information are different from each other and when at least one of the first time zone information or the second time zone information does not correspond to a time that is allowed to communicate with the second device.

3. The first device of claim 1, wherein the processor is further configured to perform operations for:

outputting a notification for the communication with the second device at the preset time; and requesting the communication with the second device based on a user input in response to the notification.

4. The first device of claim 1, wherein the communication is a call, and wherein the processor is further configured to perform operations for transmitting a communication request message requesting to perform the call between the first device and the second device, at the preset time.

5. The first device of claim 1, wherein the communication is a message, and wherein the processor is further configured to perform operations for transmitting a reserved message to the second device, at the preset time.

6. The first device of claim 1, wherein the first time zone information of the first device and the second time zone information the second device is displayed in the GUI for reserving the communication.

7. The first device of claim 4, wherein the processor is further configured to perform operations for displaying time information indicating the preset time based on the first time zone information and the second time zone information.

8. The first device of claim 1, wherein the communication interface is further configured to receive location information of the second device, and wherein the processor is further configured to perform operations for identifying the second time zone information of the second device corresponding to the location information of the second device.

9. The first device of claim 1, wherein the communication interface is configured to receive the second time zone information of the second device at regular intervals.

10. The first device of claim 1, wherein the communication interface is configured to receive the second time zone information of the second device, when an event where the second time zone information of the second device changes occurs.

11. A method of reserving a communication based on time zone information, performed by a first device, the method comprising:

executing communication application stored in the first device;

obtaining first time zone information of the first device;

receiving a user input to select a second device;

obtaining second time zone information of the second device;

determining whether the second time zone information is different from the first time zone information;

displaying a GUI for reserving the communication with the second device at a preset time, based on a result of the determining;

questing the communications with the second device at the preset time based on user input into the GUI for reserving the communication with the second device at the preset time; and performing the communication with the second device at the preset time.

12. The method of claim 11, wherein the GUI is displayed when the first time zone information and the second time zone information are different from each other and when at least one of the first time zone information or the second time zone information does not correspond to the time that is allowed to communicate with the second device.

13. The method of claim 11, further comprising:

outputting a notification for the communication with the second device at the preset time; and requesting the communication with the second device based on a user input in response to the notification.

14. The method of claim 11, wherein the communications is a call, and wherein the method further comprises:

transmitting a communication request message requesting to perform the call between the first device and the second device, at the preset time.

15. The method of claim 11, wherein the communication is a message, and transmitting a reserved message to the second device, at the preset time.

16. The method of claim 11, displaying of the GUI for reserving the communication with the second device further comprises:

displaying the first time zone information of the first device and the second time zone information the second device in the GUI.

17. The method of claim 14, further comprising:

displaying time information indicating the preset time based on the first time zone information and the second time zone information.

18. The method of claim 11, obtaining of the second time zone information of the second device further comprises:

receiving location information of the second device; and identifying the second time zone information of the second device corresponding to the location information of the second device.

19. The method of claim 11, obtaining of the second time zone information of the second device further comprises:

receiving the second time zone information of the second device at regular intervals.

20. A non-transitory computer-readable recording medium having recorded a program for implementing a method disclosed in claim 11.

* * * * *